US006739177B2

(12) United States Patent
Sato et al.

(10) Patent No.: US 6,739,177 B2
(45) Date of Patent: May 25, 2004

(54) COMBUSTIBLE-GAS SENSOR, DIAGNOSTIC DEVICE FOR INTAKE-OXYGEN CONCENTRATION SENSOR, AND AIR-FUEL RATIO CONTROL DEVICE FOR INTERNAL COMBUSTION ENGINES

(75) Inventors: Fumihiko Sato, Susono (JP); Takuji Matsubara, Susono (JP); Mamoru Yoshioka, Susono (JP); Yoshihiko Hyoudo, Gotenba (JP); Takayuki Takeuchi, Nukata-gun (JP); Naohisa Oyama, Okazaki (JP); Shigeki Daido, Nishio (JP)

(73) Assignees: Toyota Jidosha Kabushiki Kaisha, Toyota (JP); Nippon Soken, Inc., Nishio (JP)

( * ) Notice: Subject to any disclaimer, the term of this patent is extended or adjusted under 35 U.S.C. 154(b) by 133 days.

(21) Appl. No.: 10/087,738

(22) Filed: Mar. 5, 2002

(65) Prior Publication Data

US 2002/0139360 A1 Oct. 3, 2002

(30) Foreign Application Priority Data

| | | |
|---|---|---|
| Mar. 5, 2001 | (JP) | 2001-059808 |
| Mar. 15, 2001 | (JP) | 2001-074215 |
| Mar. 23, 2001 | (JP) | 2001-085662 |
| May 1, 2001 | (JP) | 2001-134560 |
| Jun. 21, 2001 | (JP) | 2001-188318 |
| Oct. 25, 2001 | (JP) | 2001-327681 |

(51) Int. Cl.[7] ..................................................... G01P 5/12
(52) U.S. Cl. ...................... 73/23.31; 73/31.06; 73/118.2
(58) Field of Search ............................ 73/23.32, 23.31, 73/31.05, 31.06, 118.2

(56) References Cited

U.S. PATENT DOCUMENTS

| | | | | | |
|---|---|---|---|---|---|
| 4,004,452 | A | * | 1/1977 | Logothetis et al. | 73/23.32 |
| 4,206,173 | A | * | 6/1980 | Yamaguchi et al. | 73/31.05 |
| 5,203,870 | A | | 4/1993 | Kayanuma | |
| 5,763,763 | A | * | 6/1998 | Kato et al. | 73/23.32 |
| 5,889,196 | A | * | 3/1999 | Ueno et al. | 73/23.31 |
| 5,942,674 | A | * | 8/1999 | Logothetis et al. | 73/23.32 |
| 6,205,843 | B1 | * | 3/2001 | Tanaka et al. | 73/31.06 |
| 2002/0055814 | A1 | * | 5/2002 | Kobayashi et al. | 73/118.2 |

FOREIGN PATENT DOCUMENTS

| | | | |
|---|---|---|---|
| JP | HEI 10-176577 | | 6/1998 |
| JP | HEI 11-002153 A | | 1/1999 |
| JP | A 2001-27626 | * | 1/2001 |

* cited by examiner

*Primary Examiner*—Erick Solis
(74) *Attorney, Agent, or Firm*—Kenyon & Kenyon

(57) ABSTRACT

Correction of a fuel injection amount in an internal combustion engine during purge of evaporative fuel is performed on the basis of an output from an intake-oxygen concentration sensor disposed in an intake passage of the internal combustion engine. If the amplitude of fluctuations in engine speed becomes equal to or greater than a predetermined value, it is determined that there is an anomaly in engine output. In addition, if an anomaly in engine output is detected during purge and if no anomaly in engine output is detected during stoppage of purge, an ECU determines that an anomaly has occurred in the intake-oxygen concentration sensor, cancels correction of the fuel injection amount based on an output from the intake-oxygen concentration sensor during purge, and corrects the fuel injection amount on the basis of outputs from exhaust-gas air-fuel ratio sensors.

7 Claims, 37 Drawing Sheets

FIG. 13

| INTAKE-OXYGEN CONCENTRATION SENSOR | INTAKE PRESSURE SENSOR | PURGE CONTROL VALVE | COUNTERMEASURES |
|---|---|---|---|
| × | — | — | EXHAUST-$O_2$ PURGE CONTROL |
| ○ | × | × | INTAKE-$O_2$ CORRECTION, PRESSURE ESTIMATION |
| ○ | × | ○ | INTAKE-$O_2$ PURGE, PRESSURE ESTIMATION |
| ○ | ○ | × | INTAKE-$O_2$ CORRECTION |
| ○ | ○ | ○ | INTAKE-$O_2$ PURGE |

FIG. 16

| INTAKE-OXYGEN CONCENTRATION SENSOR | INTAKE PRESSURE SENSOR | PURGE CONTROL VALVE | COUNTERMEASURES |
|---|---|---|---|
| × | — | × | CANCELLATION OF PURGE |
| × | — | ○ | EXHAUST-$O_2$ PURGE CONTROL |
| ○ | × | × | INTAKE-$O_2$ PURGE CONTROL, ESTIMATION OF PRESSURE |
| ○ | × | ○ | INTAKE-$O_2$ PURGE, ESTIMATION OF PRESSURE |
| ○ | ○ | × | INTAKE-$O_2$ CORRECTION |
| ○ | ○ | ○ | INTAKE-$O_2$ PURGE |

COMBUSTIBLE-GAS SENSOR, DIAGNOSTIC DEVICE FOR INTAKE-OXYGEN CONCENTRATION SENSOR, AND AIR-FUEL RATIO CONTROL DEVICE FOR INTERNAL COMBUSTION ENGINES

INCORPORATION BY REFERENCE

The disclosures of Japanese Patent Applications No. 2001-059808 filed on Mar. 5, 2001, No. 2001-074215 filed on Mar. 15, 2001, No. 2001-085662 filed on Mar. 23, 2001, No. 2001-134560 filed on May 1, 2001, No. 2001-188318 filed on Jun. 21, 2001, and No. 2001-327681 filed on Oct. 25, 2001, each including the specification, drawings, and abstract, are incorporated herein by reference in their entirety.

BACKGROUND OF THE INVENTION

1. Field of the Invention

The invention relates to a combustible-gas sensor which detects a concentration of combustible gas such as hydrocarbons based on a concentration of an intake-oxygen, for example, an intake-oxygen concentration sensor, and to a diagnostic device which determines whether or not there is a malfunction in the intake-oxygen concentration sensor. The invention also relates to an air-fuel ratio control device for internal combustion engines which is equipped with an intake-oxygen concentration sensor and which corrects an amount of fuel to be supplied to an engine on the basis of an output from the intake-oxygen concentration sensor.

2. Description of the Related Art

A known air-fuel ratio control device for internal combustion engines has an air-fuel ratio sensor disposed in an exhaust passage of an engine so as to detect an exhaust-gas air-fuel ratio and is designed to perform feedback control of an amount of fuel to be supplied to the engine such that the detected exhaust-gas air-fuel ratio becomes equal to a predetermined target air-fuel ratio. Such an air-fuel ratio control device measures, for example, parameters regarding the amount of intake gas in an engine (e.g., output from an air flow meter, pressure in an intake passage of the engine, and engine speed). On the basis of a relation that is stored in advance using these parameters, the air-fuel ratio control device calculates a base fuel supply amount (base fuel injection amount) such that the exhaust-gas air-fuel ratio coincides with the target air-fuel ratio. Furthermore, the air-fuel ratio control device is designed to actually supply the engine with fuel of an amount which is calculated by correcting the base fuel supply amount such that the exhaust-gas air-fuel ratio detected by an exhaust-gas air-fuel ratio sensor coincides with the target air-fuel ratio.

If the base fuel injection amount is thus subjected to feedback correction on the basis of the actual exhaust-gas air-fuel ratio detected by the air-fuel ratio sensor, it becomes possible to correct errors in regard to detection by a sensor for detecting parameters regarding the amount of intake gas in the engine (e.g., an air flow meter, an intake pressure sensor, and the like) or errors in fuel injection amount resulting from aging or dispersion among individual products in the actual amount of fuel injected from fuel injection valves. Therefore, air-fuel ratio control can be performed with precision.

However, in the case of an engine having an intake passage in which a purging device for purging evaporative fuel flowing from a fuel tank is disposed, the air-fuel ratio of the engine may temporarily deviate from a target air-fuel ratio during purge of evaporative fuel even if feedback control is performed on the basis of an exhaust-gas air-fuel ratio sensor as described above.

That is, if evaporative fuel (hydrocarbons) is introduced into the intake passage through purge, the engine receives evaporative fuel (fuel vapors) together with intake gas in addition to fuel supplied through injection. Thus, while the fuel injection amount of the engine is controlled on the basis of the exhaust-gas air-fuel ratio, the fuel supply amount of the engine increases temporarily. Therefore, the air-fuel ratio of the engine may deviate from the target air-fuel ratio. If feedback control of the fuel injection amount of the engine is performed on the basis of the exhaust-gas air-fuel ratio in spite of the occurrence of such a deviation, the amount of fuel supplied through purge in the engine is corrected, so that the air-fuel ratio of the engine coincides with the target air-fuel ratio. However, a relatively small gain is set for air-fuel ratio feedback control so as to prevent hunting. Therefore, if purge on a large scale is started abruptly, air-fuel ratio feedback control based on the output from the exhaust-gas air-fuel ratio sensor alone inevitably requires a considerable time until the air-fuel ratio of the engine converges to the target air-fuel ratio.

In order to solve this problem, there has been excogitated an air-fuel ratio sensor in which an intake-oxygen concentration sensor for detecting a concentration of oxygen contained in intake gas is disposed in an intake passage of an engine and which is designed to correct a fuel supply amount of the engine on the basis of an output from the intake-oxygen concentration sensor. In order to solve the aforementioned problem, there has been excogitated a control method which is designed to calculate an amount of evaporative fuel introduced into an intake passage of an engine on the basis of a concentration of oxygen contained in intake gas, namely, on the basis of a detection result obtained from an intake-oxygen concentration sensor that is disposed in the intake passage so as to detect a concentration of oxygen contained in intake gas. If evaporative fuel (hydrocarbons) is introduced into the intake passage, it burns in an oxidative catalyst disposed in an oxygen concentration-detecting portion of the sensor, so that the concentration of oxygen in the vicinity of the detecting portion decreases in accordance with the amount of evaporative fuel consumed through combustion (i.e., in accordance with the concentration of evaporative fuel). Therefore, the air-fuel ratio can be controlled with precision even during purge by calculating a concentration of evaporative fuel (vapors) contained in intake gas on the basis of an output from the intake-oxygen concentration sensor, calculating an amount of vapors supplied to the engine on the basis of an amount of intake air in the engine and the concentration of vapors, and decreasingly correcting a fuel injection amount of the engine by an amount corresponding to the amount of vapors.

For instance, Japanese Patent Laid-Open Publication No. 11-2153 discloses an air-fuel ratio control device of this type.

The device disclosed in this publication is designed to calculate an amount of evaporative fuel contained in intake gas during purge on the basis of an output from an intake-oxygen concentration sensor disposed in an intake passage of an engine, and to decreasingly correct a fuel injection amount of the engine by an amount corresponding to the calculated amount of evaporative fuel.

By thus performing purge control so as to calculate an amount of evaporative fuel contained in intake gas on the basis of an output from the intake-oxygen concentration sensor and decrease a fuel injection amount by an amount corresponding to the amount of evaporative fuel, it becomes possible to perform a direct operation of correction in which the fuel injection amount is reduced by the amount corresponding to the calculated amount of evaporative fuel contained in intake gas. Therefore, if purge control based on the output from the intake-oxygen concentration sensor is performed, much higher precision and much higher responding performance can be accomplished in comparison with the case where purge control is performed through air-fuel ratio control that is based on the output from the exhaust-gas air-fuel ratio sensor. Accordingly, in the case of an engine designed to perform purge control on the basis of an output from an intake-oxygen concentration sensor, it is possible to obtain a stable air-fuel ratio even if purge is performed on a large scale. Therefore, it becomes possible to perform purge on a large scale within a short period. As a result, purging operation can be performed efficiently.

It is true that an air-fuel ratio control device designed to perform purge control on the basis of an output from an intake-oxygen concentration sensor as disclosed in the aforementioned Japanese Patent Laid-Open Publication No. 11-2153 can accomplish high precision as well as high responding performance as described above. However, if an anomaly occurs in the intake-oxygen concentration sensor, the air-fuel ratio of the engine may be destabilized greatly to the extent of causing fluctuations in engine output or a deterioration in the emission properties of exhaust gas.

Namely, if there is an anomaly in the intake-oxygen concentration sensor, the amount of evaporative fuel cannot be calculated precisely during purge control. Moreover, purge control based on the output from the intake-oxygen concentration sensor is designed to detect evaporative fuel contained in intake gas prior to suction of the evaporative fuel into the engine by means of the intake-oxygen concentration sensor and to directly correct a fuel supply amount of the engine. Thus, if an anomaly occurs in the intake-oxygen concentration sensor, it directly affects the fuel injection amount of the engine. Therefore, purge control based on the output from the intake-oxygen concentration sensor causes a problem in that the air-fuel ratio is destabilized more dramatically as a result of the occurrence of an anomaly in sensor output in comparison with the case of normal air-fuel ratio control.

In addition, a driver is usually unaware whether or not purge is being performed. Therefore, even if there is an anomaly in the intake-oxygen concentration sensor during purge control, the driver merely discerns that fluctuations in engine output have become extraordinarily acute. Thus, in the case of repairs, it is necessary to investigate all the causes that could lead to fluctuations in engine output (e.g., fuel injection valves, an exhaust-gas air-fuel ratio sensor, an ignition system, and the like). Ascertainment of the fundamental cause of the fluctuations may require arduous labors.

Furthermore, in the case where fuel injection of the engine is corrected using the intake-oxygen concentration sensor, the output from the intake-oxygen concentration sensor changes greatly owing to environmental changes such as changes in pressure or flow speed.

As is generally known, an intake-oxygen concentration sensor is structured such that a solid electrolyte such as zirconia is sandwiched between two platinum electrodes functioning as a cathode and an anode respectively and that a diffusion rate-determining layer such as a ceramic-coated layer for inhibiting oxygen molecules contained in intake gas from reaching the cathode is formed on the surface of the cathode (i.e., the intake-side electrode). In a state where the intake-oxygen concentration sensor is disposed such that the cathode is in contact with intake gas in the engine and that the anode is in contact with the atmosphere, if a voltage is applied between the cathode and the anode at a temperature equal to or higher than a certain temperature, oxygen-pumping action takes place. That is, oxygen molecules contained in intake gas are ionized on the side of the cathode (i.e., the intake-side electrode), and the ionized oxygen molecules move toward the anode (i.e., the atmosphere-side electrode) in the solid electrolyte and turn into oxygen molecules again on the anode. This oxygen-pumping action ensures that a current proportional to an amount of oxygen molecules moving per unit time flows between the cathode and the anode. However, since the aforementioned diffusion rate-determining layer inhibits oxygen molecules from reaching the cathode, the output current is saturated as soon as it reaches a certain value. The output current cannot be increased thereafter even if the voltage is raised. This saturation current is substantially proportional to the partial pressure (concentration) of oxygen contained in intake gas. Accordingly, the output current substantially proportional to the concentration of oxygen can be obtained by suitably setting the voltage to be applied. This output current is converted into a voltage signal. Thus, the voltage signal proportional to the concentration (partial pressure) of oxygen contained in intake gas can be obtained from the intake-oxygen concentration sensor. In the case where intake gas contains hydrocarbons such as fuel vapors, the hydrocarbons burn on the platinum electrodes, and the concentration of oxygen in the vicinity of the electrodes decreases. Thus, the oxygen concentration sensor outputs a voltage signal proportional to a concentration of oxygen after combustion of combustibles such as hydrocarbons contained in intake gas.

If there is a constant pressure, the concentration of oxygen contained in intake gas is equal to the partial pressure of oxygen contained in intake gas (more precisely, equal to the ratio of partial pressure of oxygen to intake pressure). However, even in the case where the concentration of oxygen is constant, the partial pressure of oxygen contained in intake gas changes in proportion to the intake pressure if the intake pressure changes. Thus, the partial pressure of oxygen can assume different values. On the other hand, the intake-oxygen concentration sensor is designed to detect a partial pressure of oxygen contained in intake gas. Therefore, even in the case where the concentration of oxygen contained in intake gas is held constant, the output from the intake-oxygen concentration sensor changes if the partial pressure of oxygen changes due to a change in intake pressure. That is, the intake-oxygen concentration sensor outputs an oxygen-concentration signal that changes linearly in proportion to the intake pressure even if the concentration of oxygen is constant. In other words, the signal output from the intake-oxygen concentration sensor exhibits so-called pressure dependency. As a result, the intake system undergoes greater fluctuations in pressure and a more substantial decrease in flow speed than the exhaust system that is open to the atmosphere. Therefore, the sensor output tends to be affected thereby. During a transient change in pressure, namely, during an abrupt change in pressure, the sensor output overshoots and does not follow a curve as expected. This causes a problem of deterioration in measurement precision.

The intake pressure in the engine changes depending on the loaded condition of the engine such as engine load or engine speed. Therefore, if the fuel injection amount of the engine is corrected on the basis of the concentration of oxygen contained in intake gas detected by the intake-oxygen concentration sensor, it is necessary to correct the sensor output in accordance with the intake pressure.

In general, correction of a sensor output is performed on the basis of a detected intake pressure of the engine and reference pressure-change characteristics of sensor output which have been calculated in advance according to the kind (type) of a corresponding sensor.

However, even if the concentration of oxygen is constant, the output from the intake-oxygen concentration sensor changes in accordance with the thickness of the zirconia solid electrolyte or the diffusion rate-determining layer mentioned above. The detecting portion of the intake-oxygen concentration sensor is provided with an explosion-proof cover for preventing combustibles contained in intake gas from being kindled through combustion of combustibles such as hydrocarbons on the platinum electrodes. Pores for introducing intake gas into the detecting portion of the sensor are formed in the explosion-proof cover. If these pores change in size within a tolerance, the output from the oxygen concentration sensor also changes correspondingly. Therefore, even among sensors of the same type, the sensor output or the aforementioned pressure-dependent characteristics may be dispersed for reasons of manufacturing tolerance. Thus, if the pressure-dependent characteristics of the sensor output are dispersed among individual products in the case where the output from the intake-oxygen concentration sensor is corrected in accordance with the intake pressure, the concentration of oxygen contained in intake gas cannot be detected precisely even by correcting the sensor output on the basis of the aforementioned reference pressure-change characteristics. This causes a problem of the impossibility of controlling the fuel supply amount of the engine precisely.

For instance, the intake-oxygen concentration sensor deteriorates after longtime use, and develops a tendency to generate an increased output for the same concentration of oxygen. In the case of an engine equipped with a PCV device for ventilating a crank case, intake gas-introducing pores formed in an explosion-proof cover of an intake-oxygen concentration sensor as described above are clogged due to hydrocarbons or oil particles contained in crank-case emission gas that is recirculated into an intake passage from a crank case. This may bring about substantial irregularities in the sensor output.

If such a sensor is subject to a malfunction, the fuel injection amount is corrected on the basis of an output from the sensor that is subject to the malfunction. As a result, the exhaust-gas air-fuel ratio deviates from its target value and causes a problem of deterioration in exhaust emission properties or deterioration in operational performance of an engine. Even if there is a malfunction in a sensor, the sensor output is corrected in the same manner as in the case of a sensor that is in normal operation. Thus, the sensor output deviates more dramatically from its true value. This may cause further deterioration in emission properties or operational performance.

SUMMARY OF THE INVENTION

In quest of a solution to the aforementioned problems, the invention provides a device and a method that make it possible to take appropriate countermeasures corresponding to the type of a malfunction in an intake-oxygen concentration sensor by detecting the anomaly in the intake-oxygen concentration sensor at an early stage in the case where purge control is performed by means of the intake-oxygen concentration sensor, to determine exactly whether or not there is a malfunction in the sensor, and to measure a concentration of combustible gas with high precision.

An air-fuel ratio control device for internal combustion engines according to a first aspect of the invention comprises an evaporative fuel concentration sensor, a purging device, a vapor amount calculation portion, an intake-side purge control portion, an anomalous output detection portion, a determination portion, and a sensor anomaly determination portion. The evaporative fuel concentration sensor is disposed in an intake passage of an internal combustion engine so as to detect a concentration of evaporative fuel contained in intake gas. The purging device supplies evaporative fuel in a fuel tank to the intake passage upstream of the evaporative fuel concentration sensor. The vapor amount calculation portion calculates an amount of the evaporative fuel contained in intake gas on the basis of a value detected by the evaporative fuel concentration sensor. The intake-side purge control portion performs intake-side purge control so as to correct a fuel supply amount of the engine on the basis of a value detected by the evaporative fuel concentration sensor while supplying the intake passage with evaporative fuel. The anomalous output detection portion detects an anomaly in engine output on the basis of a parameter regarding engine output. The determination portion determines whether or not the anomaly in engine output detected during the performance of the intake-side purge control has occurred as a result of the intake-side purge control. The sensor anomaly determination portion determines that there is an anomaly in the evaporative fuel concentration sensor if it is determined that the anomaly in engine output has occurred as a result of the intake-side purge control.

If the anomalous output detection portion detects an anomaly in engine output during intake-side purge control on the basis of the parameter regarding engine output, the determination portion determines whether or not the anomaly in engine output results from intake-side purge control. For example, an anomaly in engine output during intake-side purge control may be ascribable to an anomaly in a purge system such as the purging device. Such an anomaly leads to great fluctuations in the amount of evaporative fuel supplied to the intake passage. However, if the evaporative fuel concentration sensor is in normal operation, fluctuations in the amount of evaporative fuel are immediately counterbalanced by correcting the fuel supply amount of the engine. Therefore, the engine output ought to be unaffected. Accordingly, if it is determined that the anomaly in engine output results from intake-side purge control, it is possible to determine that there is an anomaly in the evaporative fuel concentration sensor. In the first aspect of the invention, if it is determined that the anomaly in engine output results from intake-side purge control, the sensor anomaly determination portion determines that an anomaly has occurred in the evaporative fuel concentration sensor. Thus, it becomes possible to take appropriate countermeasures corresponding to a cause of the anomaly, such as cancellation of intake-side purge control based on the evaporative fuel concentration sensor.

An air-fuel ratio control device for internal combustion engines according to a second aspect of the invention comprises an evaporative fuel concentration sensor, a purging device, an intake-side purge control portion, an exhaust-gas air-fuel ratio sensor, an exhaust-side purge control portion, a system anomaly detection portion, and a control change portion. The evaporative fuel concentration sensor is disposed in an intake passage of an internal combustion engine so as to detect a concentration of evaporative fuel contained in intake gas. The purging device supplies evaporative fuel in a fuel tank to the intake passage upstream of the evaporative fuel concentration sensor. The intake-side purge control portion performs intake-side purge control so as to correct a fuel supply amount of the engine on the basis of a value detected by the evaporative fuel concentration sensor while supplying the intake passage with evaporative fuel. The exhaust-gas air-fuel ratio sensor is disposed in an exhaust passage of the internal combustion engine so as to output a signal corresponding to an exhaust-gas air-fuel ratio. The exhaust-side purge control portion performs exhaust-side purge control so as to control an air-fuel ratio of mixture supplied to the internal combustion engine on the basis of a value detected by the exhaust-gas air-fuel ratio sensor while supplying the intake passage with evaporative fuel. The system anomaly detection portion detects an anomaly in a system that is required for the performance of the intake-side purge control. The control change portion cancels the intake-side purge control and starts or continues the exhaust-side purge control if an anomaly in the system is detected.

In the second aspect of the invention, intake-side purge control is canceled if an anomaly occurs in a system required for the performance of intake-side purge control, and purge of evaporative fuel can thereafter be continued through exhaust-side purge control without causing a substantial deviation in air-fuel ratio.

A malfunction determination device for determining whether or not there is a malfunction in an intake-oxygen concentration sensor according to a third aspect of the invention comprises an intake pressure detection portion and a determination portion. The intake pressure detection portion detects an intake pressure of the engine. The determination portion determines whether or not there is a malfunction in the intake-oxygen concentration sensor, depending on whether or not a predetermined relation between amount of change in intake pressure of the engine and amount of change in the output from the intake-oxygen concentration sensor is established when the intake pressure of the engine changes.

That is, the third aspect of the invention makes it possible to determine whether or not there is a malfunction in the sensor, depending on whether or not a predetermined relation is established between amount of change in intake pressure of the engine and amount of change in output from the intake-oxygen concentration sensor.

A combustible-gas sensor according to a fourth aspect of the invention is equipped with a sensor device having a pair of electrodes which are formed on the surface of an oxygen-ion conductor and one of electrodes is disposed in a space where measurement-target gas containing combustible gas and oxygen exists, and detects a concentration of combustible gas on the basis of a change in the concentration of oxygen contained in measurement-target gas resulting from an oxidizing reaction of combustible gas. On the basis of a sensor output in the atmosphere of a reference gas, this combustible-gas sensor corrects a deviation in sensor output resulting from a pressure of measurement-target gas.

The output from the combustible-gas sensor tends to shift to the high-output side as the pressure increases, but the sensor output in a reference gas such as the atmosphere also demonstrates a similar tendency. Therefore, the influence of pressure can be eliminated by performing correction on the basis of such a tendency. Accordingly, it is possible to suppress fluctuations in output resulting from changes in pressure and measure a concentration of combustible gas with precision.

A combustible-gas sensor according to a fifth aspect of the invention corrects a deviation in sensor output resulting from a decrease in flow speed of measurement-target gas on the basis of a map prepared in advance to define a relation between flow speed and sensor output.

The sensor output exhibits flow-speed dependency as long as the flow speed of measurement-target gas is sensibly low, and shifts to the high-output side. Thus, the influence of flow speed can be eliminated by correcting a sensor output on the basis of the map defining the relation between flow speed and sensor output in response to a decrease in flow speed of measurement-target gas.

Furthermore, a combustible-gas sensor according to a sixth aspect of the invention corrects a sensor output on the basis of a pressure-change speed or a rate of change in the concentration of combustible gas during a certain period if the pressure-change speed remains higher than a predetermined speed for the period or more.

The sensor output during a transient change in pressure follows changes in pressure for a certain period since the start of the changes in pressure. After that, however, the sensor output shifts to the low-output side during a decrease in pressure and to the high-output side during an increase in pressure. Therefore, the sensor output is corrected if the pressure-change speed changes abruptly beyond the predetermined speed after the lapse of the aforementioned period. In this case, the relation between pressure-change speed and sensor output or the rate of change in the concentration of combustible gas is calculated in advance. By performing correction on the basis of the relation or the rate of change thus calculated, it becomes possible to suppress fluctuations in output resulting from a transient change in pressure and measure a concentration of combustible gas such as fuel vapors with precision.

BRIEF DESCRIPTION OF THE DRAWINGS

FIG. 13 is an explanatory view of the functions of an air-fuel ratio control device according to the third embodiment of the invention.

FIG. 16 is an explanatory view of the functions of an air-fuel ratio control device according to a fifth embodiment of the invention.

DETAILED DESCRIPTION OF PREFERRED EMBODIMENTS

Embodiments of the invention will be described hereinafter with reference to the accompanying drawings.

Figure 1:
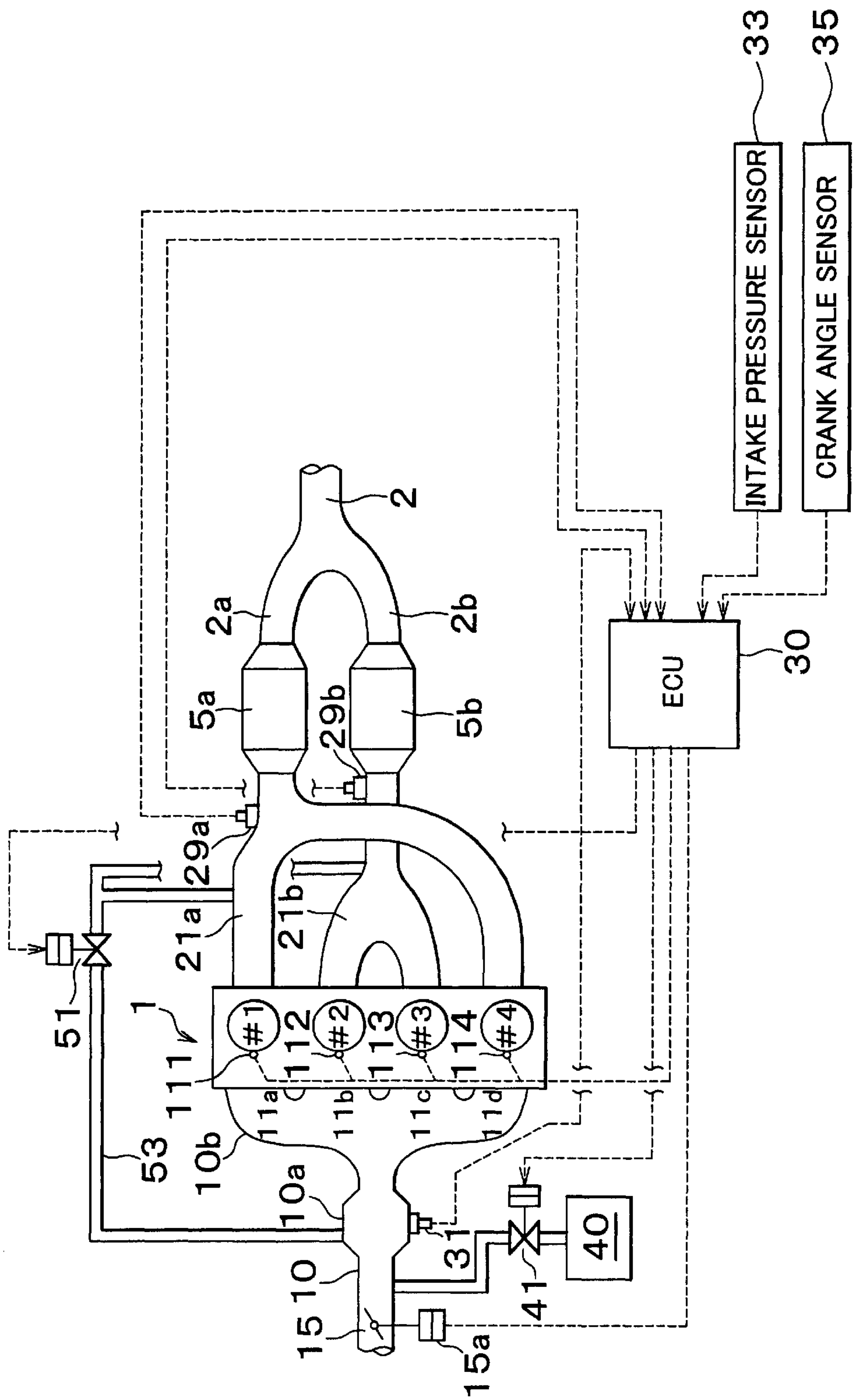
FIG. 1 is an explanatory view of the overall structure of a vehicular internal combustion engine according to one embodiment of the invention.

FIG. 1 is a schematic structural view of a vehicular internal combustion engine according to one embodiment of the invention.

In this embodiment, as shown in FIG. 1, a vehicular internal combustion engine 1 is a four-cylinder gasoline engine having four cylinders #1 to #4. Fuel injection valves 111 to 114 are disposed in the cylinders #1 to #4 respectively. Each of the fuel injection valves 111 to 114 is designed to directly inject fuel into a corresponding one of the cylinders #1 to #4.

In this embodiment, the cylinders #1 to #4 are classified into two cylinder groups each of which is composed of two cylinders having discrete ignition timings. (For example, the embodiment shown in FIG. 1 is designed such that the cylinders #1, #3, #4, and #2 are ignited in this order and classified into two cylinder groups, that is, the cylinders #1, #4 and the cylinders #2, #3.) Exhaust ports of the cylinders #1, #4 and exhaust ports of the cylinders #2, #3 are connected respectively to a separate exhaust manifold and to a separate exhaust passage. Referring to FIG. 1, a separate exhaust passage 2*a* is connected via an exhaust manifold 21*a* to the exhaust port of the cylinder group composed of the cylinders #1, #4, and a separate exhaust passage 2*b* is connected via an exhaust manifold 21*b* to the exhaust port of the cylinder group composed of the cylinders #2, #3. In this embodiment, the separate exhaust passages 2*a*, 2*b* extend across start catalysts (hereinafter referred to as "SC's") 5*a*, 5*b* respectively. These catalysts are constructed of known three-way catalysts. The separate exhaust passages 2*a*, 2*b* converge into a common exhaust passage 2 downstream of the SC's.

Air-fuel ratio sensors 29*a*, 29*b* are disposed in the separate exhaust passages 2*a*, 2*b* upstream of the start catalysts 5*a*, 5*b*, respectively. The air-fuel ratio sensors 29*a*, 29*b* are constructed in the same manner as a later-described intake-oxygen concentration sensor and are designed to output a voltage signal corresponding to an exhaust-gas air-fuel ratio over an extensive air-fuel ratio range. Outputs from the air-fuel ratio sensors 29*a*, 29*b* are utilized for air-fuel ratio control of the engine 1.

An intake passage 10 is connected via an intake manifold 10*b* to intake ports of the cylinders of the engine. A surge tank 10*a* is disposed in the intake passage 10. Each of the intake ports of the cylinders is connected via a corresponding one of separate branch pipes 11*a* to lid to the surge tank 10*a*.

Furthermore, according to this embodiment, a throttle valve 15 is disposed in the intake passage 10. The throttle valve 15 of this embodiment is a so-called electronic controlled throttle valve, which is driven by an actuator 15*a* of a suitable type such as a stepper motor and assumes an opening corresponding to a control signal from a later-described ECU 30.

A known evaporative fuel-purging device 40 is connected via a purge control valve 41 to the intake passage 10 downstream of the throttle valve 15. The purging device 40 includes a canister containing an adsorbent such as activated carbon. The adsorbent in the canister adsorbs evaporative fuel in a fuel tank (not shown) of the engine 1, thus preventing evaporative fuel from being discharged from the fuel tank to the atmosphere. The purge control valve 41 is equipped with, for example, a solenoid actuator and assumes an opening corresponding to a control signal from the ECU 30.

More specifically, the solenoid actuator for the purge control valve 41 opens or closes the purge control valve 41 in accordance with a drive pulse signal from the ECU 30. That is, the purge control valve 41 repeats the operations of opening while the drive pulse signal is on during one cycle thereof and closing while the drive pulse signal is off during one cycle thereof. Accordingly, the flow rate of purge gas flowing through the purge control valve increases in accordance with the ratio of the period in which the drive pulse signal is on during one cycle thereof (i.e., in accordance with the duty ratio). Controlling the duty ratio in this manner is equivalent to performing control such that the purge control valve assumes an opening corresponding to the duty ratio. If the purge control valve 41 is opened while the engine 1 is in operation, evaporative fuel that has been adsorbed by the canister of the purging device 40 flows from the purge control valve 41 into the intake passage 10, is mixed with engine intake gas that has flown through the throttle valve 15, and turns into a homogeneous mixture. This mixture is sucked into the cylinders of the engine 1.

An EGR passage 53 is connected via an EGR control valve 51 to the surge tank 10*a* in the intake passage 10. The EGR passage 53 connects the exhaust manifolds 21*a*, 21*b* of the engine 1 to the surge tank 10*a* and recirculates part of engine exhaust gas to the intake passage of the engine, thus reducing the temperature of combustion in combustion chambers of the engine 1 and reducing the amount of NOx that are produced through combustion. The EGR control valve 51 is equipped with an actuator of a suitable type such as a stepper motor and assumes an opening corresponding to a control signal from the ECU 30. The EGR control valve 51 adjusts the flow rate of exhaust gas (EGR gas) that is recirculated into the intake passage while the engine is in operation, in accordance with the operational state of the engine.

Furthermore, according to this embodiment, an oxygen concentration sensor 31 for detecting a concentration of oxygen contained in intake gas is disposed in the surge tank 10*a* of the intake passage 10. As will be described later, the oxygen concentration sensor 31 outputs a voltage signal proportional to the concentration of oxygen contained in exhaust gas (partial pressure) due to the operation of an oxygen pump.

The electronic control unit (ECU) 30 is a microcomputer of a known structure and includes a RAM, a ROM, and a CPU. In addition to basic control such as ignition timing control and air-fuel ratio control for the engine 1, the ECU 30 performs open-close control of the purge control valve 41 and the EGR control valve 51 so as to purge evaporative fuel and recirculate exhaust gas. The ECU 30 also performs an operation of determining whether or not there is an anomaly in the later-described intake-oxygen concentration sensor 31.

Furthermore, the ECU 30 calculates an amount of evaporative fuel in intake gas on the basis of an output from the intake-oxygen concentration sensor 31 during purge, and performs fuel vapor correction for correcting the amounts of fuel injected from the fuel injection valves 111 to 114 disposed in the cylinders on the basis of the amount of evaporative fuel.

In this embodiment, the ECU 30 performs both the aforementioned fuel injection amount control (1) and fuel injection amount control (2). The fuel injection amount control (1) is performed on the basis of the output from an exhaust-gas air-fuel ratio sensor (exhaust-gas air-fuel ratio control). The fuel injection amount control (2) is performed on the basis of the output from the intake-oxygen concentration sensor during purge. The aforementioned exhaust-gas air-fuel ratio control (1) is usually performed whether purge is carried out or not. Therefore, if purge is carried out, the aforementioned exhaust-gas air-fuel ratio control (1) is also performed at the same time. Thus, if the aforementioned fuel injection amount control based on the output from the intake-oxygen concentration sensor is not performed, for example, during purge, the fuel injection amount including the amount of evaporative fuel supplied through purge during the aforementioned exhaust-gas air-fuel ratio control (1) is corrected.

In the following description, the aforementioned fuel injection amount control (2) that is performed on the basis of the output from the intake-oxygen concentration sensor during purge is referred to as "intake-$O_2$ purge control", and the aforementioned exhaust-gas air-fuel ratio control (1) that is performed during purge is referred to as "exhaust-$O_2$ purge control". In this manner, the exhaust-gas air-fuel ratio control (1) and the fuel injection amount control (2) are distinguished from each other.

In order to perform intake-$O_2$ purge control and exhaust-$O_2$ purge control, signals transmitted from the air-fuel ratio sensors 29*a*, 29*b* and indicating exhaust-gas air-fuel ratios, a signal transmitted from the intake-oxygen concentration sensor 31 and indicating a concentration of oxygen in intake gas, a signal transmitted from an intake-pressure sensor 33 disposed in the intake manifold of the engine and corresponding to an intake pressure of the engine are input to input ports of the ECU 30. In addition, two signals, that is, a crank-angle pulse signal indicating a crank position and a reference pulse signal are transmitted from a crank angle sensor 35 disposed close to a crank shaft and are input to an input port of the ECU 30. The former is input to the ECU 30 every time the crank shaft rotates by a predetermined angle (e.g., 15°), and the latter is input to the ECU 30 every time the crank shaft assumes a reference position (e.g., the position to be assumed when the cylinder #1 is at a compression top dead center). The ECU 30 calculates an engine speed and a phase of the crank shaft at intervals of a certain period on the basis of a reference pulse signal and the cycle of a crank-angle pulse signal.

In order to control the amount of fuel injected into the cylinders and the timings when fuel is injected into the cylinders, an output port of the ECU 30 is connected via fuel injection circuits (not shown) to the fuel injection valves 111 to 114 disposed in the cylinders respectively. Another output port of the ECU 30 is connected via a driving circuit (not shown) to the actuator 15*a* of the throttle valve 15 so as to control the opening of the throttle valve 15.

The ECU 30 is also connected via a driving circuit (not shown) to the actuator for the purge control valve 41 so as to control the opening of the purge control valve 41 and purge evaporative fuel.

In this embodiment, the ECU 30 operates the engine 1 over an extensive air-fuel ratio range, namely, from rich air-fuel ratios to lean air-fuel ratios. For example, in the case where the engine 1 is operated at a stoichiometric or rich air-fuel ratio, the ECU 30 calculates a fuel injection amount of the engine on the basis of a target air-fuel ratio of the engine and an amount of intake gas of the engine, which is determined by an intake pressure PM and an engine speed NE. The fuel injection amount thus calculated is corrected through feedback control, which is based on outputs from the exhaust-gas air-fuel ratio sensors 29*a*, 29*b*.

An amount GA of intake gas in the engine is determined by an intake pressure of the engine and an engine speed. The amount GA of intake gas can be calculated by measuring the intake pressure PM and the engine speed NE. If the amount GA of intake gas is determined, it is possible to calculate a fuel injection amount that is required to make the air-fuel ratio at which the engine is operated equal to a target air-fuel ratio RT, that is, to calculate a base fuel injection amount GFB, according to an equation GFB=GA/RT. In this embodiment, values of the base fuel injection amount GFB in the case where the engine is operated at a rich air-fuel ratio that is equal to or smaller than the stoichiometric air-fuel ratio are stored in the ROM of the ECU 30 in the form of a numerical map using the target air-fuel ratio RT, the intake pressure PM, and the engine speed NE.

An actual amount GF of fuel injection of the engine is calculated according to an equation (1) shown below, using the aforementioned base fuel injection amount GFB.

$$GF=GFB{\times}EFKG{\times}FAF \tag{1}$$

It is to be noted herein that FAF is a correction coefficient for making the air-fuel ratio of the engine calculated on the basis of the exhaust-gas air-fuel ratios detected by the exhaust-gas air-fuel ratio sensors 29*a*, 29*b* exactly equal to the target air-fuel ratio and is referred to as an air-fuel ratio feedback correction coefficient. The air-fuel ratio feedback correction coefficient is calculated, for example, through proportional-integral-derivative (PID) control that is based on a difference between the target air-fuel ratio and each of the exhaust-gas air-fuel ratios detected by the exhaust-gas air-fuel ratio sensors 29*a*, 29*b*. It is also to be noted herein that EFKG is a learning correction coefficient for correcting an error in regard to detection by the sensors of the air-fuel ratio control system or an error in regard to fuel injection from the fuel injection valves 111 to 114. In this embodiment, the air-fuel ratio feedback correction coefficient FAF and the learning correction coefficient EFKG can be calculated by any known method. Therefore, detailed description of the method of calculation will be omitted.

It will now be described how the fuel injection amount during purge of evaporative fuel is corrected.

If evaporative fuel is purged, the engine is supplied with purged fuel in the form of fuel vapors as well as injected fuel. Therefore, if the engine is supplied with fuel of the amount GF calculated according to the aforementioned equation (1), an excess of fuel corresponding to the amount of fuel vapors makes it impossible to maintain the target air-fuel ratio. Thus, this embodiment is designed to decreasingly correct the amount GF of fuel injection by the amount of fuel vapors on the basis of the output from the intake-oxygen concentration sensor 31 disposed in the intake passage so as to prevent air-fuel ratio control from being affected by purge of evaporative fuel.

In this embodiment, the aforementioned correction of the amount of fuel vapors is performed on the basis of a sensor output ratio $\alpha$, which is calculated on the basis of an output from the intake-oxygen concentration sensor 31.

The sensor output ratio $\alpha$ is defined as the ratio of an output RP from the intake-oxygen concentration sensor 31 during purge (i.e., the concentration of oxygen contained in intake gas during purge) to an output RO from the intake-oxygen concentration sensor 31 during stoppage of purge (i.e., the concentration of oxygen contained in intake gas during stoppage of purge). Thus, an equation $\alpha=RP/RO$ is derived.

If fuel vapors exist in intake gas, oxygen contained in intake gas reacts with fuel vapors on the sensor 31 and is consumed. Therefore, the concentration of oxygen on the sensor 31 decreases by a value corresponding to the amount of oxygen consumed for the reaction with fuel vapors, so that the sensor output becomes equal to RP. That is, part of oxygen contained in intake gas, namely, oxygen of an amount corresponding to $RO\times(1-\alpha)$ is consumed due to the reaction with fuel vapors. Accordingly, if the target air-fuel ratio of the engine is equal to the stoichiometric air-fuel ratio (i.e., if the excess air ratio $\lambda=1$), the ratio of the amount of oxygen that is supplied through fuel injection and that can be used for combustion to the amount of oxygen contained in intake gas is equal to $RO\times\alpha$. Hence, in order to maintain the air-fuel ratio at which the engine is operated at the stoichiometric air-fuel ratio, it is appropriate that the fuel injection amount be reduced by an amount corresponding to a decrease in the ratio of the amount of oxygen usable for combustion to the fuel injection amount during stoppage of purge. Thus, it becomes possible to maintain the same air-fuel ratio as during stoppage of purge. Accordingly, if the fuel injection amount is reduced by being multiplied by $\alpha(\leqq 1)$ in this case, the same air-fuel ratio as in the case where intake gas contains no fuel vapors can be maintained.

That is, this embodiment is designed such that the ECU 30 calculates an actual amount GFTA of fuel injected from the fuel injection valves in the case where the target air-fuel ratio is equal to the stoichiometric air-fuel ratio, as a value obtained by multiplying the actual amount GF of fuel injection calculated according to the equation (1) by the sensor output ratio $\alpha$. That is, an equation (2) shown below is derived.

$$GFTA=GF{\times}\alpha=GFB{\times}\alpha{\times}EFKG{\times}FAF \tag{2}$$

This makes it possible to control the fuel injection amount such that the target air-fuel ratio can be achieved exactly even during purge of evaporative fuel. The foregoing description is concerned with the case where the target air-fuel ratio is equal to the stoichiometric air-fuel ratio. However, even in the case where the target air-fuel ratio is a lean or rich air-fuel ratio, the target air-fuel ratio can be maintained exactly during purge by calculating an amount of fuel vapors contained in intake gas on the basis of an output from the intake-oxygen concentration sensor 31 and correcting a fuel injection amount in a similar manner.

The following description handles detection of an anomaly in engine output according to this embodiment.

As described above, the fuel injection amount is directly corrected on the basis of the output from the intake-oxygen concentration sensor 31 during purge. Therefore, if there is an anomaly in the sensor 31, fluctuations in the engine output are caused by instability of the air-fuel ratio of the engine. During purge, air containing evaporative fuel (purge gas) flows from the purging device 40 through the purge control valve 41 and is supplied to the intake passage 10. As described above, however, the purge control valve 41 repeatedly opens or closes depending on whether the drive pulse from the ECU 30 is on or off. By changing the ratio of the period in which the pulse signal is on to one cycle of the pulse signal (i.e., the duty ratio), the flow rate of purge gas is adjusted. Hence, during purge, purge gas is actually supplied to the intake passage intermittently depending on whether or not the purge control valve is on or off. Thus, there are periodical fluctuations in the concentration of evaporative fuel contained in intake gas while purge is actually carried out. Fluctuations in the amount of evaporative fuel are corrected immediately if the intake-oxygen concentration sensor 31 is in normal operation. Therefore, no fluctuations are caused in the amount of fuel actually burning in each of the cylinders of the engine. However, if there is an anomaly in the intake-oxygen concentration sensor 31, the amount of fuel burning in each of the cylinders of the engine fluctuates in accordance with the amount of evaporative fuel contained in intake gas. If there is a certain anomaly in the intake-oxygen concentration sensor 31, the fuel injection amount is corrected excessively in response to the fluctuations in the amount of evaporative fuel contained in intake gas. Such an excessive correction may cause fluctuations in the amount of fuel burning in the engine.

That is, if there is an anomaly in the intake-oxygen concentration sensor 31, there are fluctuations in the amount of fuel burning in each of the cylinders of the engine, so that the air-fuel ratio of fuel burning in each of the cylinders of the engine fluctuates at intervals of a relatively short period, namely, every time the crank shaft rotates by 360°. Thus, the output torque of each of the cylinders of the engine is dispersed due to the fluctuations in each of the cylinders of the engine. The dispersion of the output torque causes fluctuations in the engine speed.

Accordingly, it is possible to detect an anomalous engine output by monitoring engine speeds and detecting fluctuations in engine speed.

More specifically, the ECU 30 of this embodiment performs an operation of detecting an anomalous engine output during operation of the engine. That is, the ECU 30 calculates an engine speed from a period between crank-rotational-angle pulse signals that are input from the crank-angle sensor 35 every time the crank shaft rotates by 15°. The ECU 30 calculates a crank rotational speed in an explosion stroke of each of the cylinders from a reference pulse signal input from the crank-angle sensor 35 and the aforementioned crank-rotational-angle pulse signal. The ECU 30 calculates an average engine speed in an explosion stroke of each of the cylinders every time the crank shaft rotates by 360°. If the engine speed in an explosion stroke of each of the cylinders remains dispersed by a value equal to or greater than a criterion value determined in advance from the aforementioned average engine speed for a predetermined period, the ECU 30 detects an anomalous engine output.

The method of detecting an anomalous engine output is not to be limited as described above. For instance, if there are fluctuations in the engine output due to fluctuations in the combustion air-fuel ratio of the engine, the exhaust-gas air-fuel ratio of the engine fluctuates in response to the fluctuations in the combustion air-fuel ratio. Thus, the method may include the step of checking whether or not there are fluctuations in the exhaust-gas air-fuel ratios detected by the exhaust-gas air-fuel ratio sensors. If the amplitude of the fluctuations becomes equal to or greater than a predetermined criterion value, it can be determined that an anomalous engine output has been detected. In this embodiment, since the exhaust-gas air-fuel ratio sensors 29*a*, 29*b* are disposed in the exhaust passages, it is also possible to detect an anomalous engine output by monitoring outputs from those sensors.

For example, in the case of an engine equipped with combustion pressure sensors for detecting combustion pressures in combustion chambers, it is also appropriate that the combustion pressure during an explosion stroke in each of the cylinders be monitored and that the occurrence of misfiring be detected if the combustion pressure is dispersed by a predetermined value or more. In the case of an engine constructed differently from the one shown in FIG. 1, such as a hybrid engine designed to drive loads simultaneously by means of an internal combustion engine and an electric motor, the output torque of the electric motor fluctuates in response to fluctuations in the output from the internal combustion engine so as to compensate for them. Thus, it is also appropriate that the value of electric current flowing through the electric motor be monitored and that an anomalous engine output be detected if the value of electric current fluctuates by a predetermined amplitude or more. That is, parameters including engine output, exhaust-gas air-fuel ratio, and combustion pressure in each of the cylinders can be used to detect an anomalous engine output by means of an anomalous output detection means. In the case of a hybrid power unit designed to drive loads simultaneously by means of an internal combustion engine and an electric motor, the driving current (driving torque) of the electric motor and the like can be used.

Embodiments of the operation of detecting an anomaly in the intake-oxygen concentration sensor will be described hereinafter. The following embodiments are designed to detect an anomaly in the intake-oxygen concentration sensor on the basis of an anomalous engine output detected according to one of the aforementioned methods of detecting an anomalous engine output.

In the first embodiment, the ECU 30 performs an operation of detecting an anomalous engine output at regular intervals during operation of the engine, whether purge is carried out or not. If no anomalous engine output is detected during stoppage of purge and if an anomalous engine output is detected during purge, the ECU 30 determines that there is an anomaly in the intake-oxygen concentration sensor.

As described above, malfunctions in the purging system include fluctuations in the amount of purge gas resulting from a malfunction of the purge control valve or the like. In this case as well, however, the fuel injection amount is corrected immediately in response to fluctuations in the amount of purge gas if the intake-oxygen concentration sensor is in normal operation. Thus, no fluctuations are caused in the combustion air-fuel ratio of each of the cylinders or in the engine output. Thus, if no anomalous engine output is detected during stoppage of purge and if an anomalous engine output is detected during purge, it is extremely probable that the anomalous engine output be ascribable to an anomaly in the intake-oxygen concentration sensor.

By thus determining whether or not there is an anomaly in the intake-oxygen concentration sensor, it becomes easy to ascertain the cause of fluctuations in the engine output, and it becomes possible to reduce the number of hours to be spent to ascertain the cause of a malfunction during repairs.

In this embodiment, if it is determined as described above that there is an anomaly in the intake-oxygen concentration sensor, the performance of purge control on the basis of the output from the intake-oxygen concentration sensor (i.e., intake-$O_2$ purge control) is prohibited, and purge is carried out through air-fuel ratio control on the basis of the outputs from the exhaust-gas air-fuel ratio sensors (i.e., exhaust-$O_2$ purge control). This makes it possible to purge evaporative fuel even in the case where there is an anomaly in the intake-oxygen concentration sensor. Therefore, saturation of an adsorbent in the purging device with evaporative fuel is prevented.

Figure 2:
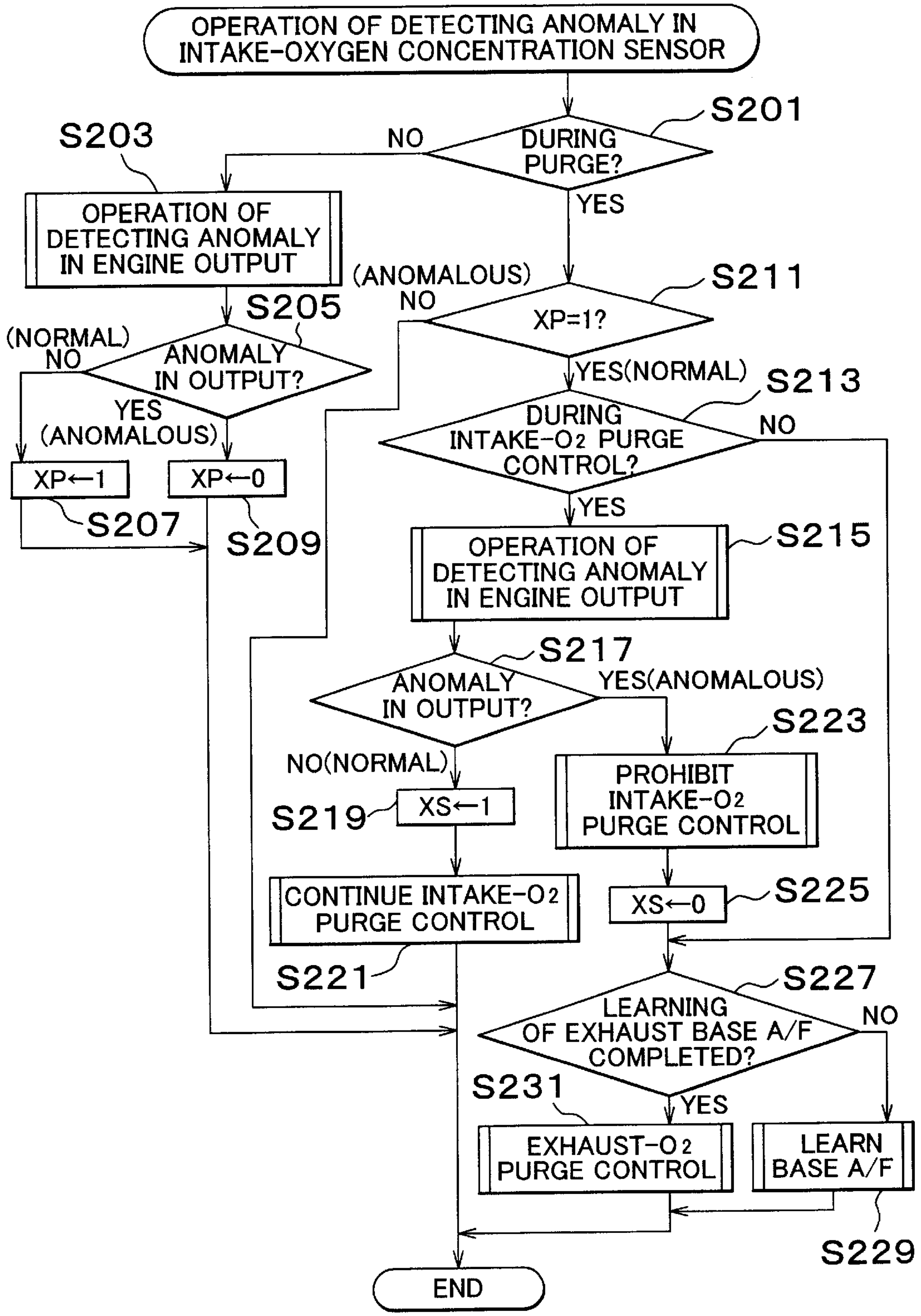
FIG. 2 is a flowchart for explaining an operation that is performed according to a first embodiment of the invention so as to detect an anomaly in an intake-oxygen concentration sensor.

FIG. 2 is a flowchart for explaining an operation of detecting an anomaly in the intake-oxygen concentration sensor of this embodiment. This operation is performed on the basis of a routine that is executed by the ECU 30 at intervals of a certain period.

In the operation shown in FIG. 2, it is first determined in step 201 whether or not purge is being carried out. If purge is not being carried out in step 201, that is, if the purge control valve 41 is fully open (i.e., if the duty ratio is 0), intake-$O_2$ purge control is not being performed. Therefore, it is determined in step 203 whether or not there is an anomaly in the engine output at the moment. The operation of detecting an anomaly in step 203 is designed to determine whether or not the engine output (engine speed) fluctuates by a criterion value or more, according to one of the aforementioned methods that is based on fluctuations in the engine speed, fluctuations in the outputs from the exhaust-gas air-fuel ratio sensors, or fluctuations in the combustion pressures in the cylinders. In the case of a hybrid engine, this determination is made on the basis of fluctuations in the value of electric current flowing through an electric motor. If there are fluctuations in the engine output (engine speed), it is determined that an anomaly in the engine output has occurred.

For instance, if the air-fuel ratio of the engine is stable, the amplitude of fluctuations in the engine output occurring every time the crank shaft rotates by 360° is small despite an increase or decrease in the engine output as a whole. On the other hand, if the output for each of the cylinders starts to fluctuate due to various factors, the engine speed also starts to fluctuate correspondingly. Thus, if fluctuations in the engine output are monitored, it becomes possible to determine whether or not there is an anomaly in the engine output. Further, the air-fuel ratio of the engine is usually controlled in such a manner as to assume a certain target value, and the exhaust-gas air-fuel ratio of the engine is also maintained at the target value. However, if there is an anomaly in the engine output as a result of fluctuations in the fuel supply amount of the engine, the exhaust-gas air-fuel ratio of the engine also fluctuates in accordance with the engine output. Therefore, if fluctuations in the exhaust-gas air-fuel ratio of the engine are monitored, it becomes possible to determine whether or not there is an anomaly in the engine output.

It is determined in step 205 whether or not the engine output has been regarded as anomalous as a result of the operation of detecting an anomaly in the engine output in step 203. If it is determined that there is an anomaly in the engine output, an anomalous output flag XP during stoppage of purge is set as 0 (anomalous) in step 209. If no anomalous output is detected, the flag XP is set as 1 (normal) in step 207, whereby the present routine is terminated.

In steps 203 to 209, it is checked whether or not there is an anomaly in the engine output during stoppage of intake-side purge control as well as during the performance of intake-side purge control. Thus, for example, if the engine output assumes a normal value during stoppage of intake-side purge control and if there is an anomaly in the engine output during the performance of intake-side purge control, it is possible to determine that the anomaly in the engine output is ascribable to intake-side purge control. Therefore, it is possible to reliably determine, by means of a sensor anomaly detection means, whether or not there is an anomaly in an evaporative fuel concentration sensor.

If purge is being carried out in step 201, it is then determined in step 211 whether or not the flag XP has been set as 1. If XP≠1 in step 211, that is, if there is already an anomaly in the engine output during stoppage of intake-$O_2$ purge control, the anomalous engine output is ascribable to a factor other than the intake-oxygen concentration sensor. Therefore, there is no need to perform the operation of detecting an anomaly in the intake-oxygen concentration sensor in steps starting from step 213. Therefore, in this case, the present routine is terminated immediately. In this case, if intake-$O_2$ purge control is being performed, the performance of purge control is continued.

If XP=1 in step 211, that is, if there is no anomaly in the engine output during stoppage of purge, it is then determined in step 213 whether or not intake-$O_2$ purge control is being performed. If intake-$O_2$ purge control is not being performed (e.g., if intake-$O_2$ purge control is prohibited (step 223) on the ground that an anomaly in the intake-oxygen concentration sensor has been detected by a later-described operation), air-fuel ratio control on the basis of the outputs from the exhaust-gas air-fuel ratio sensors (i.e., exhaust-$O_2$ purge control) is performed in step 227.

If intake-$O_2$ purge control is being performed in step 213, the operation of detecting an anomaly in the engine output is performed again in step 215. The processing in step 215 is identical with the processing in step 203 and thus will not be described below.

It is then determined in step 217 whether or not an anomaly in the engine output has been detected in step 215.

If there is no anomaly in the engine output in step 217, it is apparent that intake-$O_2$ purge control is being performed normally. This means that there is no anomaly in the intake-oxygen concentration sensor. Thus, a flag XS is set as 1 in step 219, and continuation of intake-$O_2$ purge control is permitted in step 221, whereby the present routine is terminated. The flag XS in step 219 indicates whether or not there is an anomaly in the intake-oxygen concentration sensor. If XS=1, it is possible to conclude that the intake-oxygen concentration sensor is in normal operation.

If there is an anomaly in the engine output in step 217, it follows that there was no anomaly during stoppage of purge. Therefore, it is possible to determine that an anomaly in the engine output has occurred because of the performance of intake-$O_2$ purge control. Thus, in this case, intake-$O_2$ purge control is prohibited in step 223, and the flag XS is set as 0 (anomalous) in step 225. By storing the value of the flag XS into a backup RAM (a RAM capable of holding memories even if the engine main switch is turned off) or the like in the ECU 30, it becomes easy to ascertain the location subject to a malfunction during repairs or inspection. If the flag XS is set as 0, a warning lamp disposed close to a driver seat is lit up in response to an alarm control operation that is performed separately by the ECU 30, so that the driver is advised that an anomaly in the intake-oxygen concentration sensor has occurred.

Steps 227 to 231 indicate an exhaust-$O_2$ purge control operation. This embodiment is designed to continue purge by performing exhaust-$O_2$ purge control if an anomaly in the intake-oxygen concentration sensor is detected. As described above, during exhaust-$O_2$ purge control, feedback control of the fuel injection amount is performed on the basis of outputs from the exhaust-gas air-fuel ratio sensors 29*a*, 29*b* disposed in the exhaust passages such that the exhaust-gas air-fuel ratios assume target values.

Therefore, the amount of evaporative fuel resulting from purge is also corrected through exhaust-$O_2$ purge control, and the air-fuel ratio of the engine is maintained at a target air-fuel ratio.

The operations performed in steps 227 to 231 will now be described. It is first determined in step 227 whether or not the learning of a base air-fuel ratio for starting exhaust-gas air-fuel ratio control has been completed. The learning of the base air-fuel ratio is an operation of calculating the learning correction coefficient EFKG for correcting errors in regard to detection by the sensors in the aforementioned air-fuel ratio control system or errors in regard to fuel injection from the fuel injection valves 111 to 114. If the learning of the base air-fuel ratio has not been completed in step 227, the learning of the base air-fuel ratio is conducted in step 229. The operation of learning the base air-fuel ratio is performed by opening the purge control valve 41 so as to create a state free from the influence of evaporative fuel and calculating the learning correction coefficient EFKG on the basis of actual exhaust-gas air-fuel ratios detected by the exhaust-gas air-fuel ratio sensors 29*a*, 29*b*, for example, during injection of fuel of the base fuel injection amount GFB.

If the learning of the base air-fuel ratio has already been completed in step 227, feedback correction of the fuel injection amount on the basis of outputs from the exhaust-gas air-fuel ratio sensors (i.e., exhaust-$O_2$ purge control) is performed in step 231. In the case where an anomaly in the intake-oxygen concentration sensor is detected, if the learning of the base air-fuel ratio is always conducted in this manner before correction of the fuel injection amount is started exclusively by exhaust-$O_2$ purge control without counting on intake-$O_2$ purge control, it becomes possible to reduce errors in regard to exhaust-$O_2$ purge control even in the case of continuation of purge and minimize fluctuations in the air-fuel ratio of the engine during purge.

In the aforementioned first embodiment, if it is determined during intake-side purge control that there is an anomaly in the evaporative fuel concentration sensor, intake-side purge control based on the output from the intake-oxygen concentration sensor is stopped immediately, and correction of the fuel supply amount of the engine on the basis of the outputs from the exhaust-gas air-fuel ratio sensors, namely, control of the air-fuel ratio of the engine based on the outputs from the exhaust-gas air-fuel ratio sensors is performed. If control of the air-fuel ratio of the engine is performed on the basis of the outputs from the exhaust-gas air-fuel ratio sensors even during intake-side purge control based on the output from the evaporative fuel concentration sensor, intake-side purge control based on the output from the evaporative fuel concentration sensor is canceled and air-fuel ratio control based on the outputs from the exhaust-gas air-fuel ratio sensors is continued. Although high responding performance as in the case of intake-side purge control based on the output from the evaporative fuel concentration sensor cannot be expected exclusively from air-fuel ratio control based on the outputs from the exhaust-gas air-fuel ratio sensors, it is still possible to maintain the air-fuel ratio of the engine at a target air-fuel ratio even when the purging device supplies evaporative fuel. Therefore, the first embodiment makes it possible to continue to supply evaporative fuel from the purging device (i.e., to continue purge) even if an anomaly in the evaporative fuel concentration sensor has occurred.

The aforementioned first embodiment is designed to detect the occurrence of an anomaly in the evaporative fuel concentration sensor immediately if it is determined that there is an anomaly in the engine output owing to intake-side purge control. However, if it is determined that there is an anomaly in the engine output owing to purge control, it is also appropriate to provisionally determine whether or not there is an anomaly in the evaporative fuel concentration sensor and then determine according to another method guaranteeing higher precision whether or not the anomaly in the evaporative fuel concentration sensor has actually occurred.

The second embodiment of the operation of detecting an anomaly in the intake-oxygen concentration sensor of the invention will now be described.

The aforementioned first embodiment is designed to stop intake-$O_2$ purge control upon detection of an anomaly in the intake-oxygen concentration sensor and perform purge on the basis of exhaust-$O_2$ purge control. As described above, however, since exhaust-$O_2$ purge control exhibits lower responding performance than intake-$O_2$ purge control, abrupt purge on an extended scale causes a problem of instability of the air-fuel ratio of the engine.

On the other hand, even if it is determined that there is an anomaly in the intake-oxygen concentration sensor, it is not always possible to conclude that there is an anomaly in the intake-oxygen concentration sensor. For example, an anomaly in intake-$O_2$ purge control may have occurred as a result of errors in regard to pressure-based correction of the output from the intake-oxygen concentration sensor even though the intake-oxygen concentration sensor itself is in normal operation.

That is, the output from the intake-oxygen concentration sensor demonstrates pressure dependency. Even if the concentration of oxygen is constant, the output from the sensor changes in response to a change in intake pressure. In order to prevent such a situation, intake-$O_2$ purge control usually adopts a value obtained by correcting the output from the intake-oxygen concentration sensor on the basis of a pressure in the intake passage. First of all, it will be described with reference to FIG. 6 how the pressure and the sensor output change in the case where standard air (with an oxygen concentration of 21%) is measured by means of a general-purpose oxygen concentration sensor.

In general, the oxygen concentration sensor outputs an output RP that changes in proportion to the partial pressure of oxygen contained in air. Therefore, even if the concentration of oxygen is constant, the output from the oxygen concentration sensor also changes in proportion to the pressure. That is, if it is assumed as shown in FIG. 6 that the axis of ordinate represents sensor output RP and that the axis of abscissa represents pressure PM of detection-target gas (i.e., air), the relation between sensor output and pressure, namely, the output characteristics can be indicated by a straight line extending past the origin (RP=0, PM=0).

Figure 6:
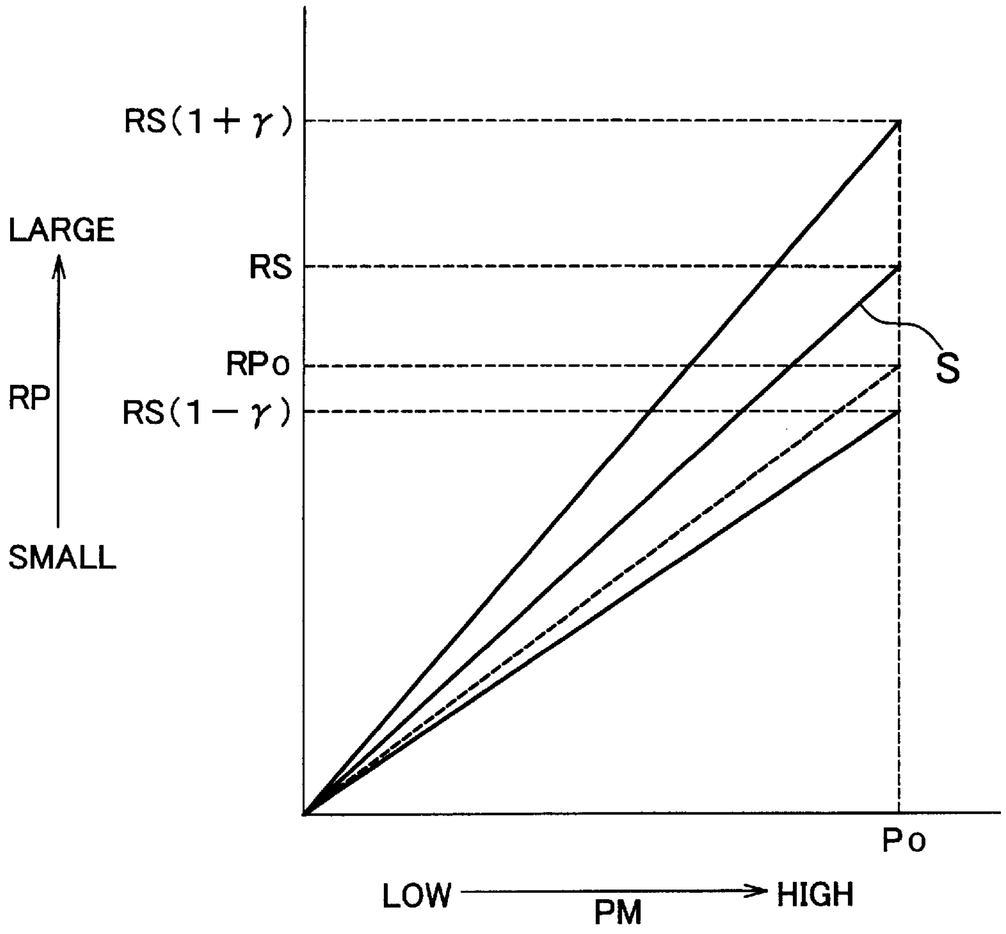
FIG. 6 is an explanatory view of a relation that is generally established between output of the intake-oxygen concentration sensor and pressure of intake gas.

In FIG. 6, a straight line S represents reference characteristics. The reference characteristics S are sensor output characteristics in relation to pressure in an ideal case where there is no error in the sensor output. As described above, if the intake-oxygen concentration sensor is in normal operation, its output characteristics can be indicated actually by a straight line extending past the origin. However, it is rare for the output from the oxygen concentration sensor to coincide with the reference characteristics completely. The gradient of the output characteristics also differs among individual products due to the dispersion of the output characteristics among them. Only those oxygen concentration sensors whose dispersion of the output characteristics among individual products is within a range defined by a predetermined tolerance $\alpha$ are actually employed. As shown in FIG. 6, the tolerance $\alpha$ is expressed as a ratio of deviation of the sensor output RP from an output RS according to the reference characteristics in the case where air assuming a standard state (with an oxygen concentration of 21%) at the atmospheric pressure is measured. That is, the output RP from an oxygen concentration sensor actually employed in the case where standard air is measured at the atmospheric pressure is always within a range defined by an inequality $RS\times(1-\gamma)<RP<RS\times(1+\gamma)$. A tolerance $\gamma$ of the dispersion among sensors is set as a maximum value on the condition that the influence that is exerted upon air-fuel ratio, EGR control, or the like in the case where an oxygen concentration sensor is employed be confined to an allowable range. That is, the gradient of the actual sensor output characteristics is set in such a manner as to range from the gradient of the reference characteristics multiplied by $(1-\gamma)$ to the gradient of the reference characteristics multiplied by $(1+\gamma)$.

Thus, the output from the oxygen concentration sensor is dispersed among individual products within the range defined by the tolerance $\gamma$. In reality, however, an operation of correcting output characteristics of the sensors in concordance with the reference characteristics is performed, and the performance of control is based on the sensor outputs that have been corrected. This correction is made, for example, by preliminarily calculating a ratio of the output RS in a standard state at the atmospheric pressure according to the reference characteristics to an output $RP_0$ from each sensor at the time of measurement of air in a standard state at the atmospheric pressure, and multiplying the output from each sensor by the ratio thus calculated.

That is, the output characteristics of the oxygen concentration sensor are always indicated by a straight line. The straight line indicating the output characteristics extends past the origin as long as the sensor is in normal operation. Therefore, as shown in FIG. 6, if a certain sensor has output characteristics in which the output at the atmospheric pressure is $RP_0$, the post-correction output is made to coincide with the reference characteristics (FIG. 6, the characteristics S) by using $RP\times RS/RP_0$ instead of the sensor output RP. Therefore, as long as the respective control operations are performed on the basis of the post-correction output characteristics, the dispersion of the output characteristics among individual sensor products within the range defined by the tolerance poses no problem at all in performing the control operations.

In some cases, however, if this pressure-based correction is erroneous, the sensor output does not coincide with the actual concentration of oxygen contained in intake gas.

Thus, the second embodiment is designed to continue purge on the basis of exhaust-$O_2$ purge control once it is determined that there is an anomaly in the intake-oxygen concentration sensor, to determine according to another method whether or not there is actually an anomaly in the intake-oxygen concentration sensor, and to resume intake-$O_2$ purge control if it is determined that there is no anomaly in the sensor itself. Thus, even in the case where intake-$O_2$ purge control is canceled on the ground that an anomaly in the intake-oxygen concentration sensor has been detected, intake-$O_2$ purge control can be resumed if it becomes apparent through re-inspection that there is no anomaly in the intake-oxygen concentration sensor.

Figure 3A:
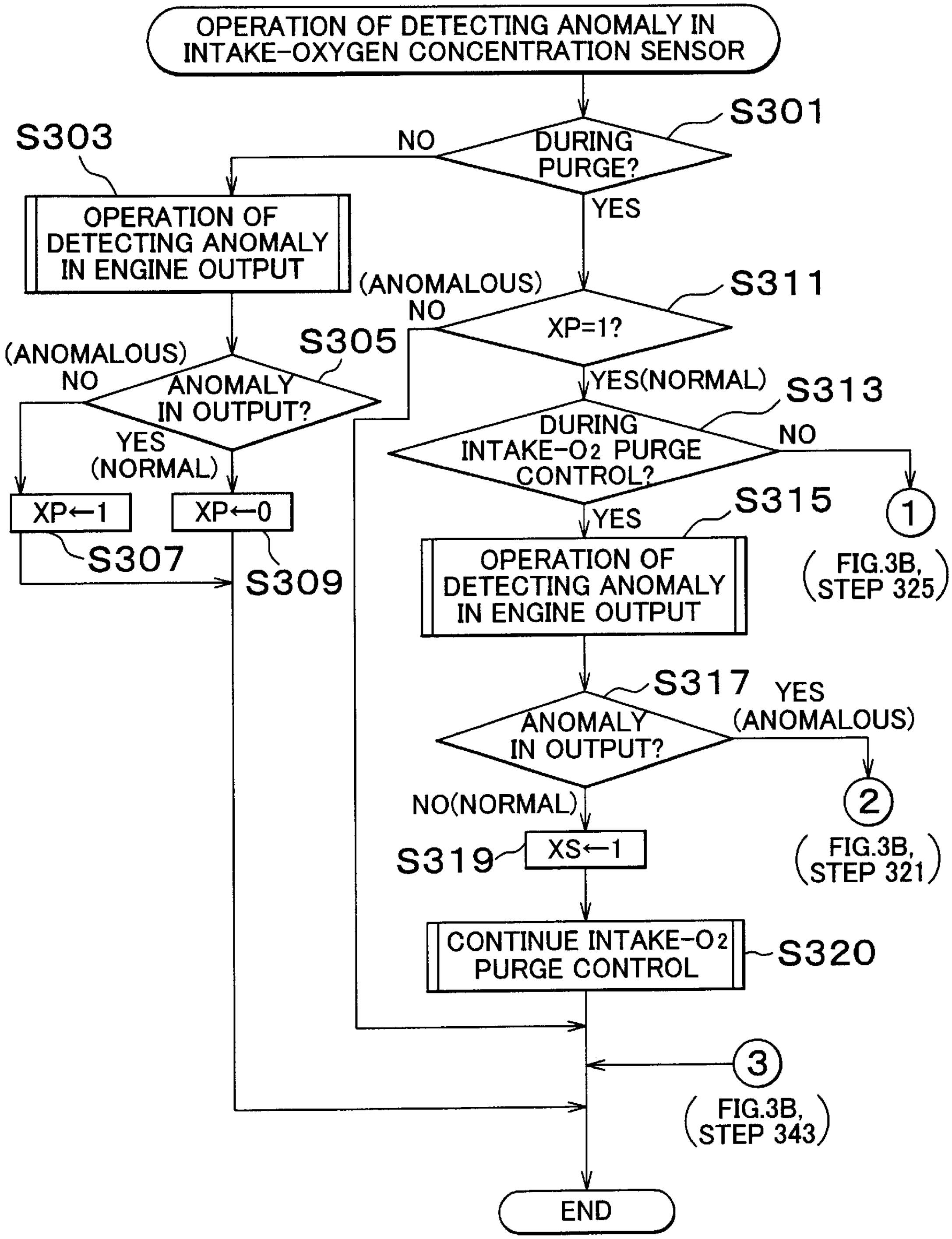
FIGS. 3A and 3B are flowcharts for explaining an operation that is performed according to a second embodiment of the invention so as to detect an anomaly in the intake-oxygen concentration sensor.
Figure 3B:
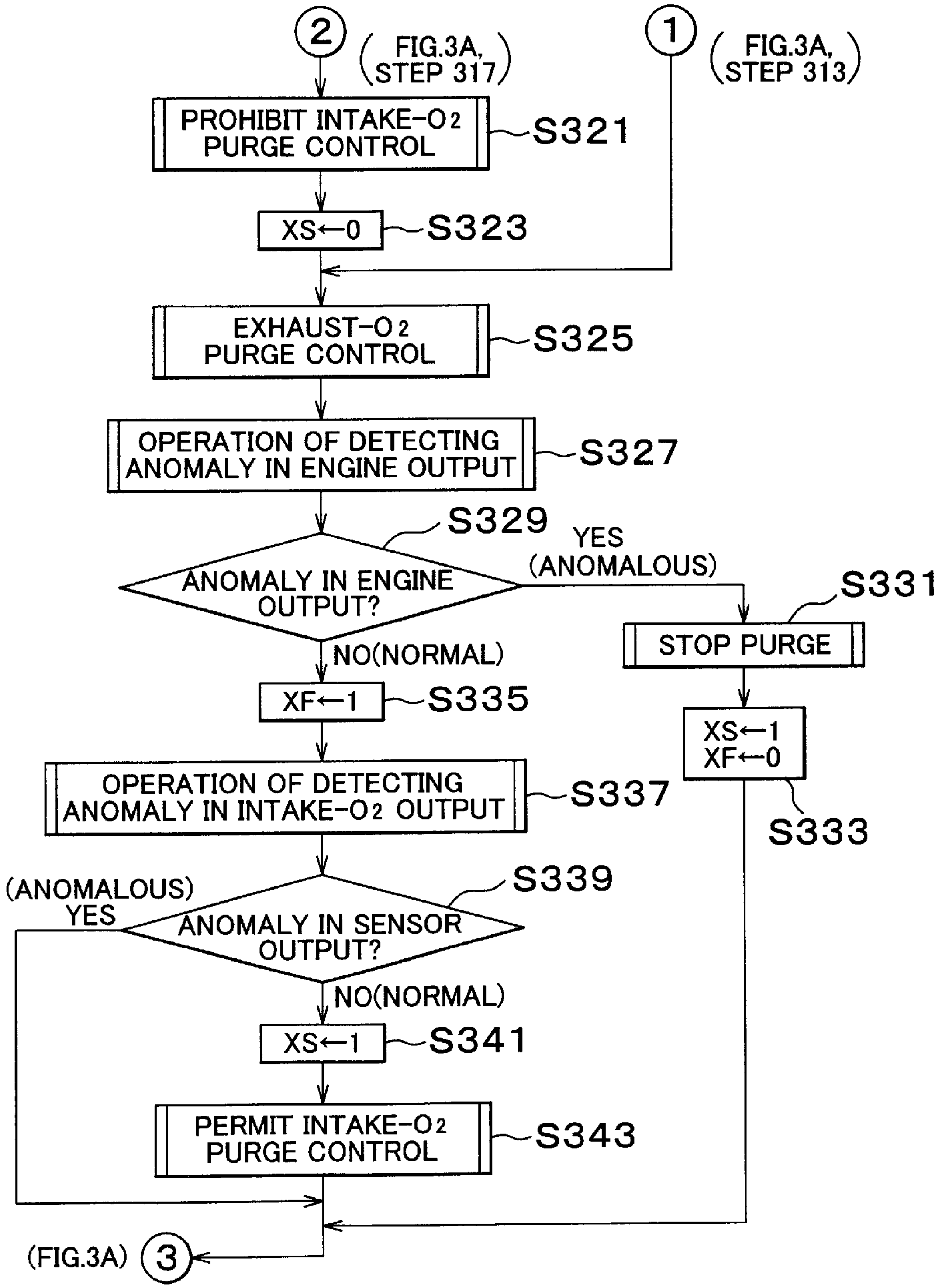

FIGS. 3A and 3B are flowcharts for explaining an operation of detecting an anomaly in the intake-oxygen concentration sensor according to the second embodiment of the invention. This operation is performed on the basis of a routine that is executed by the ECU 30 at intervals of a certain period. The processings in steps 301 to 320 shown in FIG. 3A are identical with the processings in steps 201 to 221 shown in FIG. 2 and thus will not be described below.

In this embodiment as well, if an anomaly in the engine output is detected in step 317 because of the performance of intake-$O_2$ purge control despite a normal engine output during stoppage of intake-$O_2$ purge control, intake-$O_2$ purge control is canceled in step 321 shown in FIG. 3B. A flag XS for indicating an anomaly in the intake-oxygen concentration sensor is then set as 0 (anomalous) in step 323, and exhaust-$O_2$ purge control is performed in step 325. The processing in step 325 shown in FIG. 3B includes the processings in steps 227, 229, and 231 shown in FIG. 2.

In the second embodiment, it is determined again during exhaust-$O_2$ purge control in step 325 shown in FIG. 3B whether or not there is an anomaly in the engine output. That is, it is determined again in step 327 whether or not there is an anomaly in the engine output, according to the same method as in step 303. If an anomaly in the engine output is detected in step 329, that is, if an anomaly in the engine output is still detected during purge based on exhaust-$O_2$ purge control, an anomaly in the engine output which occurred last time during intake-$O_2$ purge control may result not from an anomaly in the intake-oxygen concentration sensor but from another factor (e.g., an anomaly in the purging device itself). Therefore, in this case, the purge control valve 41 is closed in step 331 so as to stop purge. In step 333, the flag XS for indicating an anomaly in the intake-oxygen concentration sensor is reset as 1 (normal), and a flag XF for indicating an anomaly in purge is set as 0. If XF=0, it follows that there is an anomaly in a purge system other than the intake-oxygen concentration sensor.

On the other hand, if there is no anomaly in the engine output, it is assumed that the anomaly in the engine output which was detected last time is ascribable to an anomaly in the intake-oxygen concentration sensor. In step 335, the flag XF is set as 1 so as to indicate that there is no anomaly in purging component members other than the intake-oxygen concentration sensor.

It is then determined in step 337 whether or not there is an anomaly in the output from the intake-oxygen concentration sensor. As described above, the output from the intake-oxygen concentration sensor demonstrates pressure dependency. Even if the concentration of evaporative fuel contained in intake gas is constant, the output from the intake-oxygen concentration sensor changes in accordance with the intake pressure. However, as long as the sensor output assumes a normal value, the sensor output, a certain percentage of which is the concentration of oxygen contained in intake gas, changes in proportion to the intake pressure. That is, according to a graph in which the axes of ordinate and abscissa represent sensor output and intake pressure (absolute pressure) respectively, if the concentration of oxygen contained in intake gas is constant, the sensor output is invariably represented by a straight line extending past the origin (intake pressure=0, sensor output=0).

In step 337, if the intake pressure changes as a result of a change in the operational state of the engine in a purge-cutoff period during exhaust-$O_2$ purge control, outputs from the intake-oxygen concentration sensor before and after the change in intake pressure are read. Depending on whether or not a straight line connecting each of these two sensor outputs with a detection point of a corresponding one of the intake pressures extends past the origin, it is then determined whether or not the output from the intake-oxygen concentration sensor is normal. A method of determining whether or not there is an anomaly in the output from the intake-oxygen concentration sensor will be described later. However, the aforementioned embodiment may be designed to determine whether or not the output from the intake-oxygen concentration sensor is normal, according to any method other than the aforementioned one.

In step 339, if there is an anomaly in the output from the intake-oxygen concentration sensor, that is, if each of the two points of measurement detected in step 337 is not on a straight line extending past the origin, the present routine is terminated immediately. Thereby, the flag XS is maintained at 0 (anomalous), and exhaust-$O_2$ purge control is continued.

If the output from the intake-oxygen concentration sensor is normal in step 339, the flag XS is reset as 1 (normal) in step 341. Intake-$O_2$ purge control is then resumed. In this case, intake-$O_2$ purge control is resumed, for example, after canceling purge temporarily so as to create a state free from the influence of evaporative fuel, measuring sensor outputs at different intake pressures, and performing a pressure-based correction of the sensor outputs again.

As described hitherto, the second embodiment is designed to determine according to a different method whether or not there is actually an anomaly in the intake-oxygen concentration sensor, even once it has been determined on the basis of an engine output that there is an anomaly in the intake-oxygen concentration sensor. Intake-$O_2$ purge control is resumed if there is no anomaly. Therefore, intake-$O_2$ purge control exhibiting high responding performance is more likely to be performed during purge. As a result, the fuel injection amount is corrected with precision during purge.

The third embodiment of the invention will now be described with reference to FIGS. 4 to 8. FIGS. 4 to 8 are flowcharts of control routines that are executed in this embodiment. An air-fuel ratio control device of this embodiment can be realized by making the ECU execute the routines in the system configuration shown in FIG. 1.

Figure 4:
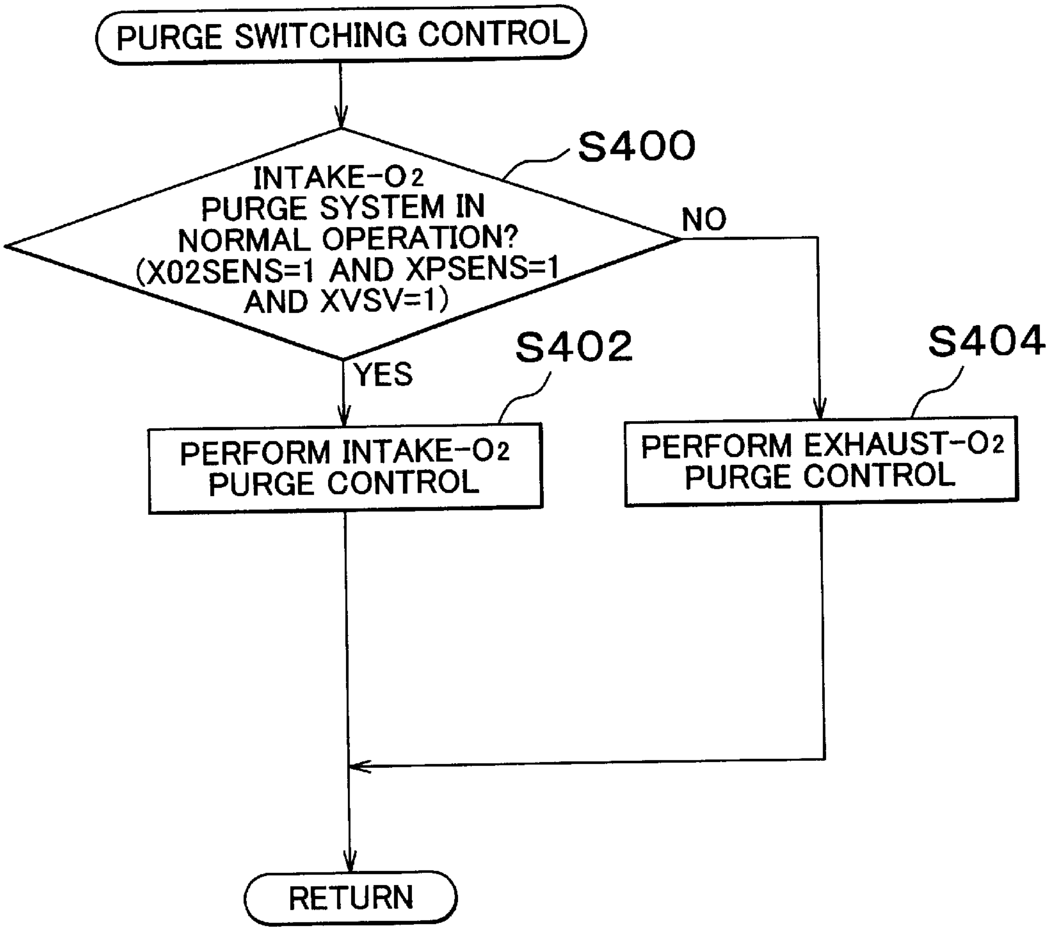
FIG. 4 is a flowchart for explaining purge-switching control that is performed according to a third embodiment of the invention.

FIG. 4 is a flowchart of a basic control routine (purge-switching control routine) that is executed by the ECU 30 in this embodiment.

In the routine shown in FIG. 4, it is first determined whether or not an intake-$O_2$ purge system is in normal operation (step 400).

The intake-$O_2$ purge system means a system that is required for the performance of intake-$O_2$ purge control. More specifically, the intake-$O_2$ purge system is composed of the purging device 40, the purge control valve 41, the intake-oxygen concentration sensor 31, the intake-pressure sensor 33, and the like.

In step 400 mentioned above, it is determined whether or not the following three conditions are fulfilled. If all the conditions are fulfilled, it is determined that the intake-$O_2$ purge system is in normal operation.

These conditions are:

(1) that a flag X02SENS for indicating that the intake-oxygen concentration sensor 31 is in normal operation is set as 1;

(2) that a flag XPSENS for indicating that the intake-pressure sensor 33 is in normal operation is set as 1; and (3) that a flag XVSV for indicating that the purge control valve 41 is in normal operation is set as 1.

Processings of setting the aforementioned flags will be described later with reference to FIGS. 6 to 8.

If it is determined in step 400 mentioned above that the intake-$O_2$ purge system is in normal operation, the performance of intake-$O_2$ purge control is selected (step 402)

As described with regard to the first embodiment, intake-$O_2$ purge control is designed to decreasingly correct the fuel injection amount by the amount of evaporative fuel purged on the basis of a value detected by the intake-oxygen concentration sensor 31 while controlling the purge control valve 41 appropriately. If the intake-$O_2$ purge system is in normal operation, the aforementioned processings are performed, whereby it becomes possible to purge the purging device 40 of a large amount of evaporative fuel while the air-fuel ratio is controlled with precision in such a manner as to assume a value close to the target air-fuel ratio.

In the routine shown in FIG. 4, if it is determined in step 400 mentioned above that the intake-$O_2$ purge system is not in normal operation, the performance of intake-$O_2$ purge control is stopped so as to select the performance of exhaust-$O_2$ purge control (step 404).

Exhaust-$O_2$ purge control performed in the aforementioned first and second embodiments is designed to calculate the amount GF of fuel injection by correcting the base fuel injection amount GFB by means of the air-fuel ratio feedback correction coefficient FAF and the learning correction coefficient EFKG while controlling the purge control valve 41 appropriately with a view to achieving a desired purge ratio. On the other hand, exhaust-$O_2$ purge control performed in the third embodiment is designed to allow purge on a further extended scale as well as suppression of a deviation in the air-fuel ratio by calculating a fuel injection amount (a fuel injection period TAU) during purge through introduction of a vapor concentration-learning coefficient FGPG in addition to FAF and EFKG while controlling the purge control valve 41 appropriately with a view to achieving a desired purge ratio.

A method of calculating the fuel injection period TAU by means of the ECU 30 during the performance of exhaust-$O_2$ purge control will now be described with reference to the flowchart shown in FIG. 5.

Figure 5:
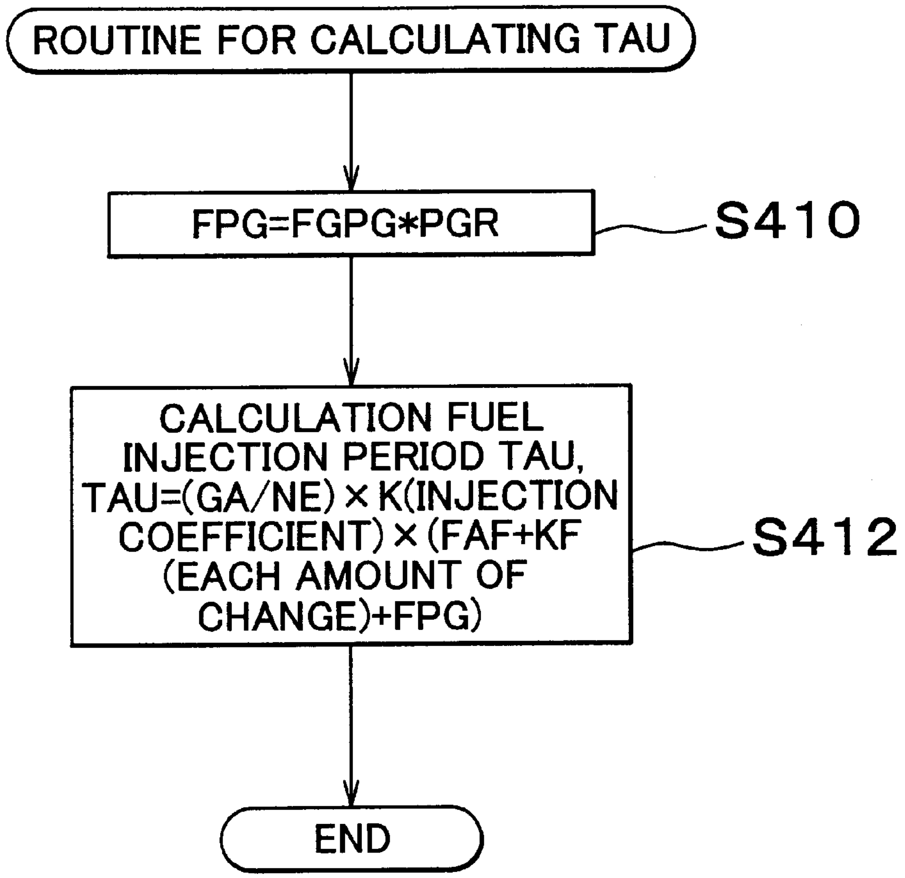
FIG. 5 is a flowchart for explaining a processing that is performed according to the third embodiment of the invention so as to calculate a fuel injection period.

The routine shown in FIG. 5 is designed to first calculate a purge correction coefficient FPG according to an equation (3) (step 410).

$$FPG=FGPG^{x}PGR \tag{3}$$

The vapor-concentration correction coefficient FGPG in the equation (3) represents the degree of correction to be made for the fuel injection period TAU when the purge rate PGR is 1%. The purge rate PGR is the ratio of flow rate of gas flowing into the intake passage 10 through the purge control valve 41 to amount GA of intake gas. That is, the purge rate PGR is the ratio of purge amount GPGR to amount GA of intake gas and thus is expressed as GPGR/GA.

In this embodiment, the aforementioned vapor-concentration correction coefficient FGPG is learned according to the following procedures. That is, if purged evaporative fuel enters the intake passage 10 during stoppage of intake-$O_2$ purge control in the configuration shown in FIG. 1, the air-fuel ratio of the mixture is affected thereby and changes. As a result, the mean value of the air-fuel ratio feedback correction coefficient FAF starts shifting from a reference value in such a direction that the air-fuel ratio becomes richer. The vapor-concentration learning coefficient FGPG is updated appropriately such that a smoothed value FAFAV of the air-fuel ratio feedback correction coefficient FAF approaches a reference value for the air-fuel ratio feedback correction coefficient FAF. The aforementioned updating makes it possible to eliminate the influence of purge of evaporative fuel by the vapor-concentration learning coefficient FGPG, that is, to adjust the vapor-concentration learning coefficient FGPG in concordance with the influence of purge exerted upon the fuel injection period TAU. The aforementioned equation (3) makes it possible to calculate a correction amount for the fuel injection period TAU in relation to the current purge ratio PGR, as a purge correction coefficient FPG.

In the routine shown in FIG. 5, the fuel injection period TAU is calculated according to an equation (4) shown below (step 412).

$$TAU=(GA/NE)^{x}K^{x}(FAF+KF+FPG) \quad (4)$$

In the equation (4), NE, K, and KF represent engine speed, injection coefficient, and amount of change, respectively. It is to be noted herein that the aforementioned air-fuel ratio learning coefficient EFKG is included in the amount KF of change.

According to the equation (4), a base fuel injection period can be calculated by dividing the amount GA of intake gas by the engine speed NE and multiplying the quotient by the injection coefficient. The fuel injection period TAU for achieving a desired air-fuel ratio can be calculated with precision by correcting the base fuel injection period by means of the air-fuel ratio feedback correction coefficient FAF or the purge correction coefficient FGPG.

Unlike the case of exhaust-$O_2$ purge control performed in the first and second embodiments, the aforementioned exhaust-$O_2$ purge control is designed to eliminate the influence of purge by the purge correction coefficient FPG, namely, by the vapor-concentration learning coefficient FGPG, thus making it possible to perform purge on an extended scale without waiting for the air-fuel ratio feedback correction coefficient FAF to follow. Thus, in comparison with the case where exhaust-$O_2$ purge control is performed by itself in the first and second embodiments, exhaust-$O_2$ purge control performed in the third embodiment can achieve higher purging performance.

In the first and second embodiments, in the case where purge control is performed by means of the intake-oxygen concentration sensor 31, an anomaly in the intake-oxygen concentration sensor 31 is detected at an early stage so that appropriate measures can be taken according to the type of the anomaly. In addition to the aforementioned embodiments, in the case where an EGR passage 53 connecting the surge tank 10*a* in the intake passage 10 to the exhaust manifolds 21*a*, 21*b* of the engine 1 is provided as shown in FIG. 1 or where EGR is carried out, the ECU 30 may perform feedback control of the opening of the EGR valve 51 such that the concentration of oxygen detected by the intake-oxygen concentration sensor 31 assumes a predetermined value corresponding to the operational state. Thereby, the amount of EGR, that is, the flow rate of exhaust gas recirculated into the intake passage 10 through the EGR valve 51 is always controlled in such a manner as to assume an optimal value corresponding to the operational state. As described hitherto, the intake-oxygen concentration sensor 31 plays an important role in controlling the air-fuel ratio of the engine. Therefore, if there is a malfunction in the sensor 31, instability of the air-fuel ratio of the engine may cause deterioration in the engine performance or emission properties. Thus, this embodiment is designed to determine whether or not there is a malfunction in the intake-oxygen concentration sensor 31 and detect a malfunction in the sensor 31 at an early stage, according to a method that will be described hereinafter.

This third embodiment is designed to determine whether or not there is a malfunction in the sensor, on the basis of the characteristics according to which the aforementioned post-correction output from the oxygen concentration sensor changes in accordance with changes in pressure, namely, on the basis of the output characteristics of the post-correction sensor output shown in FIG. 6. That is, the change in the post-correction sensor output in relation to the pressure ought to be coincident with the reference characteristics S shown in FIG. 6 due to the correction. Thus, if the output characteristics of the post-correction sensor output deviate from the reference output characteristics to a certain extent or more, it is possible to determine that there is a malfunction in the sensor.

A method of determining whether or not there is a malfunction in the intake-oxygen concentration sensor according to this embodiment will now be described. In the following description, "the output from the oxygen concentration sensor" and "the output characteristics of the sensor" mean the output after correction of the aforementioned dispersion among individual products and the characteristics according to which the post-correction output changes in relation to the pressure, respectively.

Figure 7:
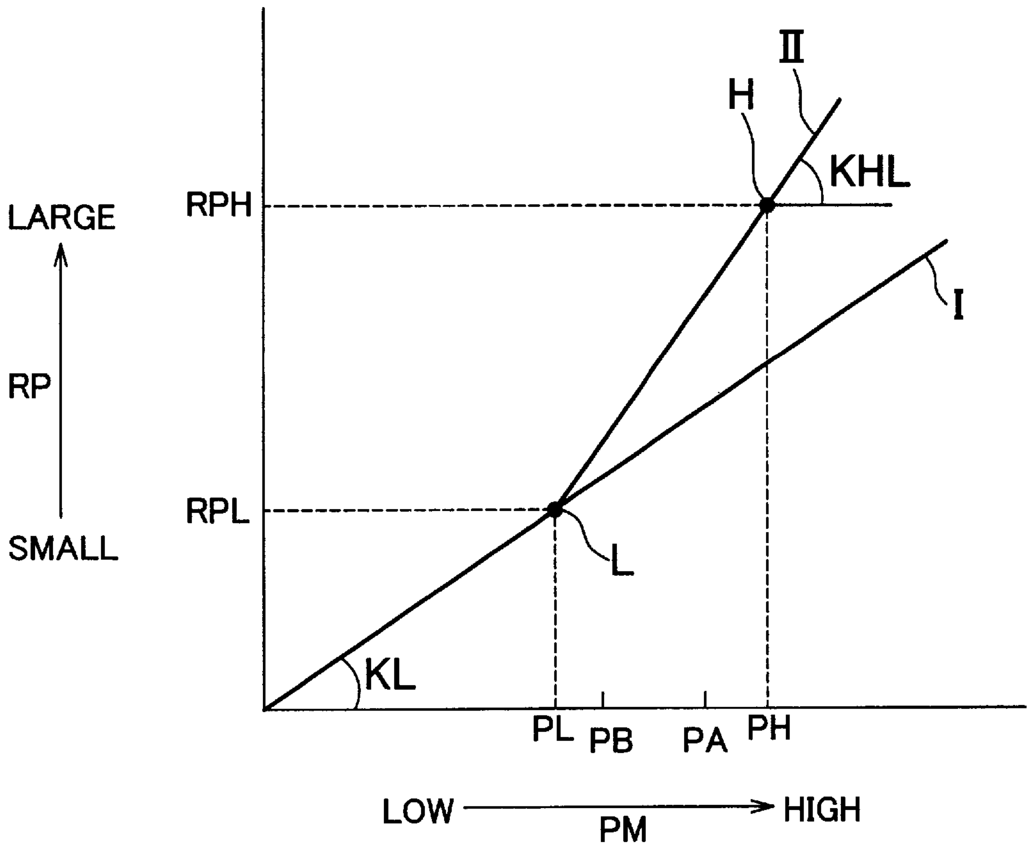
FIG. 7 is an explanatory view of the principle of determining whether or not there is an anomaly in the intake-oxygen concentration sensor according to the embodiments of the invention.

FIG. 7 is an explanatory view of a method of determining whether or not there is a malfunction in the intake-oxygen concentration sensor according to this embodiment. In FIG. 7, the axes of ordinate and abscissa represent sensor output RP and intake pressure PM, respectively. It is assumed herein that the output from the intake-oxygen concentration sensor is RPH when the intake pressure PM during operation of the engine is PH and that the sensor output is RPL when the intake pressure is PL (PH>PL). It is assumed herein that a point indicated by a coordinate (PL, RPL) in FIG. 7 is referred to as L and that a point indicated by a coordinate (PH, RPH) in FIG. 7 is referred to as H.

In this case, if the sensor is in normal operation, the sensor output and the intake pressure establish a relation expressed by a straight line extending past the origin (PM=0, RP=0). Therefore, the relation between sensor output and pressure ought to be expressed, for example, by a straight line connecting the origin with the point (PL, RPL) (i.e., a straight line I in FIG. 7). In this case, the output characteristics have a gradient KL, which is obtained from an equation KL=RPL/PL.

On the other hand, a straight line connecting two points of actual measurement, that is, a straight line connecting the point H with the point L (i.e., a straight line II in FIG. 7) has a gradient KHL, which is obtained from an equation KHL=(RPH−RPL)/(PH−PL).

Accordingly, if the sensor is in normal operation, there is established a relation KHL=KL, and the ratio of KHL to KL, namely, KHL/KL is equal to 1.

If there is a malfunction in the sensor, the sensor does not exhibit output characteristics according to a straight line extending past the origin. Therefore, it does not follow that KHL=KL. The actual output characteristics of the sensor deviate from the straight line extending past the origin further in proportion to an increase in the difference between the ratio of the gradient KHL to the gradient KL, namely, KHL/KL and 1.

In this embodiment, the ratio of the gradient KHL to the gradient KL, namely, KHL/KL is used as a characteristic value representing the output characteristics of the sensor. If this characteristic value is equal to or greater than an upper-limit value (1+γ) or equal to or smaller than a lower-limit value (1−β), it is determined that there is a malfunction in the sensor. It is to be noted herein that γ is a tolerance for the dispersion among individual products of the aforementioned sensor (γ>0) and that β is set as a positive value greater than γ (β>γ>0).

First of all, it will be described why the upper-limit value of the characteristic value KHL/KL for determining that the sensor is in normal operation is set equal to the tolerance for the dispersion among individual products.

It is when the gradient of the actual output characteristics of the sensor, namely, KHL is greater than the gradient KL of the reference output characteristics that the characteristic value KHL/KL is greater than 1 and that the upper-limit value gains a meaning. That is, if it is assumed in FIG. 7 that the reference output characteristics are expressed by a straight line connecting the origin with the point L, the upper-limit value gains a meaning in the case where the actual sensor-output characteristics connecting the point H with the point L comply with the straight line II shown in FIG. 7. The concentration of oxygen contained in intake gas in a real engine may become equal to or lower than the concentration of oxygen contained in the atmosphere because evaporative fuel is purged, because EGR is performed, or because gas discharged from a crank case is introduced into an intake passage by opening a PCV valve. However, the concentration of oxygen contained in intake gas does not become equal to or higher than the concentration of oxygen contained in standard air. Therefore, in determining a control-wise allowable increase in the gradient KHL of the actual output characteristics of the sensor with respect to the gradient KL of the reference output characteristics, there is no need to take into account the case where the concentration of oxygen has actually decreased due to the purge of evaporative fuel or the performance of EGR. Only if the case of standard air where the sensor output assumes a maximum value is taken into account, it is never determined that there is a malfunction in the sensor that is in normal operation. As described above, as a result of measurement in the standard atmosphere, the tolerance a for dispersion among sensor outputs is set as a maximum value within such a range that the influence of dispersion exerted upon control is allowable. In other words, the deviation in the sensor output is allowable unless the gradient (KHL) of the actual sensor output characteristics is equal to or greater than a value obtained by multiplying the gradient (KL) of the reference output characteristics by (1+γ).

The output characteristic value KHL/KL indicates a multiplication factor by which the gradient of the reference output characteristics is multiplied so as to obtain the gradient of the actual sensor output characteristics. Thus, if the upper-limit value of the output characteristics is set as (1+γ), even a deviation in the sensor output characteristics from the reference characteristics can be regarded as control-wise normal as long as the output characteristic value KHL/KL is smaller than the upper-limit value.

For this reason, this embodiment is designed to set the upper-limit value for determining that the output characteristic value is normal, using the tolerance γ for dispersion among individual products, that is, as (1+γ).

As described above, the sensor output and the sensor output characteristics, which are used to make determination in this embodiment, have already been corrected with regard to dispersion. Thus, according to this embodiment, the upper-limit value for determining whether or not there is a malfunction is set equal to the tolerance γ for dispersion. However, the aforementioned determination is not concerned with dispersion in output among individual sensors (within a normal range). The upper-limit value is set equal to the tolerance γ simply because of an agreement on the basic concept of a "control-wise insusceptible" range.

The tolerance for dispersion in output among individual oxygen concentration sensors is expressed as a ratio with respect to the reference sensor output in a standard state (e.g., in the case where intake gas is the atmosphere at 1 barometric pressure (760 mmHg)). If the output characteristic value, that is, the deviation in pressure-dependent characteristics of the sensor from a straight line exceeds the tolerance, it is determined that there is a malfunction in the sensor. As described above, since the reference pressure-dependent characteristic line of the sensor output is based on the case where intake gas is the atmosphere in the standard state, the concentration of oxygen contained in intake gas does not exceed a concentration of oxygen contained in the atmosphere in the standard state during actual operation. Therefore, if the output characteristic value becomes equal to or greater than the upper-limit value corresponding to the aforementioned tolerance for dispersion among individual products, it is possible to determine that there is a malfunction in the sensor.

As described above, in the case where the upper-limit value for determining that the sensor is in normal operation is set, it suffices to consider the case where the concentration of oxygen contained in intake gas is equal to the concentration of oxygen contained in the atmosphere. The lower-limit value used for detection of a malfunction is intended to determine whether or not there is a malfunction in which the sensor output becomes lower than the actual concentration of oxygen contained in intake gas. In this case, if gas discharged from the crank case is recirculated into the intake passage during operation of the engine because of the performance of EGR or purge or because of the opening of the PCV valve, the concentration of oxygen contained in intake gas actually becomes lower than the concentration of oxygen contained in the atmosphere. Therefore, the lower-limit valve used for detection of a malfunction is set in consideration of an actual decrease in the concentration of oxygen during the performance of EGR or purge, so as to prevent a situation in which it is determined as a result of a diagnosis made during the performance of EGR or purge that there is an anomaly in the sensor that is in normal operation. In setting the lower-limit value for determining that the sensor is in normal operation, purge of evaporative fuel or the performance of EGR must be taken into account. Thus, it can be determined even during the performance of EGR or purge whether or not there is a malfunction in the sensor. As a result, it is determined more often whether or not there is a malfunction in the sensor. During the performance of EGR or purge of evaporative fuel, the concentration of oxygen contained in intake gas is actually lower than the concentration of oxygen contained in the atmosphere. Therefore, even if the sensor is in normal operation, the output from the sensor is low and the gradient of the reference output characteristics is small in itself during the performance of EGR or purge of evaporative fuel. Thus, the simple steps of setting the lower-limit value equal to the tolerance γ for dispersion as in the case of the upper-limit value and determining that there is a malfunction in the sensor if the gradient of the sensor output characteristics is equal to or smaller than a value obtained by multiplying the gradient of the reference output characteristics by (1−γ) may sometimes lead to an incorrect conclusion that there is a malfunction in the sensor that is in normal operation.

Thus, this embodiment uses a value greater than $\gamma$, that is, $\beta$ as the lower-limit value so as to eliminate the possibility of making an erroneous determination even in the case where it is determined during the performance of EGR or purge of evaporative fuel whether or not there is a malfunction in the sensor. If the gradient of the output characteristics of the sensor becomes equal to or smaller than a value obtained by multiplying the gradient of the reference output characteristics by $(1-\beta)$, it is determined that there is a malfunction in the sensor.

It is to be noted herein that $\beta$ corresponds to a value in the case where the output has further deviated by an amount corresponding to the tolerance a with respect to the output characteristics of the sensor in normal operation in the case where the concentration of oxygen contained in intake gas is minimized due to the performance of EGR or purge of evaporative fuel.

In this manner, the output characteristic value (KHL/KL) representing a deviation in the output characteristics of the sensor that is in use from the reference characteristics is calculated and compared with the upper-limit and lower-limit values set as described above, whereby it becomes possible to determine, regardless of the performance or stoppage of EGR or purge of evaporative fuel, whether or not there is a malfunction in the sensor. As a result, it can be determined more often whether or not there is a malfunction in the sensor. Thus, it becomes possible to detect a malfunction in the sensor at an early stage.

An operation of detecting a malfunction in the sensor during actual operation of the engine will now be described.

If the intake pressure becomes higher than a predetermined pressure PA during operation of the engine, the ECU 30 reads an intake pressure PH and an output RPH (the point H in FIG. 7) from the intake-oxygen concentration sensor 31 at that moment. If the intake pressure becomes lower than a predetermined pressure PB during operation of the engine, the ECU 30 reads an intake pressure PL and an output RPL (the point L in FIG. 7) from the intake-oxygen concentration sensor 31 at that moment.

It is to be noted herein that the pressures PA, PB are set in such a manner as to space the points H and L shown in FIG. 7 apart from each other by a certain distance with a view to enhancing precision in calculating the gradient KHL of the output characteristics of the sensor. As long as relations PH>PA and PL<PB are established, the pressures PH, PL can be any arbitrary pressures.

After reading the pressures PH, PL and the outputs RPH, RPL, the ECU 30 calculates an amount (PH−PL) of change in intake pressure and an amount (RPH−RPL) of change in the output from the intake-oxygen concentration sensor between the points H, L, so as to calculate the aforementioned characteristic value KHL/KL. The ECU 30 then divides the amount (PH−PL) of change by the sensor output RPL corresponding to the point L and the amount (RPH−RPL) of change by the intake pressure PL corresponding to the point L, thus calculating a dimensionless amount ΔRP of change in sensor output and a dimensionless amount ΔP of change in intake pressure, respectively. That is, the following relations are established.

$$\Delta RP=(RPH-RPL)/RPL,\ \Delta P=(PH-PL)/PL$$

The output characteristic value KHL/KL is obtained by calculating ΔRP/ΔP according to an equation (5) shown below.

$$\Delta RP/\Delta P=((RPH-RPL)/RPL)/((PH-PL)/PL)=((RPH-RPL)/(PH-PL))/(RPL/PL)=KHL/KL \quad (5)$$

In this embodiment, if the characteristic value KHL/KL calculated as described above becomes equal to or greater than the upper-limit value $(1+\gamma)$ or equal to or smaller than the lower-limit value $(1-\beta)$, it is determined that there is a malfunction in the sensor.

Figure 8:
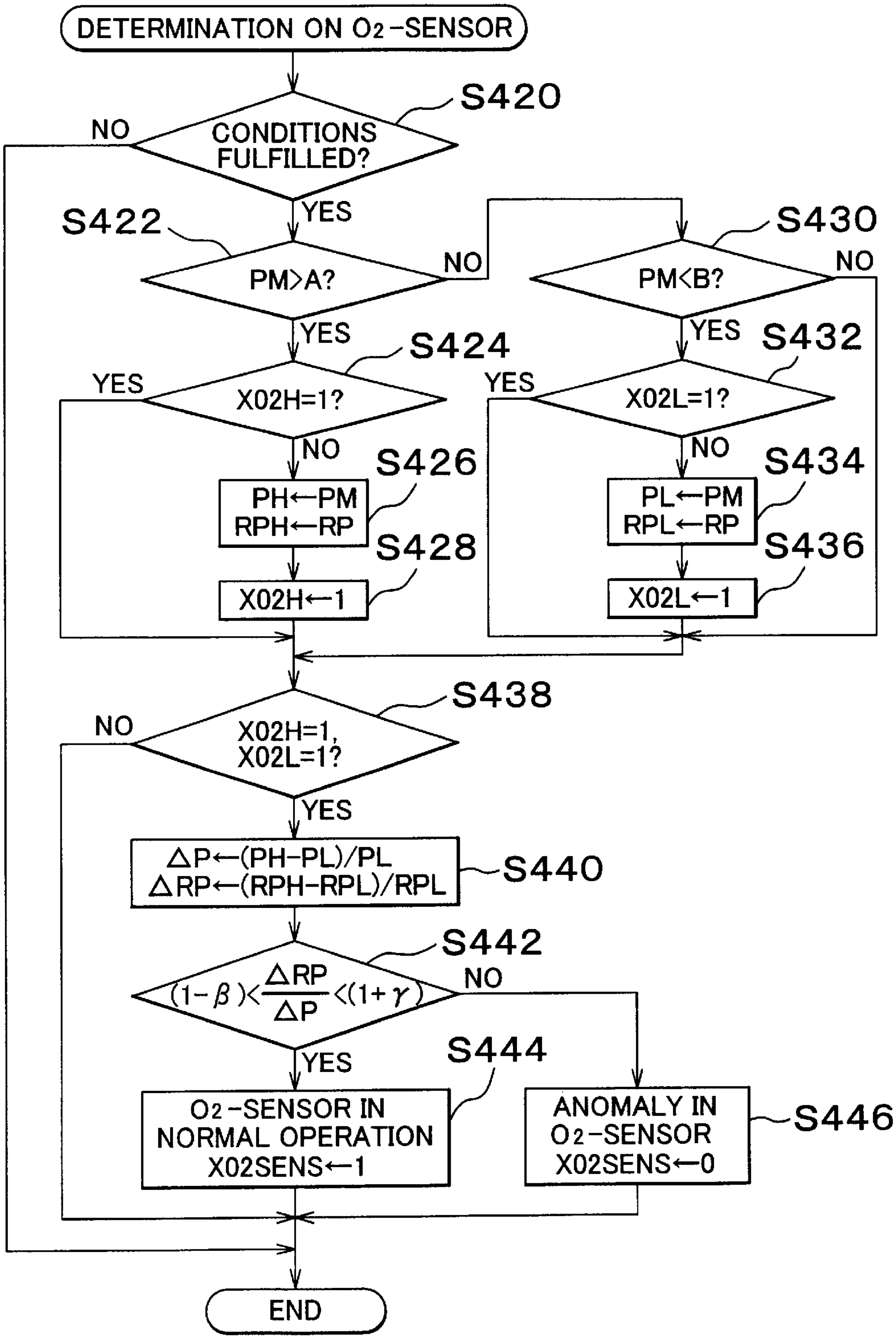
FIG. 8 is a flowchart for explaining an operation of determining whether or not there is an anomaly in the intake-oxygen concentration sensor.

FIG. 8 is a flowchart for explaining an actual operation of determining whether or not there is a malfunction in the sensor. More specifically, processings of setting the flags (X02SENS, XPSENS, and XVSV) used for the purge-switching control, as aforementioned in FIG. 4, as 1 or 0 are performed. This operation is performed as a routine that is executed by the ECU 30 at intervals of a certain period.

In the operation shown in FIG. 8, it is first determined in step 420 whether or not conditions for determining whether or not there is a malfunction in the intake-oxygen concentration sensor 31 are fulfilled at the moment. In this embodiment, the conditions for making a determination in step 420 are that the intake pressure sensor 33 is in normal operation and that the intake-oxygen concentration sensor 31 has been activated. It is determined whether or not the intake pressure sensor 33 is in normal operation, through a determining operation (not shown) performed separately by the ECU 30, for example, depending on whether or not the output from the intake pressure sensor 33 prior to the start of the engine is close to the atmospheric pressure. It is determined whether or not the intake-oxygen concentration sensor 31 has been activated, depending on whether or not if the intake-oxygen concentration sensor has generated an output after the start of the engine.

If the conditions for making a determination in step 420 are fulfilled, it is then determined in step 422 whether or not the current intake pressure PM detected by the intake pressure sensor 38 is higher than a predetermined value A. If PM>A, that is, if the intake pressure PM is a pressure allowing measurement on the high-pressure side (the point H in FIG. 7), it is then determined in step 424 whether or not the flag X02H has been set as 1. The flag X02H indicates whether or not the reading of an intake pressure and a sensor output on the high-pressure side (measurement at the point H in FIG. 7) has been completed. The flag X02H is set as 0 during the start of the engine. The flag X02H is set as 1 upon completion of measurement at the point H after the start of the engine.

If X02H≠1 in step 424, measurement on the high-pressure side has not been completed. Thus, in step 426, the current output PM from the intake pressure sensor 33 is stored as PH, and the output RP from the intake-oxygen concentration sensor 31 is stored as RPH. In step 428, the flag X02H is set as 1 so as to indicate that measurement on the high-pressure side (the point H in FIG. 7) has been completed. On the other hand, if X02H=1 in step 424, measurement on the high-pressure side has already been completed. Therefore, steps 426 and 428 are skipped.

If PM≦A in step 422, the current intake pressure is lower than pressures allowing measurement on the high-pressure side. Therefore, it is then determined in step 430 whether or not PM<B, that is, whether or not the intake pressure PM has decreased to a pressure allowing measurement on the low-pressure side (the point L in FIG. 7). If PM<B, processings in steps 432 to 436 are performed. If measurement on the low-pressure side has not been completed, the current output PM from the intake pressure sensor 33 and the current output RP from the intake-oxygen concentration sensor 31 are stored as measured values PL and RPL on the low-pressure side, respectively. A flag X02L for indicating that measurement on the low-pressure side has been completed is then set as 1.

It is then determined in step 438 whether or not both the flags X02H, X02L have been set as 1. If at least one of the measurements on the high-pressure side (the point H in FIG. 7) and the low-pressure side (the point L in FIG. 7) has not been completed. Therefore, the present routine is terminated without performing the processings of determination starting from step 440.

If both the flags X02H, X02L have been set as 1 in step 438, the acquisition of data on both the high-pressure and lower-side sides has been completed. Therefore, the operation of determining whether or not there is a malfunction in the sensor is performed in the processings starting from step 440.

That is, the aforementioned dimensionless amount ΔP of change in intake pressure is calculated in step 440 using the intake pressures PH, PL measured on the high-pressure side and the low-pressure side, according to an equation ΔP=(PH−PL)/PL. The dimensionless amount ΔRP of change in the output from the intake-oxygen concentration sensor is calculated in step 440 using RPH and RPL, according to an equation ΔRP=(RPH−RPL)/RPL. It is determined in step 442 whether or not the output characteristic value (ΔRP/ΔP) is between an upper-limit value (1+γ) and a lower-limit value (1−β).

If the output characteristic value is between the upper-limit value (1+γ) and the lower-limit value (1−β), it is determined that the sensor is in normal operation. A flag X02SENS for indicating the state of the sensor is set as 1 (normal) in step 425.

If the output characteristic value (ΔPR/ΔP) is equal to or greater than the upper-limit value (1+γ) or equal to or smaller than the lower-limit value (1−β), the flag X02SENS is set as 0 (malfunction) in step 427. If the flag X02SENS is set as 0, the performance of EGR control and the correction of the fuel injection amount, which are performed separately by the ECU on the basis of the output from the intake-oxygen concentration sensor 31 as described above, are prohibited. The warning lamp disposed close to the driver seat is then lit up, so that the driver is advised that a malfunction in the sensor has occurred.

As described above, this embodiment is designed to appropriately set the upper-limit value and the lower-limit value of the output characteristic value of the sensor in determining whether or not there is a malfunction. Thus, it can be determined even during the performance of EGR or purge whether or not there is a malfunction in the sensor. As a result, it is determined more often whether or not there is a malfunction in the sensor during operation.

Another method of determining whether or not there is a malfunction in the sensor will now be described.

According to the aforementioned method of determination, the lower-limit value used for determining whether or not there is a malfunction in the sensor is set as the same value (1−β), regardless of the performance or stoppage of EGR or purge. It is to be noted herein that β is set greater than γ in consideration of the case where the concentration of oxygen contained in intake gas has actually decreased due to EGR or purge. In reality, however, if a determination is made during stoppage of EGR or purge, the precision in detection may deteriorate because the lower-limit value is too small.

Thus, Another method of determination of the malfunction of the sensor is designed to change the lower-limit value used for making a determination depending on whether or not the acquisition of data on the sensor output and the intake pressure on the high-pressure and low-pressure sides has been made during the performance of EGR or purge. That is, the lower-limit value used for making a determination is set as (1−β) as in the case of the aforementioned embodiment if EGR or purge is performed during the acquisition of data. However, the lower-limit value is set as the lower-limit value (1−γ) of the dispersion among individual products of the sensor if the acquisition of data is made during stoppage of EGR or purge. Thus, during stoppage of EGR or purge, it is determined more accurately whether or not there is a malfunction in the sensor.

Figure 9A:
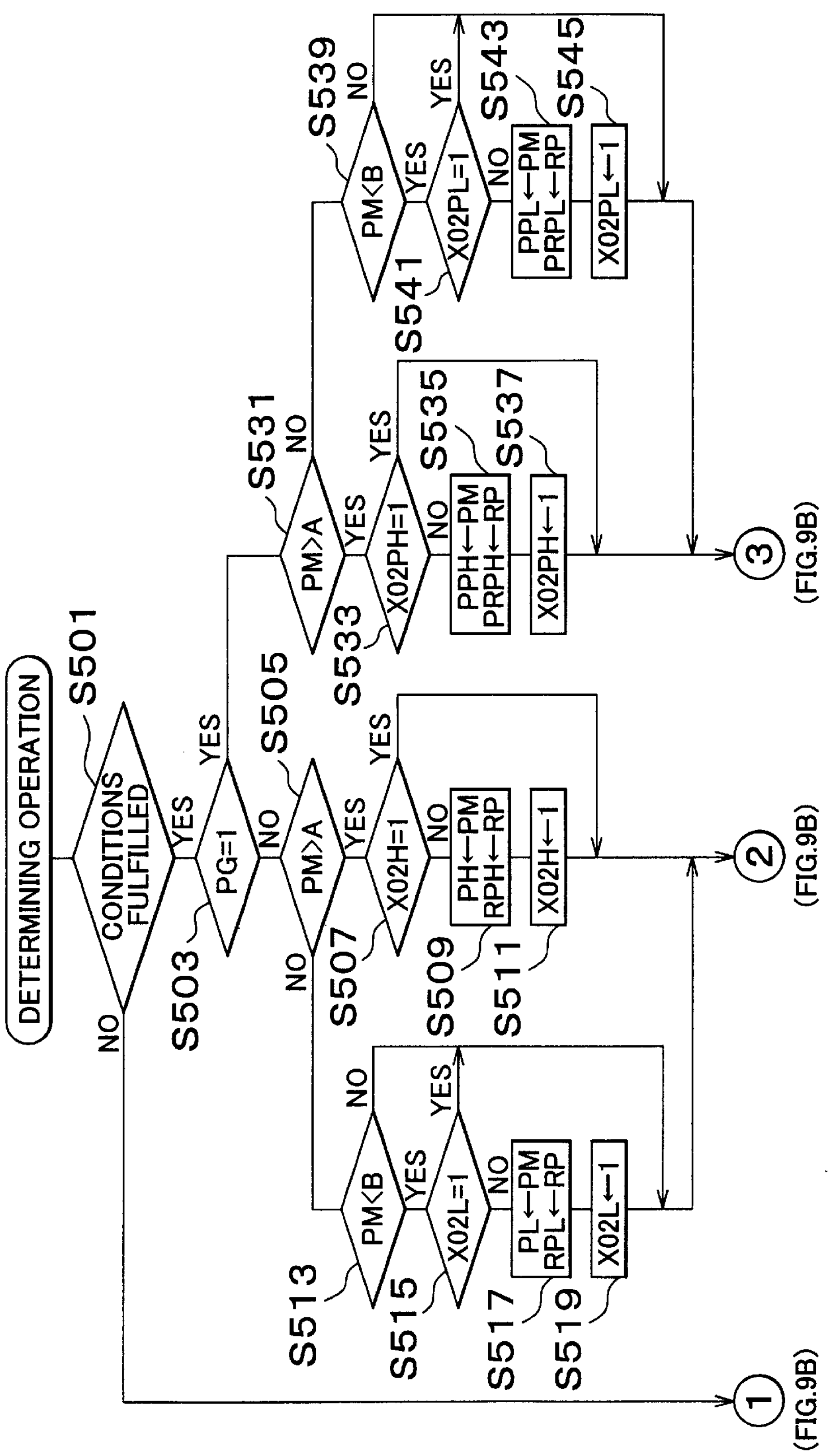
FIGS. 9A and 9B are flowcharts for explaining another operation of determining whether or not there is an anomaly in the intake-oxygen concentration sensor.
Figure 9B:
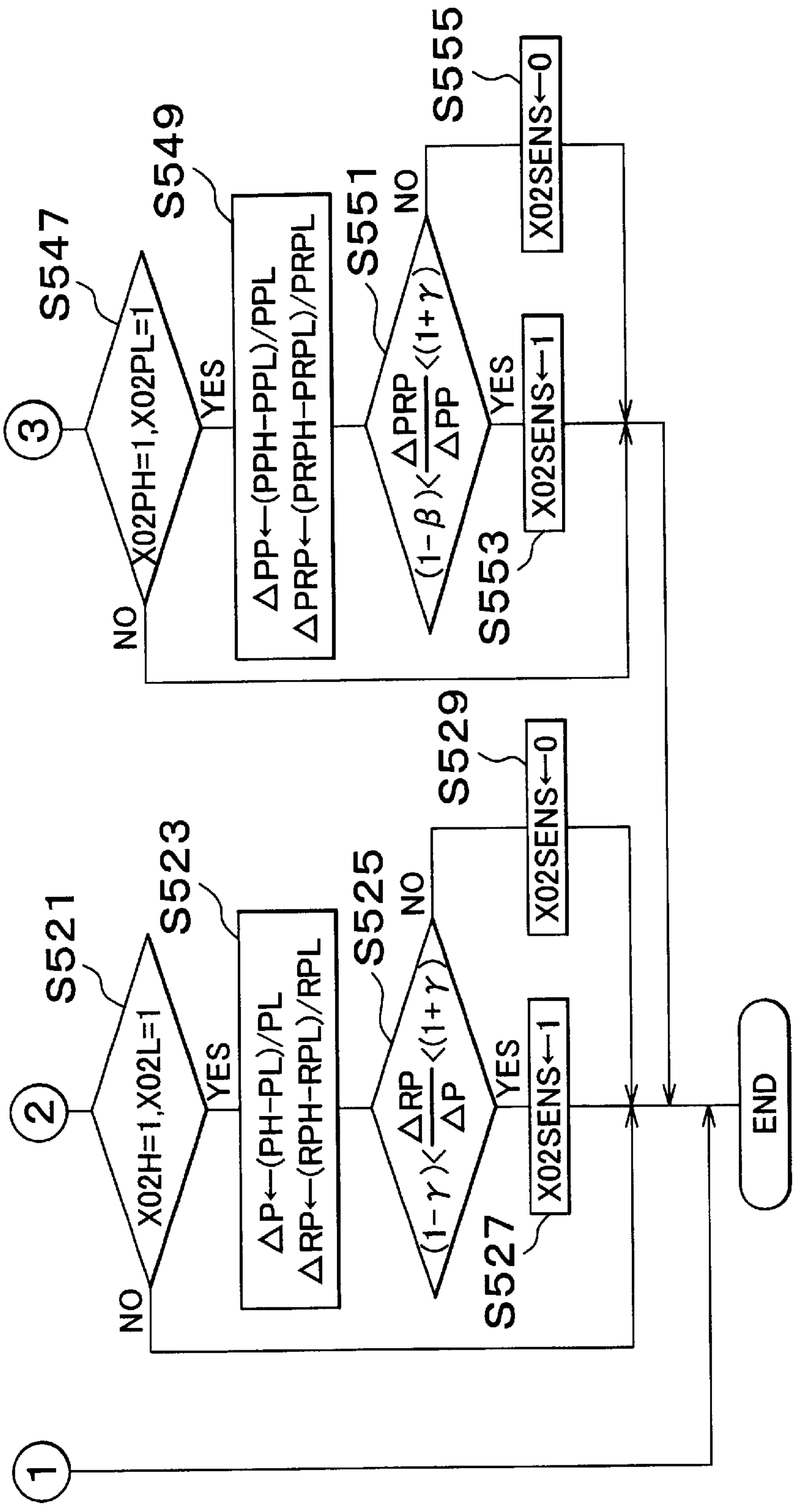

FIGS. 9A and 9B are flowcharts for explaining another method of determining whether or not there is a malfunction in the sensor.

The operation shown in FIG. 9A is performed on the basis of a routine that is executed by the ECU 30 at intervals of a certain period. In FIG. 9A, it is determined in step 501 whether or not the conditions for determining whether or not there is a malfunction in the sensor are fulfilled. The conditions in step 501 of FIG. 9A are the same as those in step 420 of FIG. 8.

It is then determined in step 503 whether or not a flag PG has been set as 1. The flag PG is set through an operation that is performed separately by the ECU 30. If an operation affecting the concentration of oxygen contained in intake gas, such as EGR or purge, is being performed, the flag PG is set as 1. If no such operation is being performed, the flag PG is set as 0.

If PG≠1 in step 503, that is, if EGR, purge, or the like is not being performed, outputs RPH, RPL from the oxygen concentration sensor at two different intake pressures and intake pressures PH, PL at that moment are read in steps 505 to 523. Upon completion of the acquisition of these data, an amount ARP of change in the sensor output and an amount ΔP of change in intake pressure are calculated as dimensionless values (step 523).

The processings in steps 505 to 523 are the same as those in steps 422 to 440 of FIG. 8, respectively. However, the processings in steps 505 to 523 are different in that they are performed only during stoppage of EGR or the like.

After calculation of ΔRP and ΔP during stoppage of EGR or the like as described above, an output characteristic value ΔRP/ΔP that is calculated on the basis of those values is compared with upper-limit and lower-limit values in step 525 of FIG. 9B as in the case of step 442 of FIG. 8, whereby it is determined whether or not there is a malfunction in the sensor. The determination in step 525 is designed to use (1+γ) as the upper-limit value as in the case of step 442 of FIG. 8 but use (1−γ) as the lower-limit value unlike the case of step 442 of FIG. 8.

That is, the sensor outputs RPH, RPL and the intake pressures PH, PL, which are used for a determination in step 525, are values obtained during stoppage of the operation affecting the concentration of oxygen contained in intake gas, such as EGR. The actual concentration of oxygen contained in intake gas is equal to the concentration of oxygen contained in the standard atmosphere. For this reason, when setting the lower-limit value, there is no need to take into account errors in determination resulting from EGR, purge, or the like. Therefore, as in the case of the upper-limit value, the lower-limit value is set on the basis of the tolerance γ for the dispersion in sensor output among individual products. Thus, it can be determined more accurately whether or not there is a malfunction in the sensor.

If an operation affecting the concentration of oxygen contained in intake gas, such as EGR or purge, is being performed in step 503, the processings in steps 531 to 549 are performed.

The processings in steps 533 to 549 are substantially the same as those in steps 505 to 523. However, the processings in steps 533 to 549 are different in that they are performed only during an operation affecting the concentration of oxygen contained in intake gas, such as EGR or purge. In order to distinguish the data acquired in steps 533 to 549 from the data acquired in steps 505 to 523, the sensor outputs and the intake pressures are stored in the name of PRPH, PRPL and PPH, PPL, respectively.

A flag X02PH indicates whether or not the acquisition of data on the high-pressure side during purge has been completed. A flag X02PL indicates whether or not the acquisition of data on the low-pressure side during purge has been completed. The flags X02PH, X02PL function in the same manner as the flags X02H, X02L in steps 505 to 523, respectively.

It is determined in step 547 of FIG. 9B whether or not the acquisition of both data PRPH, PPH on the high-pressure side and data PRPL, PPL on the low-pressure side during the operation such as EGR or purge has been completed. If the acquisition of data has been completed, the amount of change in sensor output and the amount of change in intake pressure are calculated in step 549 as dimensionless values. In this case as well, the amounts of change calculated in step 549 as dimensionless values are stored in the name of ΔPRP, ΔPP respectively, so as to be distinguished from the amounts of change calculated in step 523 as dimensionless values.

In step 551, an output characteristic value ΔPRP/ΔPP calculated on the basis of the aforementioned dimensionless amounts ΔPRP, ΔPP of change is compared with upper-limit and lower-limit values, whereby it is determined whether or not there is a malfunction in the sensor. The determination made in this case is based on the data acquired during purge and thus is designed to use $(1+\gamma)$ as the upper-limit value and $(1-\beta)$ as the lower-limit value, as in the case of step 442 of FIG. 8.

If the output characteristic value is between the upper-limit value and the lower-limit value, the flag X02SENS is set as 1 in step 553 as in the case of step 527. If the output characteristic value is equal to or greater than the upper-limit value or equal to or smaller than the lower-limit value, the flag X02SENS is set as 0 in step 555 as in the case of step 529.

As described above, this embodiment is designed to change the lower-limit value used for determining whether or not there is a malfunction in the sensor, depending on whether or not the operation affecting the concentration of oxygen contained in intake gas, such as EGR or purge, is being performed. Thus, it can be determined more accurately whether or not there is a malfunction in the sensor.

Another method of determining whether or not there is a malfunction in the sensor will now be described.

In the aforementioned method of determination of the malfunction of the sensor, the lower-limit value used for determining whether or not there is a malfunction in the sensor is set as a small value during the performance of the operation affecting the concentration of oxygen contained in intake gas, such as EGR, in consideration of the influence of the operation. As a result, the possibility of making an erroneous determination that there is an anomaly in the sensor that is in normal operation is eliminated.

However, if the amount of purge of evaporative fuel, the amount of EGR, or the like fluctuates during the operation of making a determination, the upper-limit and lower-limit values set as described above may lead to an erroneous determination that there is a malfunction in the sensor that is in normal operation. Therefore, the determination on a malfunction in the sensor during purge is susceptible to errors. If it is always determined during stoppage of EGR whether or not there is a malfunction in the sensor, the aforementioned problem does not arise. In the case of real vehicular internal combustion engines, however, purge or EGR is performed in most operational conditions. Thus, if it is determined only during stoppage of EGR or purge whether or not there is a malfunction in the sensor, the frequency of detection of a malfunction is reduced. As a result, it becomes impossible to detect a malfunction in the sensor at an early stage. In determining whether or not there is a malfunction in the sensor, it is also contemplable to temporarily stop the performance of EGR or purge. However, if EGR or purge is stopped, there are some cases where the performance of the engine is affected or where the amount of emission of evaporative fuel or exhaust gas increases. Therefore, it is not preferable to stop EGR or purge every time it is determined whether or not there is a malfunction in the sensor.

Therefore, the operation of determining whether or not there is a malfunction in the sensor is performed without changing the aforementioned lower-limit value during the performance of EGR or purge. If the output characteristic value based on the data acquired during the performance of EGR or purge becomes lower than the lower-limit value, it is not determined immediately that there is a malfunction in the sensor. Instead, it is again determined under the conditions during stoppage of EGR or purge whether or not there is a malfunction in the sensor. Thus, the possibility of making an erroneous determination that there is a malfunction in the sensor that is in normal operation is eliminated. As a result, the precision in making a determination is enhanced.

Figure 10:
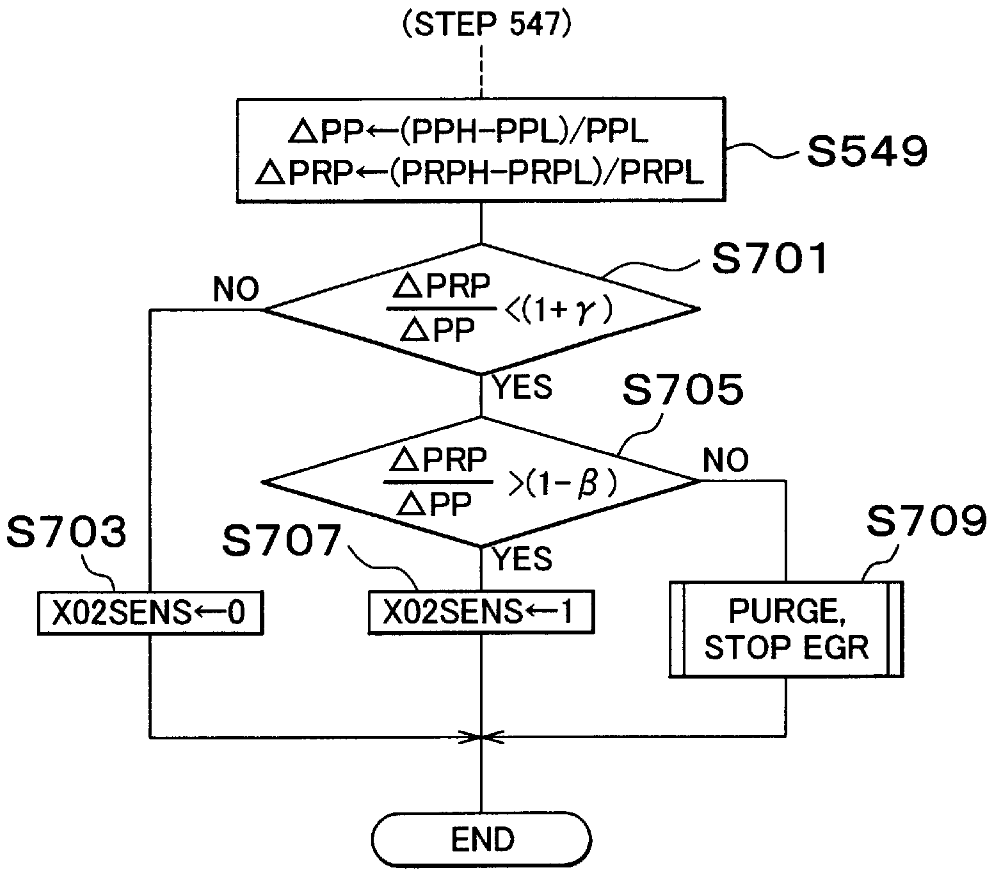
FIG. 10 is a flowchart for explaining another operation of determining whether or not there is an anomaly in the intake-oxygen concentration sensor.

FIG. 10 is part of a flowchart for explaining an operation of determining whether or not there is a malfunction according to this embodiment. The operation of determining whether or not there is a malfunction according to this embodiment is only partially different from the operation of making a determination shown in FIGS. 9A and 9B. Therefore, FIG. 10 shows only what is different from the operation shown in FIGS. 9A and 9B.

In this embodiment, as shown in FIG. 10, the processings in steps 701 to 709 are performed instead of the processings in steps 551 to 555 shown in FIG. 9B.

That is, after completion of the acquisition of data on the high-pressure and low-pressure sides during purge and calculation of the amount ΔPRP of change in the sensor output and the amount ΔPP of change in intake pressure as dimensionless values in step 549, the output characteristic value ΔPRP/ΔPP of the sensor is calculated using ΔPRP and ΔPP. It is then determined individually whether or not the output characteristic value ΔPRP/ΔPP is smaller than the upper-limit value $(1+\gamma)$ and whether or not the output characteristic value ΔPRP/ΔPP is greater than the lower-limit value $(1-\beta)$.

In this case as well, if $(1-\beta)<\Delta PRP/\Delta PP<(1+\gamma)$ in steps 701, 705, the flag X02SENS is set as 1 because it is determined that the sensor is in normal operation. If $\Delta PRP/\Delta PP>(1+\gamma)$ in step 701, the flag X02SENS is set as 0 because it is determined that there is a malfunction in the sensor. This also holds true for the embodiment shown in FIGS. 9A and 9B.

In the embodiment shown in FIGS. 9A and 9B, if $\Delta PRP/\Delta PP<(1-\beta)$ in step 551, it is immediately determined even during the performance of EGR that there is a malfunction, so that the flag X02SENS is set as 0 (step 529). On the other hand, however, according to this method of determination, if $\Delta PRP/\Delta PP<(1-\beta)$ in step 705 (FIG. 10) during purge, the determination is reserved instead of determining immediately that there is a malfunction in the sensor. The operation of EGR or purge that is being performed is stopped in step 709, whereby the present routine is terminated.

Thus, the processings in steps 505 to 529 (FIGS. 9A and 9B) are performed since the subsequent performance of the operation. During stoppage of the operation affecting the concentration of oxygen contained in intake gas, such as EGR or purge, it is determined again whether or not there is a malfunction in the sensor.

Therefore, during the operation of making a determination, even if it is determined in step 705 that there is a malfunction because an exact output characteristic value cannot be obtained due to fluctuations in the amount of EGR or the concentration of evaporative fuel during purge, the determination is made again in a state free from the influence of EGR or purge. The possibility of making an erroneous determination that there is a malfunction in the sensor that is in normal operation is eliminated.

This embodiment is designed to stop EGR, purge, or the like and perform the operation of making a determination again if it is determined that there is a malfunction in the sensor on the ground that $\Delta PRP/\Delta PP<(1-\beta)$ during the performance of EGR or purge. Therefore, the operational state of the engine is affected. However, the performance of EGR or purge is stopped only if it is determined that there is a malfunction in the sensor, and moreover, only if the output characteristic value becomes smaller than the lower-limit value. The probability of actual stoppage of EGR or purge is extremely low, so that the influence exerted upon the performance of the engine or the deterioration of emission characteristics is substantially negligible.

The aforementioned method of determining whether or not there is an anomaly in the intake-oxygen concentration sensor is designed to determine whether or not there is a malfunction in the sensor, depending on whether or not the change in the output from the intake-oxygen concentration sensor and the change in intake pressure establish a predetermined relation during operation of the engine. Therefore, the common effect of making it possible to determine easily and accurately whether or not there is a malfunction in the sensor even during the operation affecting the concentration of oxygen contained in intake gas, such as EGR or purge, can be achieved.

As described above, according to the aforementioned three methods of determining whether or not there is a malfunction in the sensor, the flag X02SENS can be set as 1 or 0 in accordance with the result of a determination whether or not the intake-oxygen concentration sensor 31 is in normal operation. It is to be noted herein that the method of making a determination on the state of the intake-oxygen concentration sensor 31 is not to be limited as described above and that any known method is applicable.

Figure 11:
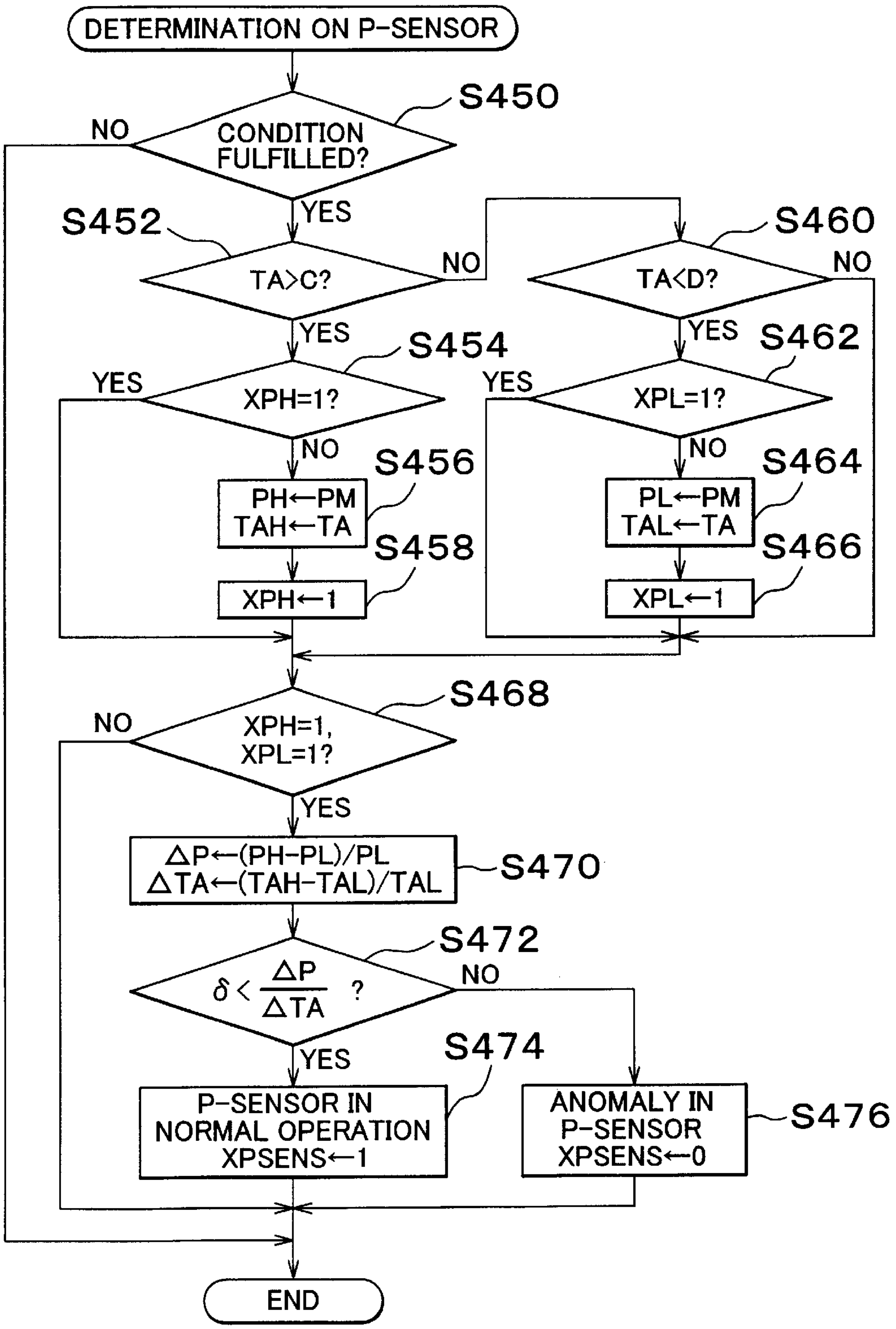
FIG. 11 is a flowchart for explaining a processing that is performed according to the third embodiment of the invention so as to make a determination on an intake-pressure sensor.

FIG. 11 is a flowchart of a routine that is executed by the ECU 30 to perform the processings regarding the flag XPSENS, more specifically, to make a determination on the state of the intake pressure sensor 33.

In the routine shown in FIG. 11, it is first determined whether or not a predetermined condition for making a determination on the state of the intake pressure sensor 33 is fulfilled (step 450).

If it is determined as a result that the condition is not fulfilled, the present processing cycle is terminated. On the other hand, if it is determined that the aforementioned condition is fulfilled, it is determined whether or not the throttle valve assumes an opening TA greater than an open-side criterion value C (step 452).

If it is determined that the throttle opening TA is greater than the open-side criterion value C, it is then determined whether or not a flag XPH for indicating that the acquisition of open-side data has been completed has been set as 1 (step 454).

If XPH=1 as a result, it can be determined that open-side data, which are part of the data required for a determination on the state of the intake pressure sensor 33, have already been acquired. In this case, the processings in steps 456, 458 are skipped. The later-described processing in step 468 is then performed immediately.

If it is determined in the aforementioned step 454 that XPH≠1, the output PM from the intake pressure sensor 33 and the throttle opening TA at that moment are recorded as open-side data PH on the intake pressure and an open-side opening TAH of the throttle valve, respectively (step 456).

If the aforementioned recording processings are completed, the flag XPH is set as 1 so as to indicate that the open-side data PH, TAH have already been acquired (step 458).

In the routine shown in FIG. 11, if it is determined in the aforementioned step 452 that the throttle opening TA is not greater than the open-side criterion value C, it is then determined whether or not the throttle opening TA is smaller than a close-side criterion value D (a predetermined value smaller than the open-side criterion value C) (step 460).

If it is determined that the throttle opening TA is not smaller than the close-side criterion value D, it is determined that there has not been formed a state allowing acquisition of the data for making a determination on the intake pressure sensor 33. The later-described processing in step 458 is then performed immediately. On the other hand, if it is determined that the throttle opening TA is smaller than the criterion value D, it is determined whether or not a flag XPL for indicating that the close-side data have been acquired has been set as 1 (step 462).

If it is determined as a result of the aforementioned determination that XPL=1, it can be determined that the close-side data, which are part of the data required for a determination on the state of the intake pressure sensor 33, have already been acquired. In this case, the processings in steps 464, 466 are skipped. The later-described processing in step 468 is then performed immediately.

If it is determined in the aforementioned step 462 that XPL≠1, the output PM from the intake pressure sensor 33 and the throttle opening TA are recorded as close-side data PL on the intake pressure and a close-side opening TAL of the throttle valve, respectively (step 464).

If the processing in the aforementioned step 464 is terminated, the flag XPL is set as 1 so as to indicate that the close-side data PL, TAL have already been acquired (step 466).

In the routine shown in FIG. 11, after a series of the aforementioned processings, it is determined whether or not both the flag XPH for indicating that the open-side data have been acquired and the flag XPL for indicating that the close-side data have been acquired have been set as 1 (step 468).

As a result, if it is determined that at least one of XPH=1 and XPL=1 is not established, it is determined that the data sufficient to make a determination on the state of the intake pressure sensor 33 have not been acquired. The present processing cycle is then terminated. On the other hand, if it is determined that both the aforementioned conditions are fulfilled, calculation of an amount ΔP of change in pressure and an amount ΔTA of change in throttle opening is made according to equations (6), (7) shown below.

$$\Delta P=(PH-PL)/PL \quad (6)$$

$$\Delta TA=(TAH-TAL)/PL \quad (7)$$

It is then determined whether or not the ratio of the amount ΔP of change in pressure to the amount ΔTA of change in throttle opening is confined to a range defined by an inequality (8) shown below (step 472).

$$\delta<\Delta P/\Delta TA \quad (8)$$

The aforementioned condition is fulfilled if the output from the intake pressure sensor 33 changes suitably as the throttle opening TA changes. Therefore, if the condition is fulfilled, it can be determined that the intake pressure sensor 33 is in normal operation. On the other hand, if the condition is not fulfilled, it can be determined that there is an anomaly in the intake pressure sensor 33.

In the routine shown in FIG. 11, if it is determined that the aforementioned condition in step 472 is fulfilled, it is determined that the intake pressure sensor 33 is in normal operation. The flag XPSENS is then set as 1 (step 474).

If it is determined that the aforementioned condition in step 472 is not fulfilled, it is determined that there is an anomaly in the intake pressure sensor 33. The flag XPSENS is then set as 0 (step 476).

As described above, according to the routine shown in FIG. 11, the flag XPSENS can be set as 1 or 0 in accordance with the result of a determination whether or not the intake pressure sensor 33 is in normal operation. It is to be noted herein that the method of making a determination on the state of the intake pressure sensor 33 is not to be limited as described above and that any known method is applicable.

Figure 12:
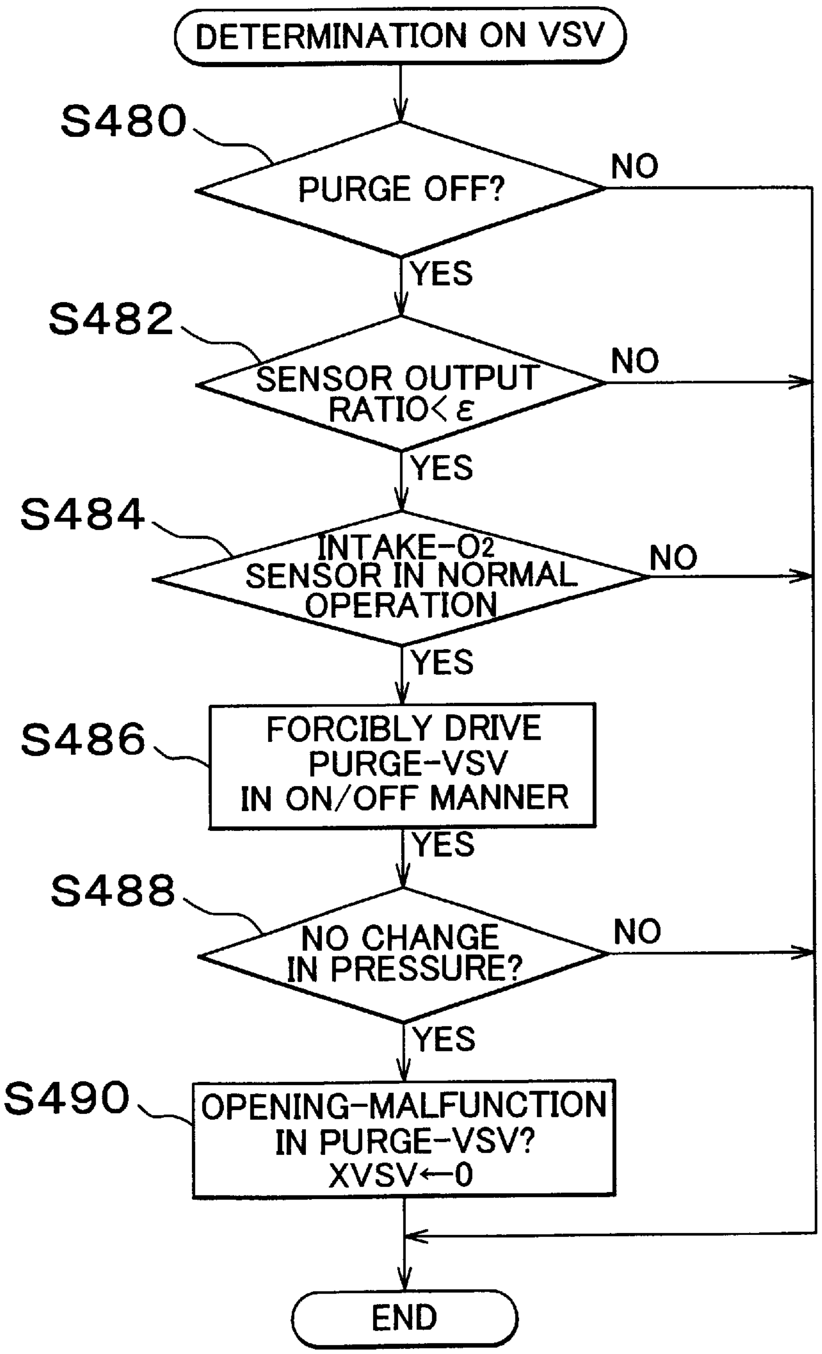
FIG. 12 is a flowchart for explaining a processing that is performed according to the third embodiment of the invention so as to make a determination on a purge control valve.

FIG. 12 is a flowchart of a routine that is executed by the ECU 30 to perform the processings regarding the flag XVSV, more specifically, to make a determination on the state of the purge control valve 41. The routine shown in FIG. 12 is executed repeatedly during operation of the internal combustion engine 1. This embodiment is designed such that, after the start of the internal combustion engine 1, the flag XVSV is reset as 0 through an initial processing prior to the routine shown in FIG. 12.

In the routine shown in FIG. 12, it is first determined whether or not purge of evaporative fuel has been canceled, that is, whether or not purge control has been canceled (step 480).

If it is determined in the aforementioned step 480 that purge has not been canceled, the present routine is terminated without performing any other processings hereinafter. On the other hand, if it is determined that purge has been canceled, it is determined whether or not the intake-oxygen concentration sensor 31 exhibits an output ratio $\alpha$ smaller than a criterion value $\epsilon$ (e.g., 1.0) (step 482).

As described above, the output ratio $\alpha$ is a ratio of the output RP from the intake-oxygen concentration sensor 31 during purge to the output RO from the intake-oxygen concentration sensor 31 during stoppage of purge, that is, RP/RO. The output ratio $\alpha$ is independent from the intake pressure PM. In the case where the gas actually detected is air, the output ratio $\alpha$ is equal to 1.0. Therefore, if the output ratio $\alpha<\epsilon$, it can be determined that evaporative fuel may be mixed in intake gas despite stoppage of purge.

In the routine shown in FIG. 12, if it is determined in the aforementioned step 482 that the output ratio $\alpha>\epsilon$, the present processing cycle is terminated without performing any other processings hereinafter. On the other hand, if it is determined that the output ratio $\alpha<\epsilon$, it is then determined whether or not the intake-oxygen concentration sensor 31 is in normal operation, that is, whether or not the flag X02SENS has been set as 1 (step 484).

If it is determined as a result of the aforementioned determination that the intake-oxygen concentration sensor 31 is not in normal operation, the output ratio $\alpha$ is implausible. Therefore, the determination on the state of the purge control valve 41 is canceled, and the present processing cycle is terminated without performing any other processings hereinafter. On the other hand, if it is determined in the aforementioned step 484 that the intake-oxygen concentration sensor 31 is in normal operation, it can be determined assertively that evaporative fuel is mixed in intake gas despite stoppage of purge. In this case, according to this embodiment, the purge control valve 41 is driven forcibly in an on-off manner after step 484 (step 486).

In the routine shown in FIG. 12, it is then determined whether or not a change in pressure has been detected by the intake pressure sensor 33 (step 488).

If the purge control valve 41 is opened or closed suitably in response to the processing in the aforementioned step 486, there ought to be a change in the intake pressure PM. In the routine shown in FIG. 12, if it is determined in step 488 that there is a change in pressure, it is determined that the purge control valve 41 is in operation. The present processing cycle is then terminated immediately. If it is determined in step 488 that there is no change in pressure, it is determined that the purge control valve 41 is stuck while remaining open (i.e., while allowing purge of evaporative fuel), namely, that there is an opening-malfunction in the purge control valve 41. The flag XVSV is then set as 0 (step 490).

As described above, the routine shown in FIG. 12 makes it possible to detect with precision an opening-malfunction in the purge control valve 41 and appropriately set the flag XVSV as 1 or 0 in accordance with the result of detection. It is to be noted herein that the method of making a determination on the state of the purge control valve 41 is not to be limited as described above. That is, although the aforementioned method is designed to ascertain an opening-malfunction in the purge control valve 41, it is not indispensable in this embodiment to distinguish between an opening-malfunction and a closing-malfunction. Therefore, only the processings in the aforementioned steps 486, 488 are performed. If a change in pressure is detected, it is appropriate to determine that the purge control valve 41 is in normal operation (XVSV=1). If no change in pressure is detected, it is appropriate to determine that there is an anomaly in the purge control valve 41 (XVSV=0).

As described above, this embodiment makes it possible to determine accurately whether or not there is an anomaly in the main part of the system for performing intake-$O_2$ purge control. If no anomaly in the system is detected, intake-$O_2$ purge control can be performed. On the other hand, if an anomaly in the system is detected, exhaust-$O_2$ purge control can be performed. Therefore, this embodiment makes it possible to always guarantee high purging performance in accordance with the state of the system within such a range that no deviation in the air-fuel ratio occurs.

The aforementioned third embodiment is designed to determine on the basis of the state of the intake-oxygen concentration sensor 31, the intake pressure sensor 33, or the purge control valve 41 whether or not there is an anomaly in the system. It is to be noted, however, that the items for determining whether or not there is an anomaly in the system are not to be limited as described above. More specifically, the anomaly in the engine output mentioned in the description of the first and second embodiments may be used as one of the items for determining whether or not there is an anomaly in the system.

Although the aforementioned third embodiment does not refer to the performance of exhaust-$O_2$ purge control performed in the first or second embodiment, it is also appropriate that exhaust-$O_2$ purge control be performed simultaneously during the performance of intake-$O_2$ purge control in the routine shown in FIG. 5.

In addition, although the aforementioned third embodiment is designed to start exhaust-$O_2$ purge control if an anomaly is detected in the system for performing intake-$O_2$ purge control, the invention is not to be limited in this manner. That is, if an anomaly is detected in the aforementioned system, it is also appropriate that intake-$O_2$ purge control that has already been performed at the moment of detection of the anomaly be continued instead of starting exhaust-$O_2$ purge control. Alternatively, it is also appropriate that intake-$O_2$ purge control that has not been performed yet at the moment of detection of the anomaly be started instead of starting exhaust-$O_2$ purge control.

The fourth embodiment of the invention will now be described with reference to FIGS. 13 to 15.

FIG. 13 is an explanatory view of the functions of an air-fuel ratio control device of this embodiment. In FIG. 13, each blank regarding a corresponding one of the component members is marked with "O", "x", or "-". In FIG. 13, "O" means that the component member is in normal operation, "x" means that there is an anomaly in the component member, and "-" means that it does not matter whether or not there is an anomaly in the component member. The functions shown in FIG. 13 can be realized if the ECU 30 is designed to execute routines shown in FIGS. 14 and 15.

The device of the aforementioned third embodiment is designed to perform exhaust-$O_2$ purge control whenever an anomaly in the system for performing intake-$O_2$ purge control is detected. On the other hand, according to the device of the fourth embodiment, if an anomaly in the system is detected, an appropriate one of countermeasures as shown in FIG. 13 is selected depending on the degree of the anomaly.

More specifically, the device of this embodiment is designed to select an appropriate one of countermeasures as shown below depending on the degree of an anomaly in the system.

(1) If there is an anomaly in the intake-oxygen concentration sensor 31, "exhaust-$O_2$ purge control" is performed.

(2) If there is an anomaly in each of the intake pressure sensor 33 and the purge control valve 41 although the intake-oxygen concentration sensor 31 is in normal operation, "intake-$O_2$ correction" and "pressure estimation" are performed. It is to be noted herein that "pressure estimation" is designed to estimate the intake pressure PM from a physical quantity other than the output from the intake pressure sensor 33 which is regarded as anomalous (e.g., from the amount GA of intake gas). In the case where pressure estimation is performed, a pressure-based correction of the output from the intake-oxygen concentration sensor 31 is performed using the estimated pressure. It is also to be noted herein that "intake-$O_2$ correction" is designed to correct the fuel injection amount on the basis of a value detected by the intake-oxygen concentration sensor 31 so as to eliminate the passively spreading influence of purge, without controlling the opening of the purge control valve 41 that is regarded as anomalous.

(3) If there is an anomaly in the intake pressure sensor 33 although the intake-oxygen concentration sensor 31 and the purge control valve 41 are in normal operation, "intake-$O_2$ purge" and the aforementioned "pressure estimation" are performed.

(4) If there is an anomaly in the purge control valve 41 although the intake-oxygen concentration sensor 31 and the intake pressure sensor 33 are in normal operation, the aforementioned "intake-$O_2$ correction" is performed.

Figure 14:
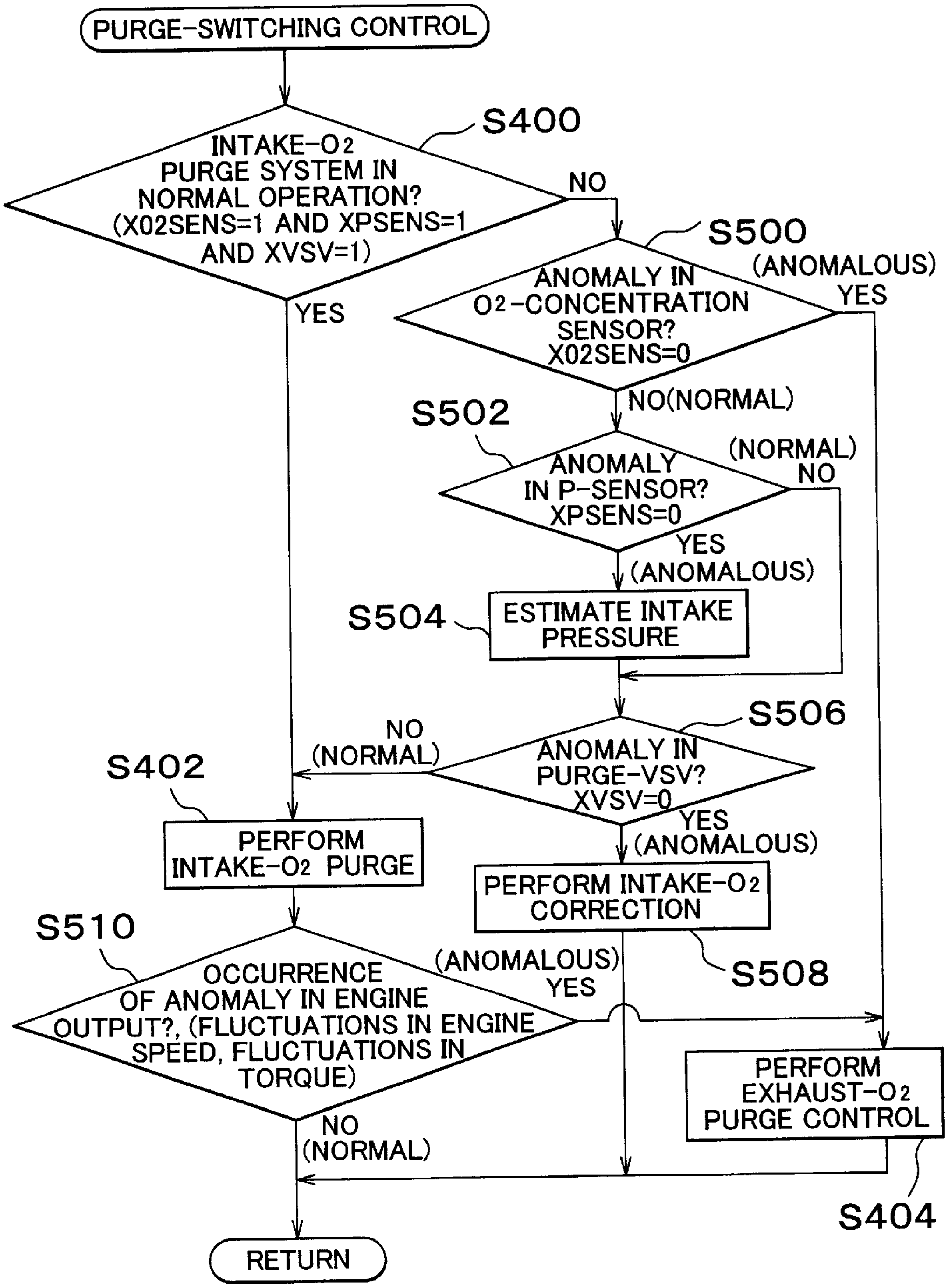
FIG. 14 is a flowchart for explaining purge-switching control that is performed according to the third embodiment of the invention.

FIG. 14 is a flowchart of a routine that is executed by the ECU 30 so as to select an appropriate countermeasure depending on the state of the system. In FIG. 14, the same steps as in FIG. 4 are marked with the same reference numbers, and the description of those steps will be omitted or simplified.

In the routine shown in FIG. 14, if it is determined in step 400 that there is an anomaly in the system for performing intake-$O_2$ purge control, it is then determined whether or not there is an anomaly in the intake-oxygen concentration sensor 31, that is, whether or not X02SENS=0(step 500).

If there is an anomaly in the intake-oxygen concentration sensor 31, it is impossible to use a value detected by the intake-oxygen concentration sensor 31. Thus, there is no choice but to switch to injection-amount control based on exhaust-gas air-fuel ratios (values detected by the air-fuel ratio sensors 29*a*, 29*b*). For this reason, if the aforementioned determination is made, the performance of exhaust-$O_2$ purge control is then selected in step 404, as in the case of the third embodiment.

If it is determined in the aforementioned step 500 that there is no anomaly in the intake-oxygen concentration sensor 31, it is possible to determine that injection-amount control based on a value detected by the intake-oxygen concentration sensor 31 can be continued. In this case, it is then determined whether or not there is an anomaly in the intake pressure sensor 33, that is, whether or not XPSENS=0 (step 502).

If there is no anomaly in the intake pressure sensor 33, it is possible to perform a pressure-based correction of the output from the intake-oxygen concentration sensor 31 using a value PM detected by the intake pressure sensor 33. In this case, the processing in step 504 is skipped, and the later-described processing in step 506 is performed immediately. On the other hand, if there is an anomaly in the intake pressure sensor 33, the pressure-based correction cannot be based on the value PM detected by the intake pressure sensor 33. Therefore, in a such a case, a processing of estimating an intake pressure is then performed (step 504).

In this embodiment, the intake pressure is estimated on the basis of the amount GA of intake gas flowing into the intake passage 10 of the internal combustion engine 1 or the amount GPGR of purge. If the intake pressure is estimated in step 504, the output from the intake-oxygen concentration sensor 31 is then subjected to the pressure-based correction on the basis of the estimated intake pressure. The contents of the processing of estimating an intake pressure will be described later in detail with reference to FIG. 15.

In the routine shown in FIG. 14, it is determined following the aforementioned processing in step 502 or 504 whether or not there is an anomaly in the purge control valve 41, that is, whether or not XVSV=0 (step 506).

If it is determined in the aforementioned step 506 that there is an anomaly in the purge control valve 41, it is possible to determine that the opening of the purge control valve 41 cannot be performed suitably. That is, it is possible to determine that the amount GPGR of purge cannot be performed suitably. Therefore, if such a determination is made, injection-amount control based on the value detected by the intake-oxygen concentration sensor 31, that is, intake-$O_2$ correction is performed so as to eliminate the passively spreading influence of purge (step 508).

On the other hand, if it is determined in the aforementioned step 506 that there is no anomaly in the purge control valve 41, it is possible to determine that the amount of purge can be controlled by controlling the opening of the purge control valve 41. The processing in the aforementioned step 506 is performed only in the case where the intake-oxygen concentration sensor 31 is in normal operation (and where there is an anomaly in the intake pressure sensor 33). If the intake-oxygen concentration sensor 31 is in normal operation and if the amount of purge can be controlled, it is possible to perform intake-$O_2$ purge control. Therefore, if it is determined in the aforementioned step 506 that there is no anomaly in the purge control valve, the performance of intake-$O_2$ purge control is then selected in step 402.

In the routine shown in FIG. 14, it is determined following the processing in the aforementioned step 402 whether or not there is an anomaly in the engine output (step 510).

The processing in step 510 is the same as the processings in steps 213, 215 or the processings in steps 203, 205 in the aforementioned first embodiment. More specifically, it is determined in step 510 whether or not the internal combustion engine 1 undergoes fluctuations exceeding a predetermined criterion level, on the basis of fluctuations in engine speed, torque, exhaust-gas air-fuel ratio, combustion pressure in the internal combustion engine 1, motor output (in the case of a hybrid vehicle), or the like.

If no anomaly in the output from the internal combustion engine 1 is detected as a result of the aforementioned determination, it can be determined that intake-$O_2$ purge control is functioning properly. In this case, the present processing cycle is then terminated immediately. On the other hand, if an anomaly in the output from the internal combustion engine 1 is detected as a result of the aforementioned determination, it can be determined that intake-$O_2$ purge control is not functioning properly, namely, that there are fluctuations in the air-fuel ratio as a result of the performance of intake-$O_2$ purge control. In this case, the processing in step 404 follows the processing in step 510 in the routine shown in FIG. 14. The performance of exhaust-$O_2$ purge control is then selected.

As described above, according to the routine shown in FIG. 14, if an anomaly in the system for performing intake-$O_2$ purge control is detected, an appropriately selected one of exhaust-$O_2$ purge control (see step 404), intake-$O_2$ correction control based on a value detected by the intake pressure sensor 33 or an estimated pressure (see step 506), intake-$O_2$ purge control based on an estimated pressure (see step 402), and the like can be performed. In addition, according to the routine shown in FIG. 14, if an anomaly in the output occurs in response to the performance of intake-$O_2$ purge control, it is possible to switch to exhaust-$O_2$ purge control immediately. Therefore, the air-fuel ratio control device of the fourth embodiment makes it possible to effectively use the output from the evaporative the intake-oxygen concentration sensor (evaporative fuel concentration sensor) by using an estimated value of intake pressure if the intake-oxygen concentration sensor is in normal operation despite the occurrence of an anomaly in the intake pressure sensor. In this case, intake-side purge control is substantially continued without causing a deviation in the air-fuel ratio, despite the anomaly in the system. Thus, it is possible to ensure much higher purging performance in comparison with the case of the third embodiment.

Figure 15:
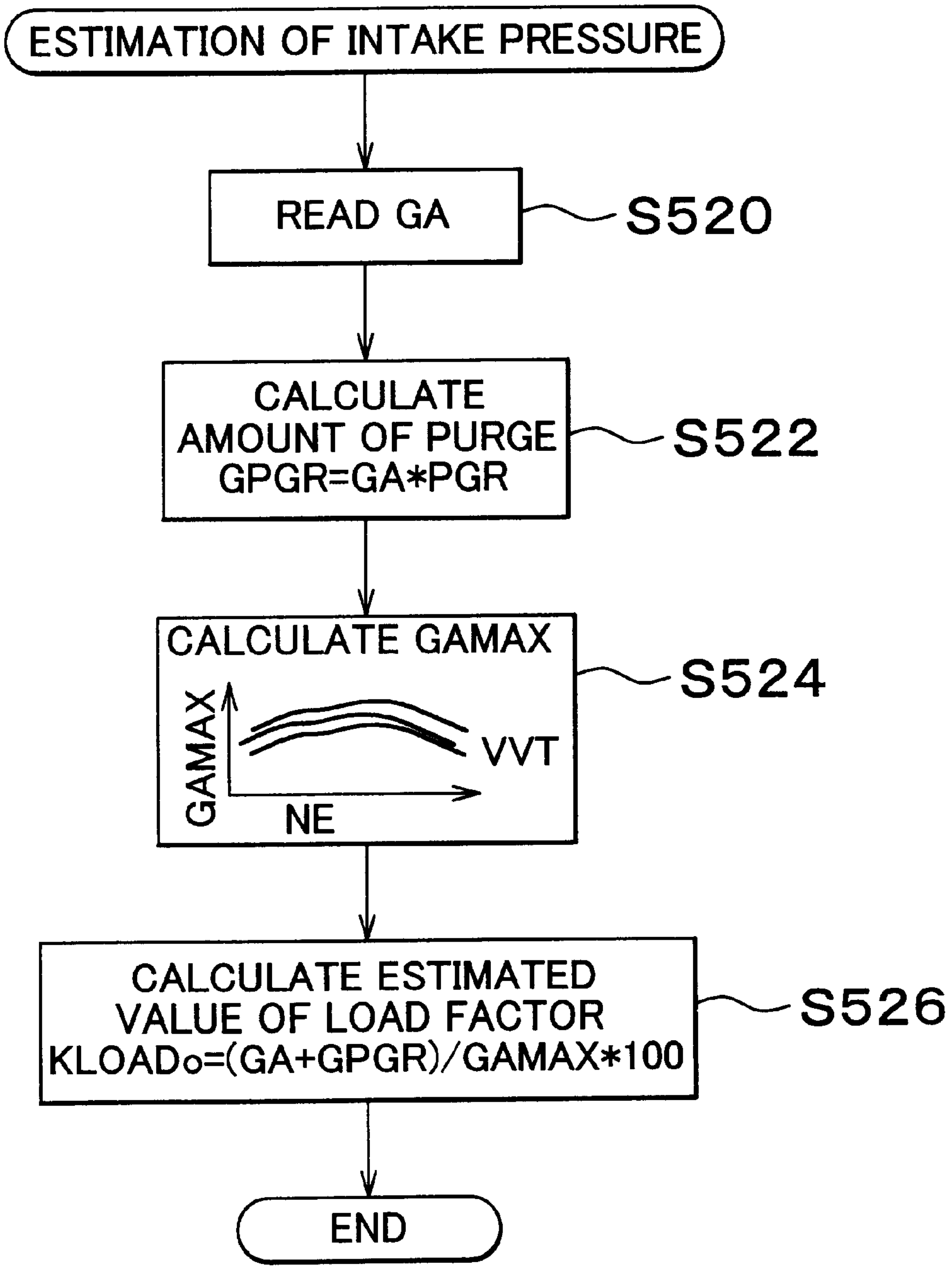
FIG. 15 is a flowchart for explaining a processing that is performed according to a fourth embodiment of the invention so as to estimate an intake pressure.

FIG. 15 is a flowchart of an example of routines executed by the ECU 30 in this embodiment so as to estimate an intake pressure in the aforementioned step 502. In the routine shown in FIG. 15, first of all, the amount GA of intake gas is read (step 520).

The amount GA of intake gas can be detected, for example, by an air flow meter disposed in the intake passage 10. The amount GA of intake gas may also be detected by referring to a map or the like, on the basis of the throttle opening TA, the engine speed NE, and the state of a VVT.

The amount GPGR of purge is then calculated by multiplying the amount GA of intake gas by the purge ratio (step 522).

As described above, the purge ratio PGR, which is the ratio of the amount GPGR of purge to the amount GA of intake gas, is calculated in advance in another routine. Because the purge ratio PGR can be calculated by any known method, it will not be described below how to calculate the purge ratio PGR.

A maximum amount GAMAX of intake gas corresponding to an operational state of the internal combustion engine 1 is then calculated (step 524).

The maximum amount GAMAX of intake gas, which is the maximum amount of intake gas that can be sucked by the internal combustion engine 1, is determined on the basis of the engine speed NE. In the case where the internal combustion engine 1 is equipped with a variable valve timing mechanism (VVT), the maximum amount GAMAX of intake gas is determined on the basis of the engine speed NE and the state of the VVT. As is apparent from the frame marked with step 524, a map for determining GAMAX in relation to NE and the state of the VVT is stored in the ECU 30. In step 524, the maximum amount GAMAX of intake gas corresponding to the current engine speed NE and the like is calculated by referring to the map.

The amount GA of intake gas read in the aforementioned step 520 and the amount GPGR of purge calculated in the aforementioned step 522 are then summated so as to calculate a total amount (GA+GPGR) of intake gas. Furthermore, the total amount (GA+GPGR) of intake gas and the maximum amount GAMAX of intake gas are then substituted into an equation (9) shown below so as to calculate an estimated load factor $KLOAD_0$ (step 526).

$$KLOAD_0=\{(GA+GPGR)/GAMAX\}\times 100 \tag{9}$$

The processings in the aforementioned steps 520 to 526 make it possible to calculate the estimated load factor $KLOAD_0$ of the internal combustion engine 1 on the basis of the amount GA of intake gas and the amount GPGR of purge. The load factor of the internal combustion engine 1 can be used as a substitutional characteristic value for the intake pressure PM of the internal combustion engine 1. Accordingly, the processings in the aforementioned steps 520 to 526 are equivalent to calculation of an intake pressure of the internal combustion engine 1 from the amount GA of intake gas and the amount GPGPR of purge. Thus, the routine shown in FIG. 15 makes it possible to estimate the intake pressure PM in the form of the estimated load factor $KLOAD_0$ while taking the amount GPGR of purge into account as well, without counting on a value detected by the intake pressure sensor 33. Thus, the air-fuel ratio control device of this embodiment makes it possible to perform a pressure-based correction of the output from the intake-oxygen concentration sensor 31 with precision on the basis of the result of estimation of a pressure even in the case where there is an anomaly in the intake pressure sensor 33.

The aforementioned fourth embodiment is designed to prevent a deviation in air-fuel ratio through intake-$O_2$ correction while continuing purge as long as the intake-oxygen concentration sensor 31 is in normal operation even if there is an anomaly in the purge control valve 41. If the exhaust-gas air-fuel ratio deviates substantially as a result, it is also appropriate to attempt to cancel purge. That is, a processing of fully closing the purge control valve 41 in the case where the exhaust-gas air-fuel ratio is out of a desired range may be performed after the processing in step 508 in the routine shown in FIG. 14. The aforementioned processing makes it possible to prevent fluctuations in exhaust-gas air-fuel ratio if the purge control valve 41 is subject to such an anomaly that it can be closed.

The fifth embodiment of the invention will now be described with reference to FIGS. 16 and 17.

FIG. 16 is an explanatory view of the functions of the air-fuel ratio control device of the fifth embodiment. The functions achieved by the fifth embodiment are the same as those achieved by the fourth embodiment except that cancellation of purge and exhaust-$O_2$ purge control are selectively performed depending on the state of the purge control valve 41 in the case where there is an anomaly in the intake-oxygen concentration sensor 31 (see FIGS. 13 and 15).

Figure 17:
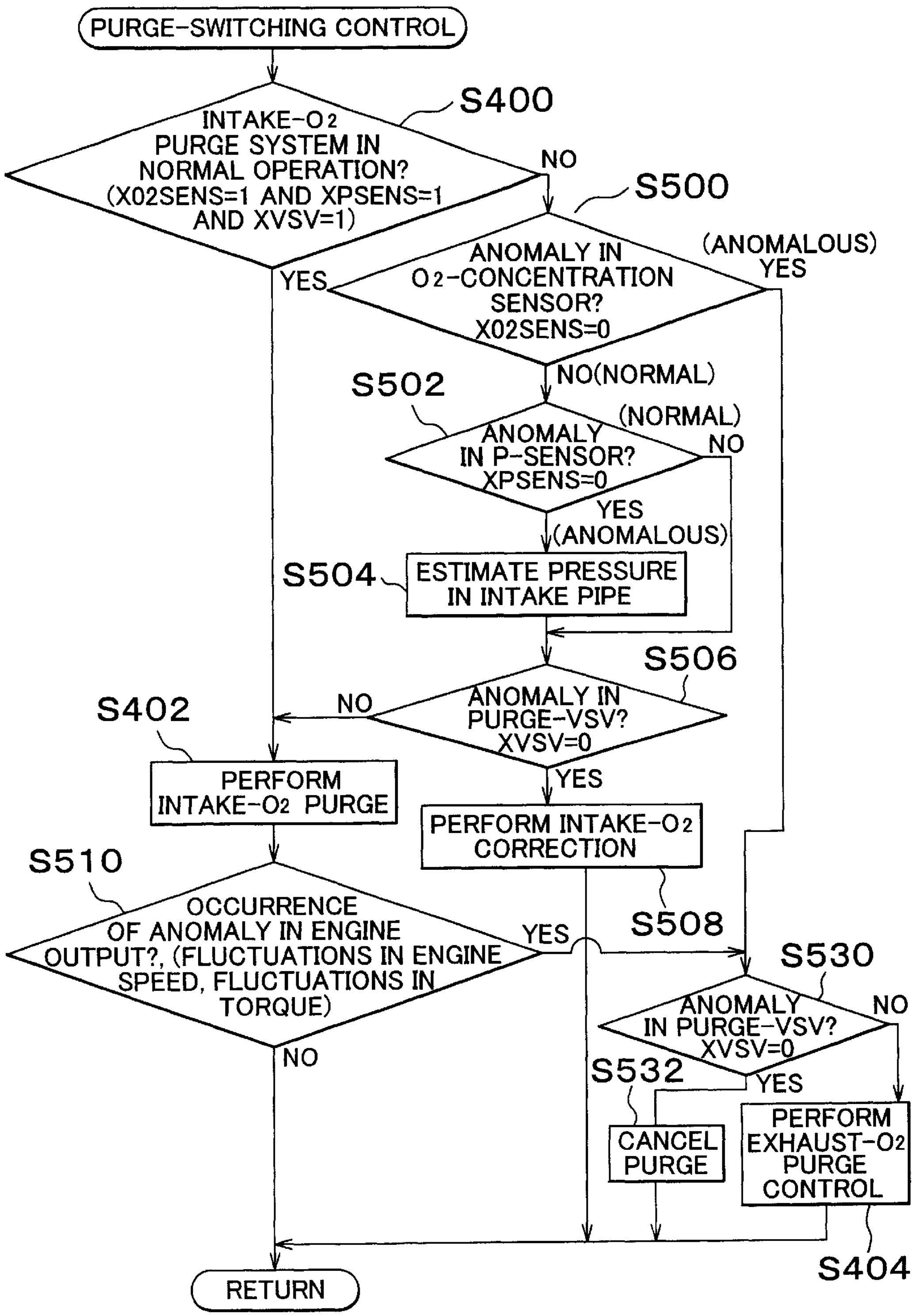
FIG. 17 is a flowchart for explaining purge-switching control that is performed according to the fifth embodiment of the invention.

FIG. 17 is a flowchart of a control routine that is executed by the ECU 30 in the fifth embodiment so as to achieve the aforementioned functions. In FIG. 17, the same steps as in FIG. 14 are marked with the same reference numbers, and the description of those steps will be omitted or simplified.

That is, the routine shown in FIG. 17 is designed to determine whether or not there is an anomaly in the purge control valve 41 (i.e., whether or not XVSV=0) (step 520) if it is determined in step 500 that there is an anomaly in the intake-oxygen concentration sensor 31 and if it is determined in step 510 that there is an anomaly in the engine output.

If it is determined as a result that there is no anomaly in the purge control valve 41, the performance of exhaust-$O_2$ purge control is then selected in step 404, as in the case of the fourth embodiment. If the purge control valve 41 is in normal operation, the amount PGR of purge can be adjusted to a suitable amount. Thus, if exhaust-$O_2$ purge control is performed in such a case, high purging performance can be achieved without causing a deviation in air-fuel ratio.

In the fifth embodiment, if it is determined in the aforementioned step 520 that there is an anomaly in the purge control valve 41, the processing of canceling purge is then performed. That is, the processing of attempting to close the purge control valve 41 is performed (step 522).

If there is an anomaly in the purge control valve 41, the opening of the purge control valve 41 cannot be controlled suitably. Therefore, the desired amount PGR of purge may not be obtained during the performance of exhaust-$O_2$ purge control. Thus, the fifth embodiment is designed to attempt to cancel purge in such a case. The aforementioned processing makes it possible to effectively prevent a deviation in the air-fuel ratio from being caused due to the influence of purge if the purge control valve 41 is subject to such an anomaly that it can be closed.

Although the evaporative fuel concentration sensor to be disposed in the intake passage 10 of the internal combustion engine 1 is limited to the intake-oxygen concentration sensor 31 in the aforementioned first to fifth embodiments, the invention is not limited to such a case. That is, the evaporative fuel concentration sensor to be disposed in the intake passage 10 may be an HC concentration sensor for detecting the concentration of hydrocarbons contained in detection-target gas.

The aforementioned first to fifth embodiments achieve the common effect of making it possible to discover an anomaly in the evaporative fuel concentration sensor at an early stage during the performance of intake-side purge control based on the output from the evaporative fuel concentration sensor and prevent the air-fuel ratio of the engine from being destabilized during the performance of intake-side purge control.

In the aforementioned embodiments, the intake-oxygen concentration sensor serves as a combustible-gas sensor which calculates a concentration of evaporative fuel (hydrocarbons) contained in intake gas from an output from the intake-oxygen concentration sensor makes use of an amount of decrease in the concentration of oxygen which results from the consumption of oxygen due to the combustion of hydrocarbons on the sensor electrode.

In the combustible-gas sensor, a double-tube heat-resistant cover body protects the outer periphery of a sensor device having the same structure as an oxygen sensor of limiting-current type and prevents flames from leaking out by adjusting arrangement or diameter of vent holes formed in an outer cover.

An experiment was actually conducted using the combustible-gas sensor. As a result, a change in the output from the combustible-gas sensor was observed every second even under a stationary condition with a constant flow rate, a constant pressure, and a constant concentration. For example, as a result of a measurement conducted using a combustible gas containing 6 weight % of butane gas, it was revealed that the amplitude of fluctuations in the output reached a maximum of 1 weight %. Taking into account the fact that the desirable precision in detection is actually around 0.1 weight %, this phenomenon constitutes a serious obstacle.

Thus, unlike the case of an air-fuel ratio sensor that is generally employed in a positive-pressure range and at a low concentration of hydrocarbons (below a lower-limit value of explosive concentration), it was not easy to directly detect a concentration of evaporative fuel in the intake system under the condition of a negative-pressure range and a high concentration of hydrocarbons (<about 10%) and to accomplish high extinguishing performance and high responding performance simultaneously.

Figure 18:
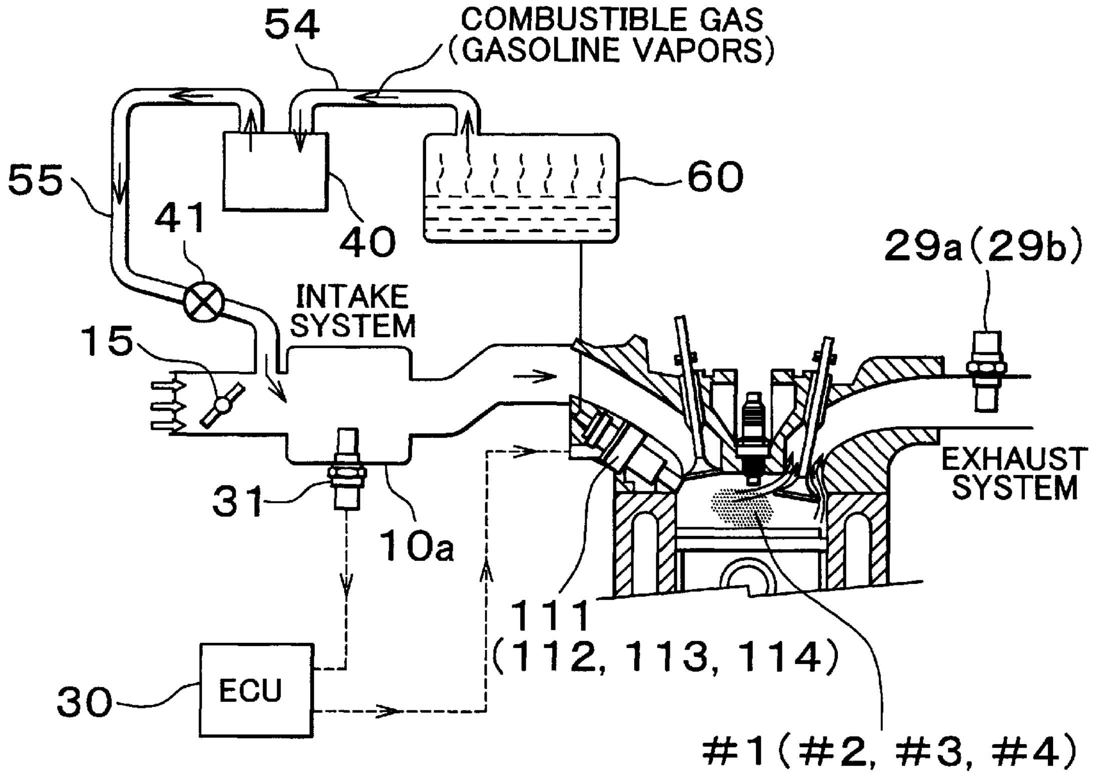
FIG. 18 is a schematic structural view of an evaporative fuel treatment system including a combustible-gas sensor.

The combustible-gas sensor will be described hereinafter with reference to the drawings. FIG. 18 is a schematic structural view of an evaporative fuel treatment system disposed in the intake system of the internal combustion engine shown in FIG. 1. In FIG. 18, the combustible-gas sensor 31 is used to detect a concentration of evaporative fuel. Fuel such as gasoline supplied from a fuel tank 60 is injected into the cylinders #1 to #4 of the vehicular engine via the injectors 111 to 114 respectively. The fuel tank 60 communicates with a canister 40 via a passage 54. Fuel vapors (e.g., gasoline vapors) in the fuel tank 60 are delivered to the canister 40 through the passage 54 and temporarily adsorbed by an adsorbent such as activated carbon. The canister 40 communicates with the intake passage between the throttle valve 15 and the surge tank 10*a* through a purge passage 55. With the aid of a negative pressure of intake gas during operation of the engine, fuel vapors in the canister 40 are purged. The fuel vapors are introduced together with intake gas into the cylinders #1 to #4 through the purge passage 55, and are burnt together with fuel injected from the injectors 111 to 114.

The combustible-gas sensor 31 is disposed on the wall of the surge tank 10*a* so as to measure a concentration of combustible gas contained in intake gas. The combustible gas is measurement-target gas, namely, fuel vapors. The air-fuel ratio sensors 29*a*, 29*b* are installed in the exhaust system. The combustible-gas sensor 31 is electrically connected to the ECU 30 that is installed outside. In calculating a concentration of evaporative fuel from an output from the combustible-gas sensor 31, the ECU 30 performs a processing of correcting the output. The details of this processing will be described later. The ECU 30 calculates a fuel injection amount on the basis of the calculated concentration of evaporative fuel and detection results obtained from the air-fuel ratio sensor and other sensors (not shown) and the like, and drives the injectors 111 to 114.

Figure 19A:
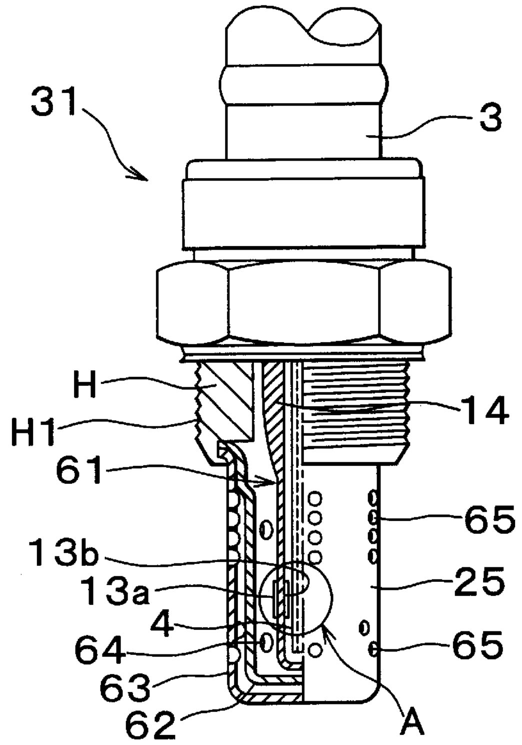
FIG. 19A is a partial cross-sectional view of the structure of a main part of the combustible-gas sensor.
Figure 19B:
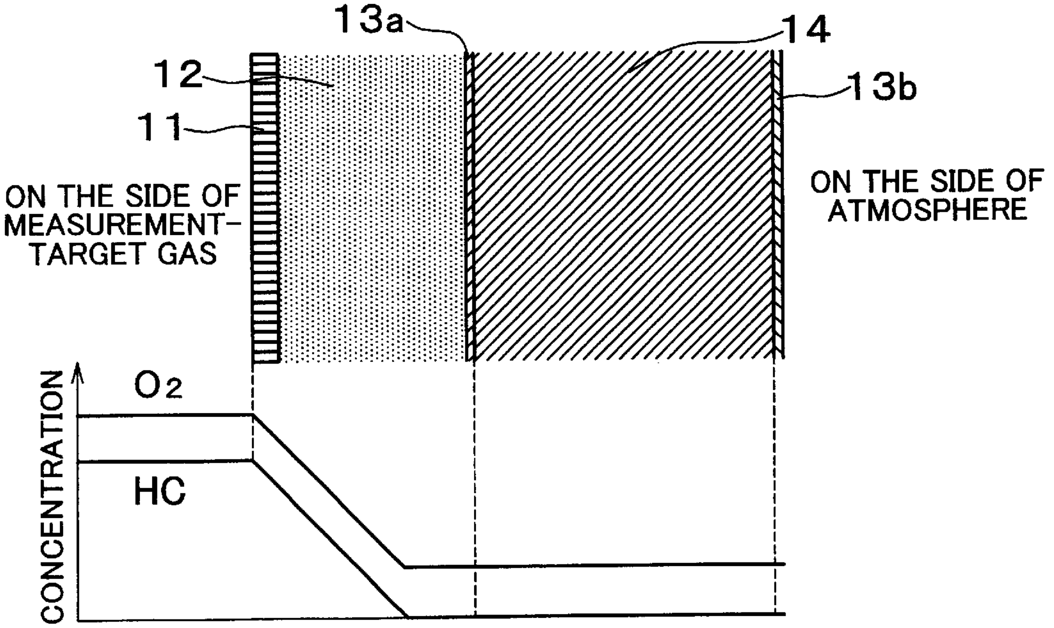
FIG. 19B is an enlarged cross-sectional view of a combustible-gas sensor device, combined with a graph showing how the concentrations of hydrocarbons and oxygen are distributed in measurement-target gas during its passage through the combustible-gas sensor device.

FIGS. 19A and 19B show the concrete construction of the combustible-gas sensor 31. In FIG. 19A, the combustible-gas sensor 31 has a tubular housing H and a combustible-gas sensor device 61. The tubular housing H is open at its opposed ends. The combustible-gas sensor device 61 is inserted into and held by the tubular housing H. A front end portion (lower end portion in FIG. 19A) of the sensor device 61 protruding below the housing H is accommodated in a cover body 25 fixed to the lower end of the housing H. A rear end portion (not shown) of the sensor device 61 is accommodated in an atmospheric cover 3 fixed to the upper end of the housing H. The housing H is fixed at its outer peripheral threaded portion to the wall of the surge tank (not shown). The front end portion of the sensor device 61 and the cover body 25 protrude into an internal space of the surge tank, namely, a space in which detection-target gas exists.

The sensor device 61 has the same structure as an oxygen sensor of limiting-current type which makes use of the conductivity of oxygen ion in a solid electrolyte. More specifically, the sensor device 61 has an oxygen-ion conductor 14 and electrodes 13*a*, 13*b*. The oxygen-ion conductor 14 is in the shape of a test tube and is made from zirconia or the like. The electrodes 13*a*, 13*b* are formed at opposed locations of inner and outer peripheral faces in the front end portion of the oxygen-ion conductor 14. A hollow portion of the oxygen-ion conductor 14 communicates with an internal space of the atmospheric cover 3 into which the atmosphere is introduced as a gas having a reference concentration of oxygen. Thus, the electrode 13*a* on the outer peripheral side of the oxygen-ion conductor 14 is exposed to measurement-target gas, whereas the electrode 13*b* on the inner peripheral side of the oxygen-ion conductor 14 is exposed to the atmosphere. A heater 4 is accommodated in the hollow portion of the oxygen-ion conductor 14. A heat-generating portion of the heater 4 heats the electrodes 13*a*, 13*b* of the oxygen-ion conductor 14.

The cover body 25 is provided to warm and protect the combustible-gas sensor device 61. The cover body 25 has a double structure composed of an inner cover 62 and an outer cover 63, which are in the shape of a closed-end container. The inner cover 62 and the outer cover 63 are made from a metallic material that exhibits high thermal conductivity and high thermal resistance, for example, from stainless. Vent holes 64, 65, into or from which detection-target gas is introduced, are formed in the lateral or bottom wall of the inner and outer covers 62, 63, respectively.

The vent holes 65 formed in the outer cover 63 function as extinguishing holes and are designed such that flames kindled in the inner cover 62 are deprived of heat by its wall surface during passage through the vent holes 65 and extinguished. Thus, the vent holes 65 prevent the flames from propagating outside and igniting fuel vapors flowing through the surge tank. The diameter of the vent holes 65 required for this extinguishing effect differs depending on the combustion energy of flames, that is, the type of combustible gas, and on the thickness and surface temperature of the outer cover 63. Therefore, it is appropriate that the diameter of the vent holes 65 be set in consideration of these factors.

The arrangement and diameter of the vent holes 64 formed in the inner cover 62 can be set suitably such that internal gas and external gas can be exchanged freely and that high responding performance can be guaranteed. More specifically, the diameter of the vent holes 64 formed in the inner cover 62 is usually about 1.5 to 2.0 mm, whereas the diameter of the vent holes 65 formed in the outer cover 63 is set smaller. For example, if the outer cover 63 has a thickness of about 0.5 mm and a surface temperature of about 200° C., the extinguishing effect is achieved by setting the diameter of the vent holes 65 formed in the outer cover 63 equal to or smaller than about 1.1 mm in the case of butane gas and equal to or smaller than about 0.9 mm in the case of gasoline vapors.

As shown in FIG. 19B, a diffused-resistor layer 12 is formed in such a manner as to cover the surface of the electrode 13*a* on the outer peripheral side (on the side of measurement-target gas) of the oxygen-ion conductor 14. Measurement-target gas reaches the electrode 13*a* after passing through the diffused-resistor layer 12 by being diffused. The diffused-resistor layer 12 is made from a spinel of MgO—$Al_2O_3$ or the like, and is controlled in such a manner as to assume a vacancy ratio of 3 to 5% and an average pore diameter of about 3 nm so that a diffused resistor exhibiting a predetermined resistance is obtained.

In this embodiment, the thickness of the diffused-resistor layer 12 is set equal to or greater than a minimum thickness required for completion of a reaction between combustible gas and oxygen during passage of measurement-target gas through the diffused-resistor layer 12. The minimum thickness is set such that combustible gas contained in measurement-target gas, for example, hydrocarbon components can be consumed completely before measurement-target gas reaches the electrode 13*a*, and changes depending on the type of detection-target combustible gas and the range of its concentration. In general, the minimum thickness increases as the concentration of combustible gas increases. It is preferable that the thickness of the diffused-resistor layer 12 be set greater than 500 μm, which is a common thickness of diffused-resistor layers in oxygen sensors. Thus, it becomes possible to suppress fluctuations in output and conduct a measurement stably.

Figure 20A:
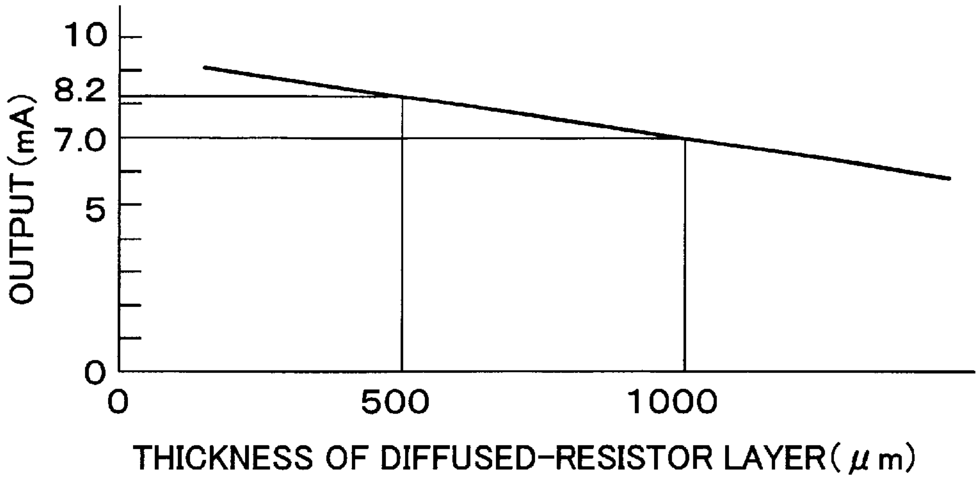
FIG. 20A shows a relation between thickness of a diffused resistor layer and output of the sensor.
Figure 20B:
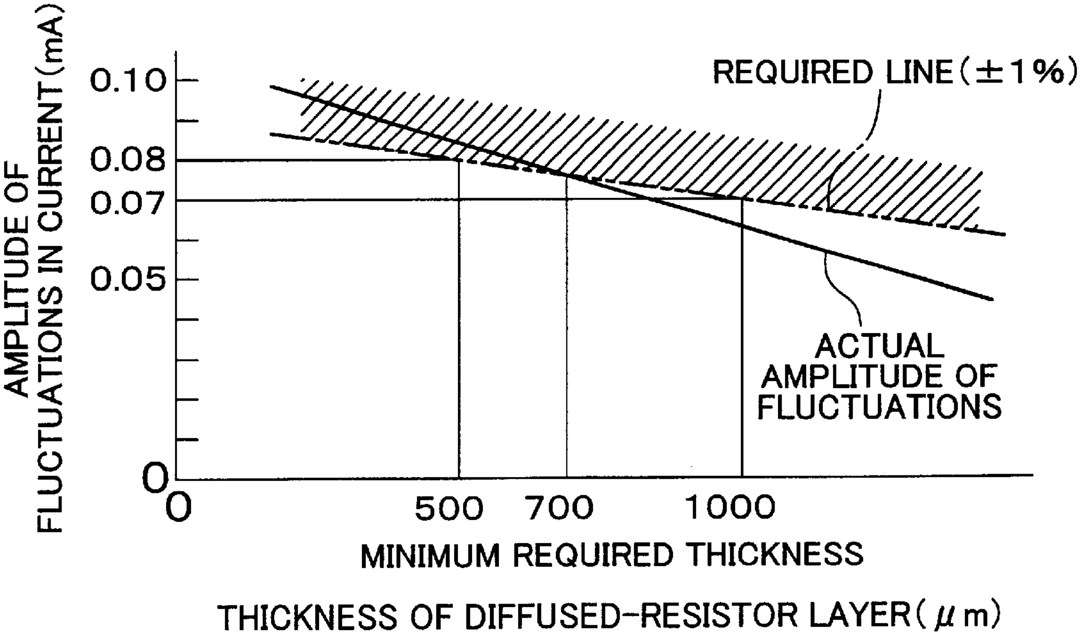
FIG. 20B shows a relation between thickness of the diffused resistor layer and varying width of electric current.

An example of methods of setting the minimum thickness will be described hereinafter. FIG. 20A shows how the output as a result of measurement of the gas containing 6 weight % of butane gas is related to the thickness of the diffused-resistor layer. As shown in FIG. 20A, even if the gas has the same composition, the sensor output decreases as the thickness of the diffused-resistor layer 12 increases. It is assumed herein that the output has an allowable amplitude of fluctuations of ±1%. For example, the allowable amplitude of fluctuations is in the range of ±0.07 mA if the diffused-resistor layer 12 has a thickness of 1000 μm, and is in the range of ±0.08 mA if the diffused-resistor layer 12 has a thickness of 500 μm. Therefore, the required line of the allowable amplitude of fluctuations is indicated as shown in FIG. 20B. In a range where the amplitude of fluctuations is greater than the required line of ±1% (i.e., in a region indicated by oblique lines in FIG. 20B), it is impossible to obtain a stable output. Therefore, it is appropriate that an actual amplitude of fluctuations be measured in advance in the course of changes in the thickness of the diffused-resistor layer 12 and that the thickness corresponding to an intersection point of the line of actual fluctuations and the required line of ±1% be regarded as the minimum required thickness. In the example shown in FIG. 20B, the minimum required thickness is about 700 μm. It is apparent that effects can be achieved if the diffused-resistor layer 12 has a thickness equal to or greater than the minimum required thickness.

A trap layer 11 is formed in such a manner as to cover the surface of the diffused-resistor layer 12. The trap layer 11 is made, for example, from a spinel, a mullite, or the like of $\alpha$-$Al_2O_3$, $\gamma$-$Al_2O_3$, or MgO—$Al_2O_3$, and is formed for the purpose of protecting the sensor device 61 from minute carbon particles contained in measurement-target gas, oil mist, deposits produced from oil, and the like. In order to accomplish this purpose, it is preferable that the trap layer 11 usually have a thickness of about 20 to 300 μm, a vacancy ratio of about 6 to 30%, and an average pore diameter of about 0.1 to 50 μm.

The principle of detection of the combustible-gas sensor device 61 constructed as described above will be described. In FIG. 19B, measurement-target gas flows through the trap layer 11, enters the diffused-resistor layer 12, and is diffused toward the electrode 13*a* by the diffused resistor exhibiting a predetermined resistance. In the diffused-resistor layer 12, oxygen and hydrocarbons contained in measurement-target gas react with each other, and the concentrations of oxygen and hydrocarbons decrease gradually. This embodiment is designed to set the thickness of the diffused-resistor layer 12 equal to or greater than the minimum thickness required for completion of an oxidizing reaction of combustible gas during passage through the diffused-resistor layer 12. Therefore, the hydrocarbons are consumed completely by combustion in the course of the oxidizing reaction, so that only the oxygen remains. The remaining oxygen is diffused immediately in the diffused-resistor layer 12, reaches the electrode 13*a*, and is ionized on the electrode 13*a*. This ionized oxygen is diffused in the oxygen-ion conductor 14, whereby the sensor generates an output. By detecting an output from the sensor, it becomes possible to obtain a concentration of combustible gas.

As described above, the aforementioned construction ensures that combustible gas is consumed completely in the diffused-resistor layer 12 and thus makes it possible to prevent fluctuations in the concentration of oxygen on the surface of the electrode 13*a* and obtain stable outputs.

Figure 21:
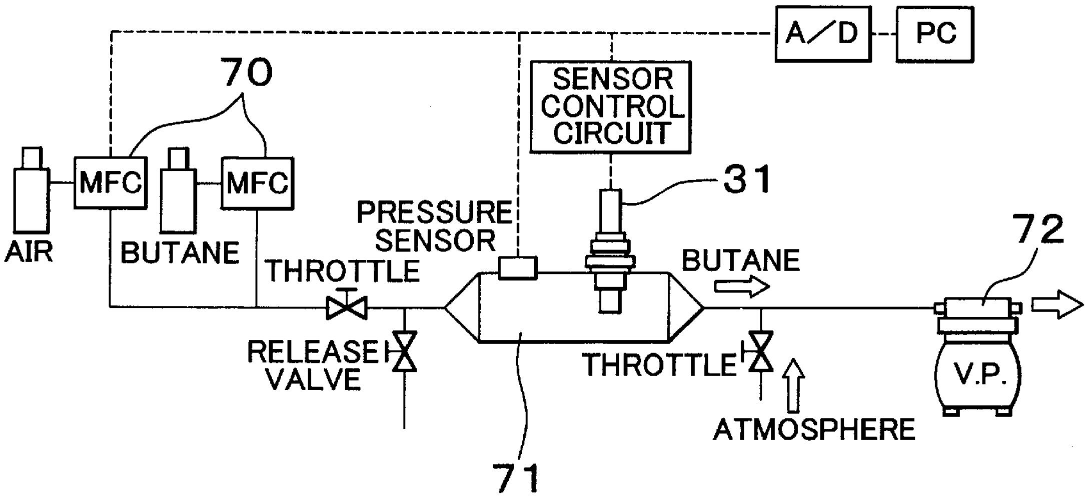
FIG. 21 is a schematic structural view of a measuring device that is employed to conduct a measuring test by means of butane gas.

A test for confirming this effect was then conducted. FIG. 21 shows the construction of a device used for the test. The combustible-gas sensor 31 constructed as described above was installed with its front end portion protruding into a pressure-reducing container 71, and measurement-target gas (composition: 6 weight % of butane, 22 weight % of oxygen, and 72 weight % of nitrogen) was introduced from a gas-introducing passage disposed at one end. The flow rate of gas was adjusted to 55 L/min (corresponding to a flow speed of 0.5 m/s) by a mass flow controller (MFC) 70, and a vacuum pump 72 was connected to the pressure-reducing container 71 at the other end so as to maintain the pressure at 100 kPa. The thickness of the diffused-resistor layer 12 of the combustible-gas sensor 31 was set equal to 500 μm, a thickness smaller than the minimum required thickness shown in FIGS. 20A and 20B, and to 1000 μm, a thickness greater than the minimum required thickness shown in FIGS. 20A and 20B. Each of FIGS. 22A and 22B shows a result of measurement of changes in the sensor output in a corresponding case.

Figure 22A:
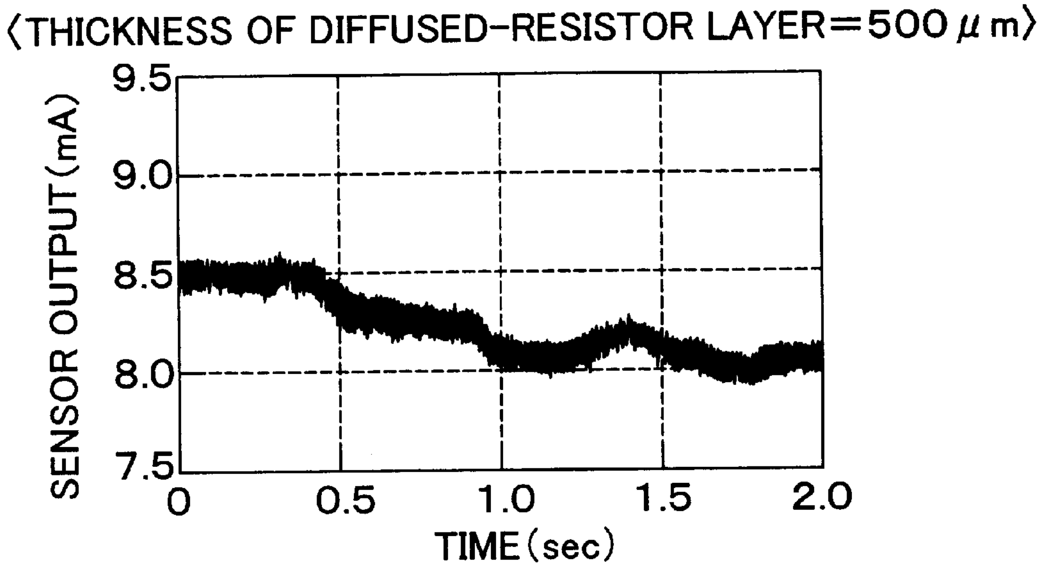
FIG. 22A shows output from the sensor in the case where the diffused-resistor layer has a thickness of 500 $\mu$m.
Figure 22B:
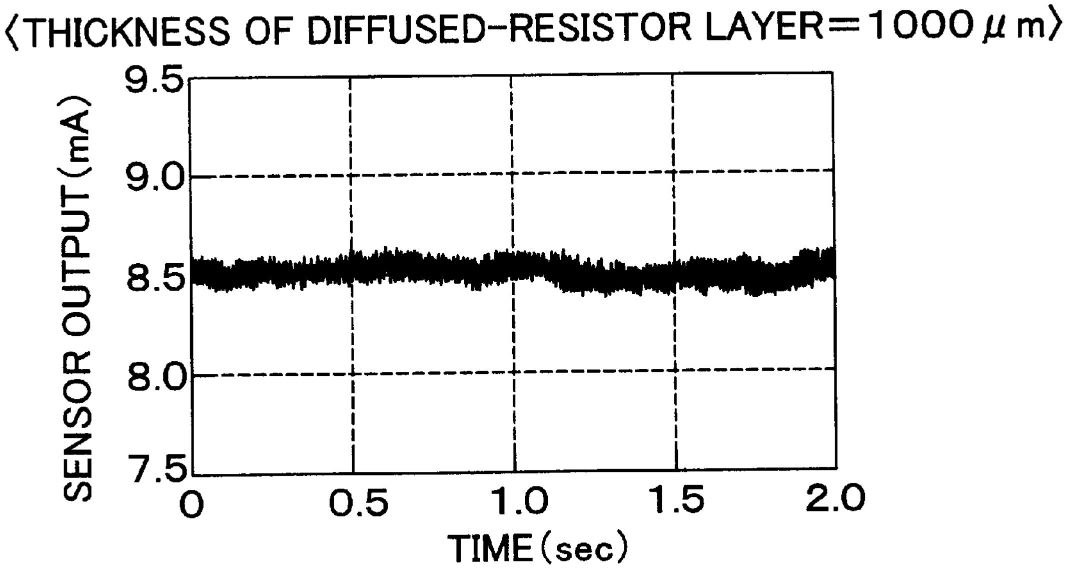
FIG. 22B shows output from the sensor in the case where the diffused-resistor layer has a thickness of 1000 $\mu$m.
Figure 23:
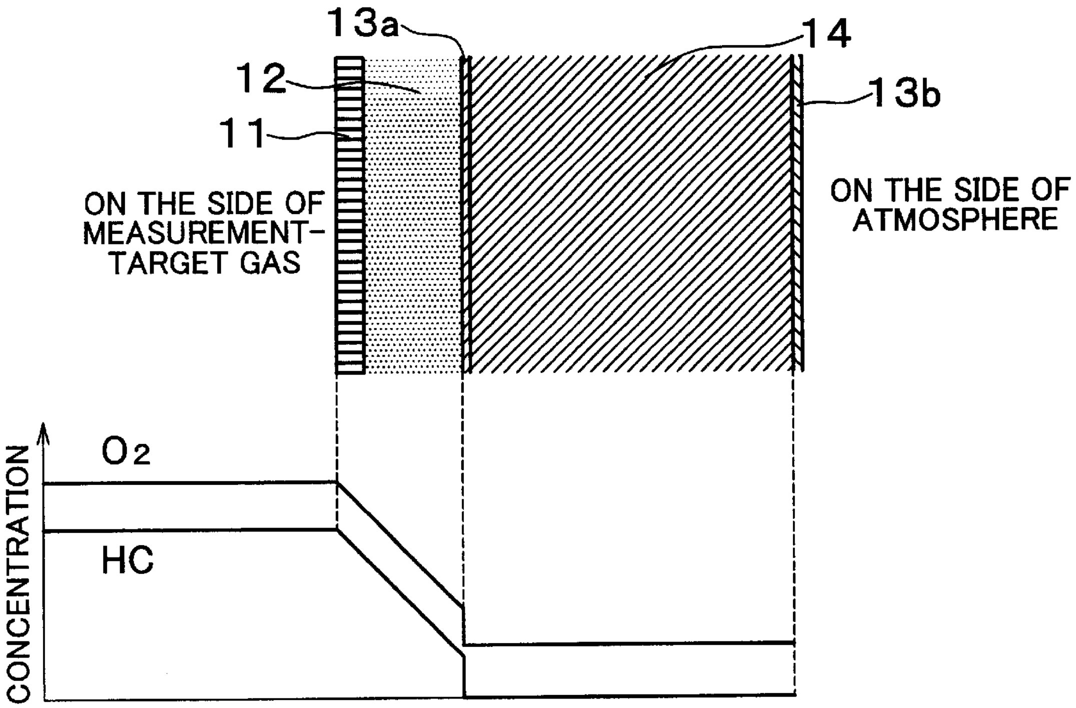
FIG. 23 is an enlarged cross-sectional view of the main part of the combustible-gas sensor device in the case where the diffused-resistor layer has a thickness of 500 $\mu$m, combined with a graph showing how the concentrations of hydrocarbons and oxygen are distributed in measurement-target gas during its passage through the combustible-gas sensor device.

As shown in FIG. 22A, if the diffused-resistor layer 12 has a thickness of 500 μm as in the case of conventional oxygen sensors, the amplitude of fluctuations observed was about 0.7 mA. This is because the reaction of combustion of hydrocarbons also occurs on the surface of the electrode 13*a* instead of being completed in the diffused-resistor layer 12 if the diffused-resistor layer 12 is as thin as 500 μm as shown in FIG. 23. The concentration of oxygen on the electrode 13*a* is destabilized, and the sensor output also fluctuates greatly as a result. On the other hand, if the diffused-resistor layer 12 has a thickness of 1000 μm, the amplitude of fluctuations was as low as 0.1 mA. That is, the effect of suppressing fluctuations in the output was confirmed.

Figure 24:
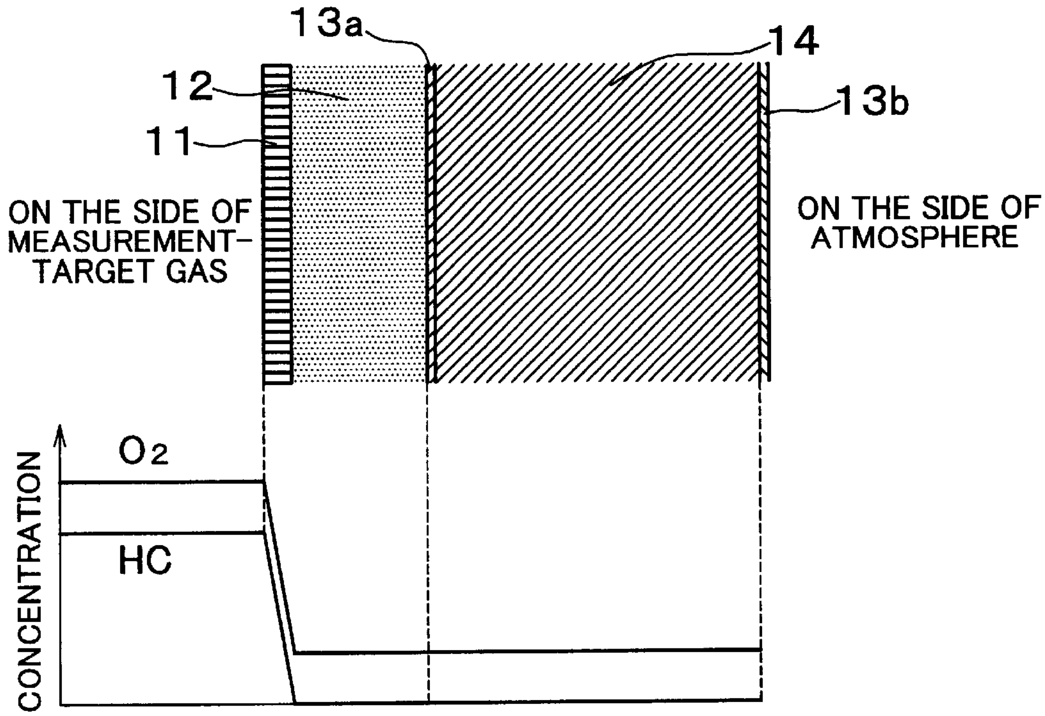
FIG. 24 is an enlarged cross-sectional view of the main part of the combustible-gas sensor device according to another aspect of the invention, combined with a graph showing how the concentrations of hydrocarbons and oxygen are distributed in measurement-target gas during its passage through the combustible-gas sensor device.
Figure 25A:
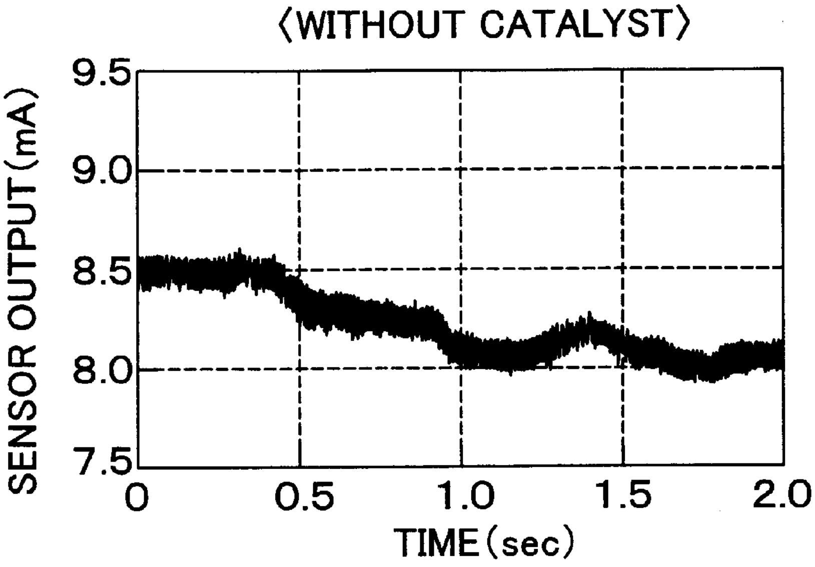
FIG. 25A shows output from the sensor in the case where no catalyst is carried on a trap layer.
Figure 25B:
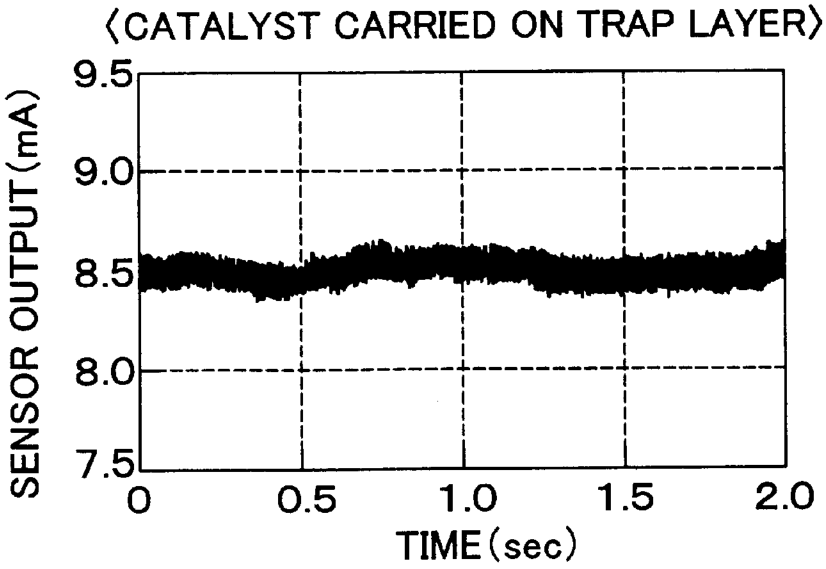
FIG. 25B shows output from the sensor in the case where a catalyst is carried on the trap layer.

FIG. 24 shows another construction of the combustible-gas sensor. This sensor is basically constructed in the same manner as the sensor shown in FIGS. 19A and 19B. The following description will handle what is different from the sensor shown in FIGS. 19A and 19B. As a means of causing a total amount of hydrocarbons to react with oxygen before the hydrocarbons reach the electrode 13*a*, the sensor shown in FIG. 24 is equipped with a trap layer 11' on which a metal functioning as a catalyst is carried, instead of setting the thickness of the diffused-resistor layer 12 equal to or greater than a predetermined minimum required thickness. The trap layer 11' functions as a catalytic layer and promotes an oxidizing reaction of hydrocarbons. For example, Pt, Pt—Rh, or the like can be used as the catalytic metal. It is preferable that the amount of the catalyst generally range from 0.5 weight % to 5 weight % with respect to a total weight of the catalytic layer.

A concrete method of forming the catalytic layer is as follows. First of all, the body of the sensor device 61 having the diffused-resistor layer 12 formed on the surface of the electrode 13*a* is soaked into a solution that is obtained by mixing a ceramic material constituting the trap layer 11' such as $\gamma$-$Al_2O_3$ with the slurry of a catalytic metal such as Pt or Pt—Rh, a dispersing agent, a binder, and the like. A film, which is to be the trap layer 11', is then formed on the surface of the sensor device 61 and stuck thereto through a thermal treatment at a high temperature equal to or higher than 500° C. Thus, the trap layer 11' functioning as a catalytic layer as well can be formed easily. If the catalyst is allowed to be carried on the surface layer of the diffused-resistor layer 12 as well, it is of course appropriate that the body of the sensor device 61 be soaked into an aqueous solution containing a catalytic metal and be subjected to a thermal treatment after formation of the trap layer 11' and the diffused-resistor layer 12 according to a normal procedure.

In the case where the sensor device 61 constructed as described above is employed, the concentrations of oxygen and hydrocarbons are distributed as shown in FIG. 24. A catalytic metal contained in the trap layer 11' completes an oxidizing reaction of the hydrocarbons in the trap layer 11'. Only the remaining oxygen passes through the diffused-resistor layer 12 and reaches the electrode 13*a*. Accordingly, the oxidizing reaction does not occur in the neighborhood of the electrode, and the sensor output is stabilized. As a result, the same effect as described above can be achieved. The aforementioned method makes it possible to form the catalytic layer and the trap layer 11' at the same time. Therefore, the catalytic layer can be manufactured easily.

Figure 26A:
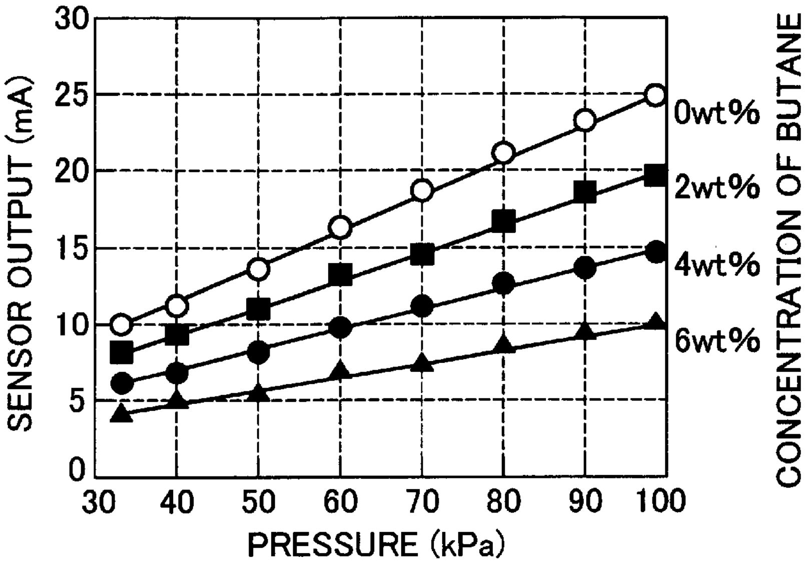
FIG. 26A shows a relation between pressure and output from the sensor.
Figure 26B:
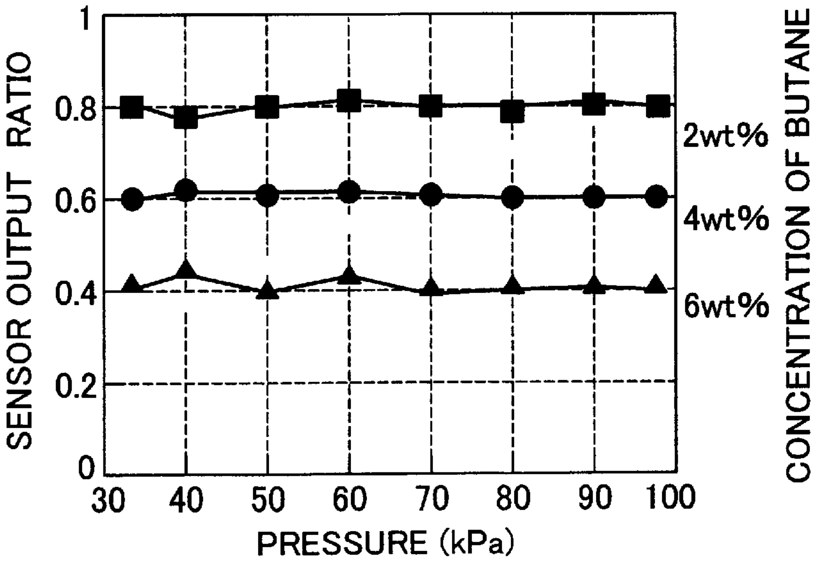
FIG. 26B shows a relation between pressure and output ratio of the sensor.

FIGS. 26A and 26B show results of a similar test that was conducted as to the combustible-gas sensor 31 on which the trap layer 11 carrying no catalyst was formed by means of the aforementioned device shown in FIG. 21 and as to the combustible-gas sensor 31 on which the trap layer 11' carrying a catalyst was formed by means of the aforementioned device shown in FIG. 21. In both cases, the diffused-resistor layer 12 used for this test has a thickness of 500 μm. Fluctuations in the sensor output were observed (FIG. 26A) in the case of the trap layer 11 carrying no catalyst, whereas stable sensor outputs were obtained in the case of the trap layer 11' carrying a catalyst (FIG. 26B).

As described hitherto, the effect of stabilizing the sensor output is achieved also by forming the catalyst layer. The sensor shown in FIG. 24 is designed such that the trap layer 11' functions as a catalytic layer as well. Desirably, it is appropriate that the oxidizing reaction be completed before the remaining oxygen reaches the electrode 13*a*. For example, the catalytic layer can be formed also by coating the surface layer portion of the diffused-resistor layer 12 with a catalyst.

The aforementioned combustible-gas sensor makes it possible to suppress fluctuations in the output during measurement and perform detection stably and precisely also in the case where measurement-target gas contains a high concentration of combustible gas.

The ECU 30 calculates a concentration of combustible gas from an output from the aforementioned combustible-gas sensor. However, the combustible-gas sensor 31 is installed in the intake system, which has a high amplitude of changes in pressure, namely, about 40 kPa. Therefore, unlike the case of the exhaust system that has a low amplitude of changes in pressure, namely, about 1 kPa, the influence of pressure cannot be ignored. Also, if the flow speed becomes equal to or lower than about 1 m/s, the sensor output fluctuates. These cases are both ascribable to the structure of the sensor device 61. For example, the behavior of diffusion of gaseous molecules during passage through the diffused-resistor layer changes in response to a change in pressure. This is considered to be the cause of the occurrence of pressure dependency. The output changes in accordance with the flow speed in the same manner. If the flow speed is equal to or higher than a certain value, there is a high dynamic pressure. Therefore, gaseous molecules are diffused uniformly. If the flow speed is equal to or lower than a certain value, there is a low dynamic pressure, so that there is created a state close to natural diffusion. Thus, the change in the output is considered to result from creation of a difference in diffusibility among gaseous molecules.

The problems caused during actual use are (1) that the sensor output changes due to a change in pressure, (2) that the sensor output changes if the flow speed of gas becomes equal to or lower than a certain value, and (3) that the sensor output does not respond correctly to an abrupt change in pressure. As the concentration of combustible gas increases, the deviation in the sensor output tends to increase owing to the influences of the increase in the concentration of combustible gas. Therefore, the ECU 30 counterbalances these influences. The corrections made by the ECU 30 will be described hereinafter.

(1) Correction of Pressure-Based Change in Sensor Output

FIG. 26A shows a relation between sensor output and pressure in the case where combustible gas exhibits various concentrations (e.g., in the case where butane gas exhibits concentrations of 0, 2, 4, and 6 weight %). In general, the amount of flowing ionic current, namely, the sensor output decreases as the concentration of combustible gas increases. However, the sensor output changes depending also on the pressure of measurement-target gas. The sensor output increases as the pressure increases. On the other hand, as shown in FIG. 26B, in each case where combustible gas exhibits a certain concentration, the sensor output ratio measured with respect to the sensor output in a reference gas containing no combustible gas (i.e., the atmosphere) is constant regardless of the pressure. Thus, a map showing a relation between sensor output in the atmosphere and pressure is stored in the ECU 30 in advance. The ECU calculates a ratio of the value detected by the combustible-gas sensor 31 to a reference output value in the map (the sensor ratio=the value detected by the combustible-gas sensor 31/the reference output value). Because this sensor output ratio does not have pressure dependency, the concentration of combustible gas can be calculated precisely.

Figure 27:
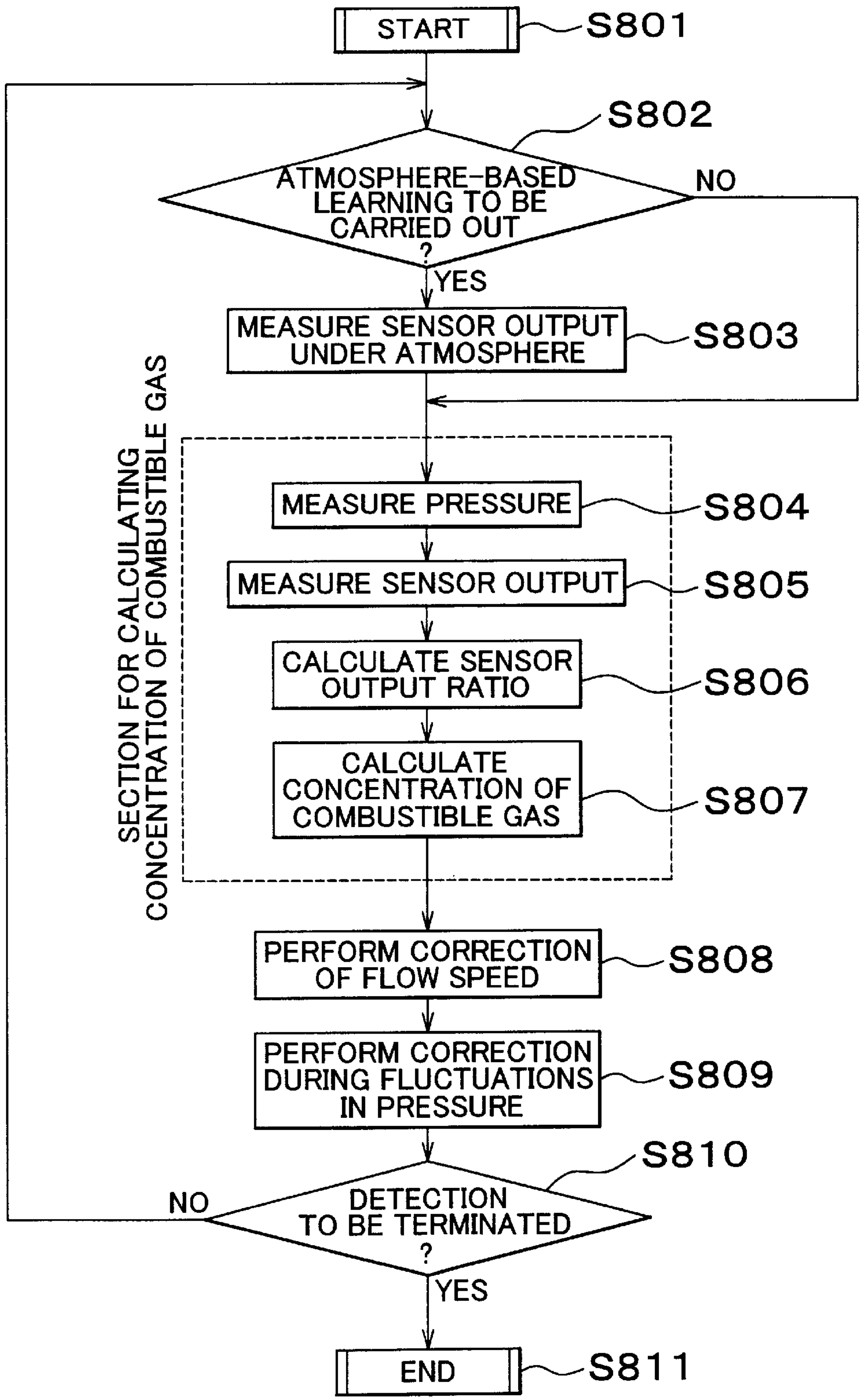
FIG. 27 is a flowchart for calculating a concentration of combustible gas.

FIG. 27 is a flowchart for calculating the concentration of combustible gas by means of the ECU 30. If the engine is started, detection of the concentration of combustible gas is started in step 801. It is then determined in step 802 whether or not atmosphere-based learning is to be carried out. A map showing a relation between changes in pressure and sensor output in the atmosphere (such as butane gas containing no combustible gas) is stored in advance in a control program in the ECU 30. In order to correct a deviation in the sensor output resulting from the aging of the sensor device 61, the control program in the ECU 30 is executed when no fuel vapors are purged from the canister 40. In step 803, detection of a pressure and a sensor output in the atmosphere (containing no combustible gas) is performed so as to correct the map.

Measurement of a pressure of measurement-target gas and an output from the combustible-gas sensor 31 is then performed in steps 804, 805, respectively. On the basis of these measured values, calculation of a sensor output ratio is performed in step 806. Using the map, calculation of a concentration of combustible gas is performed on the basis of the sensor output ratio in step 807. In addition, correction of a flow speed is performed in step 808. Correction of fluctuations in pressure is performed in step 809. These processings will be described later. It is then determined in step 808 whether or not detection is to be terminated. As long as the engine is in operation, the processing in step 802 is performed again, so that the routine for detection is repeated. Detection is terminated if the engine speed becomes zero (step 811).

(2) Correction of Sensor Output During Change in Flow Speed

Figure 28A:
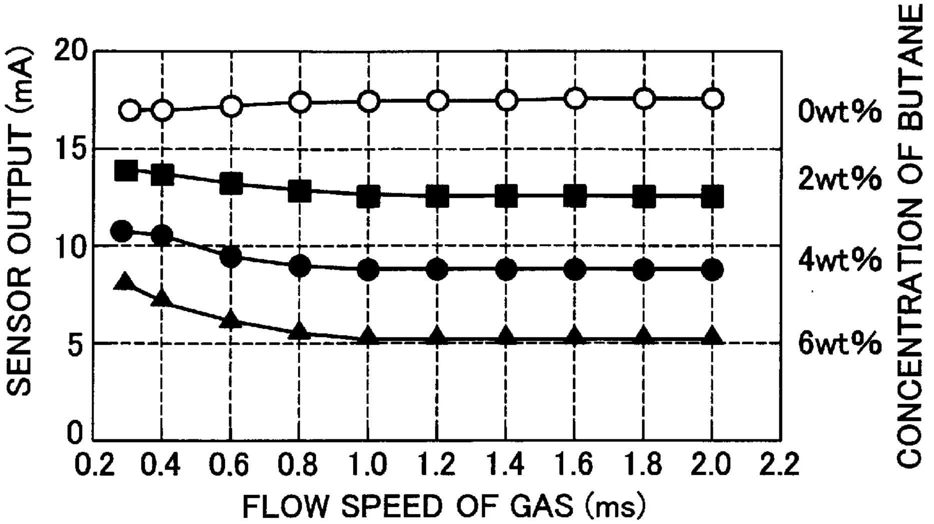
FIG. 28A shows a relation between flow rate of gas and output from the sensor.

If the flow speed becomes lower than a certain value, the sensor output is affected by the decrease in flow speed. Therefore, the sensor output is corrected in step 808. FIG. 28A shows how the sensor output value changes as the flow speed changes under the condition of a constant pressure. If the concentration of combustible gas (the concentration of butane gas in this case) is zero, the sensor output is constant. However, if combustible gas (i.e., butane gas having concentrations of 2, 4, and 6 weight %) is mixed, the sensor output is affected by the flow speed on the low flow speed side and shifts to the high-output side. If the flow speed of measurement-target gas is lower than a certain value (e.g., lower than 1 m/s in FIG. 28A in the case of butane gas), it is determined that the sensor output is affected by the flow speed. The sensor output is then corrected.

Figure 28B:
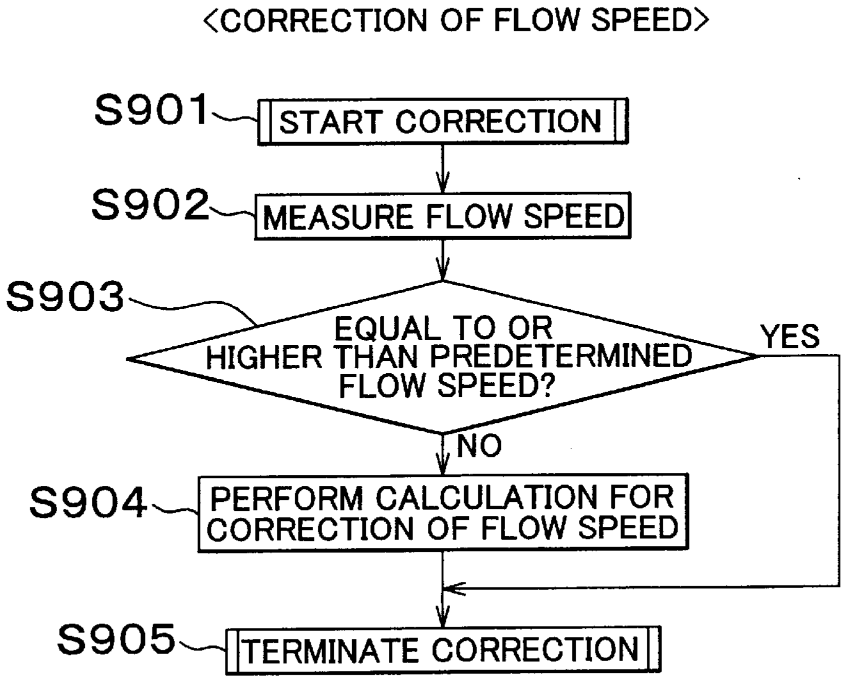
FIG. 28B is a flowchart for correcting a flow rate.

FIG. 28B is a flowchart for correction of the flow speed. First of all, if correction is started in step 901, measurement of a flow speed of measurement-target gas is then performed in step 902. It is determined in step 903 whether or not the measured flow speed is equal to or higher than a certain value (1 m/s in this case). If the measured flow speed is lower than the aforementioned value, calculation for correcting the flow speed is performed in step 904. In this case, a map for correction based on FIG. 28A (a map showing a relation between flow speed and sensor output) is stored in advance in the ECU 30. After performing correction with the aid of the map, the ECU 30 performs the processing in step 905 and thereby terminates this routine for correction. If the measured flow speed is equal to or higher than the aforementioned value in step 903, the ECU 30 immediately performs the processing in step 905 and thereby terminates this routine for correction.

(3) Correction of Sensor Output during Transient Changes in Pressure

Figure 29A:
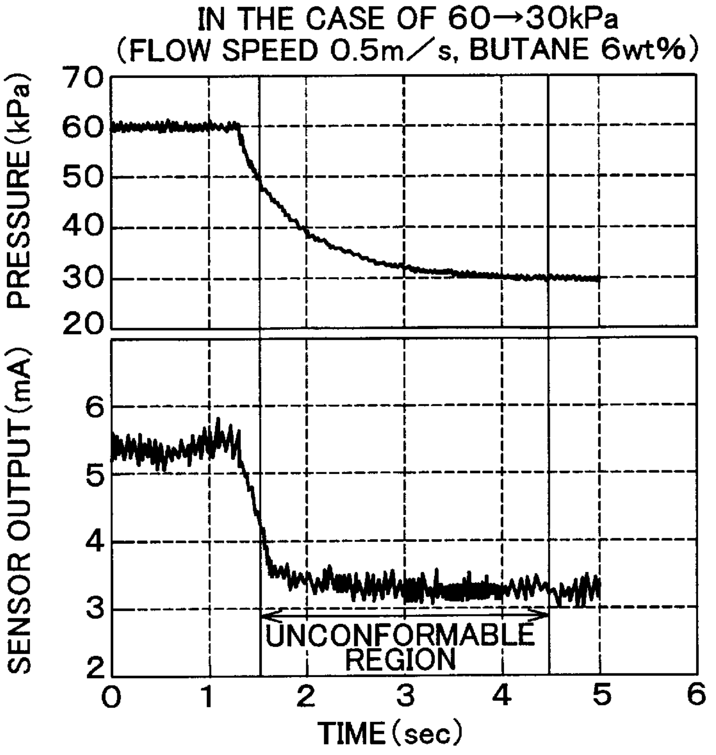
FIG. 29A shows a relation between change in pressure and output from the sensor.

If the pressure change rate remains above a pressure change rate at the time of the start of correction (a set value) for a certain period in step 809 of FIG. 27, it is then corrected. FIG. 29A shows a relation between pressure and sensor output value in the case where the pressure is reduced under the condition of a constant flow speed of gas and a constant concentration. During transient changes in pressure (especially in the case of abrupt changes in pressure), the sensor output ought to be output in accordance with the changes in pressure as indicated by a dotted line in a lower stage of FIG. 29A. In fact, however, there is an unconformable region in which the sensor output does not follow a steady-state value indicated by the dotted line. During a decrease in pressure, the sensor output is lower than the steady-state value as shown in the lower stage of FIG. 29A. During an increase in pressure, on the contrary, the sensor output is higher than the steady-state value. The ECU 30 performs correction on the basis of this relation and thus enhances the precision in detecting the concentration of gas.

Figure 29B:
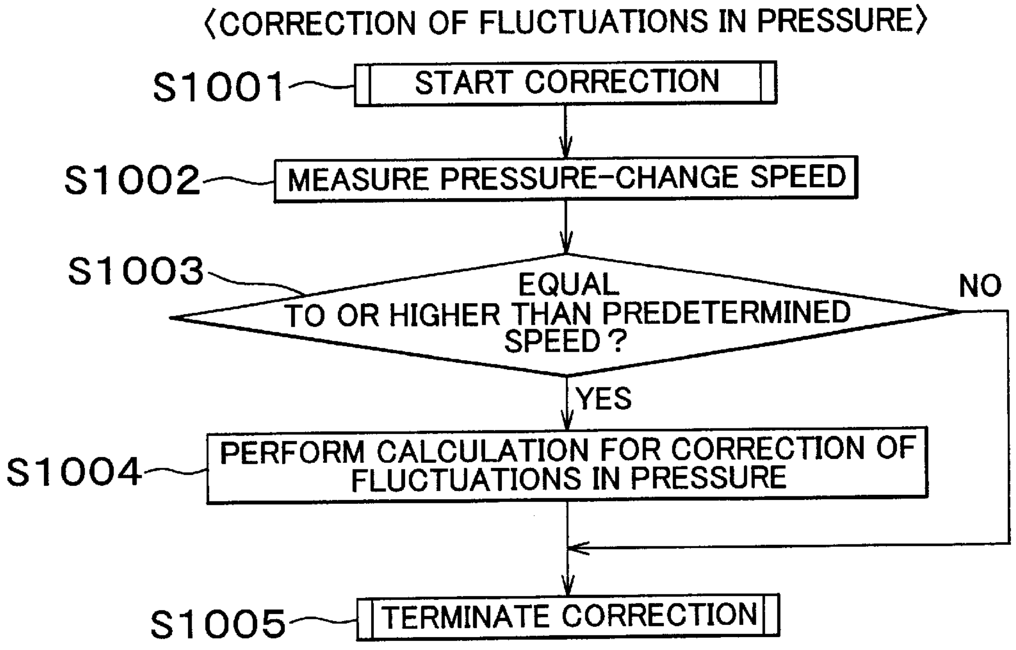
FIG. 29B is a flowchart for correcting pressure fluctuations.

FIG. 29B is a flowchart of control performed by the ECU 30 during transient changes in pressure. The sensor output during transient changes in pressure follows the changes in pressure for a certain period since the start of the changes in pressure (after about 1.3 to 1.5 seconds since the start of the changes in pressure, namely, for about 0.2 seconds in the sensor-output diagram shown in FIG. 29A). The sensor output assumes correct values for this period and then enters the unconformable region. Thus, if correction is started first of all in step 1001, measurement of a pressure-change speed of measurement-target gas is then performed in step 1002. It is determined in step 1003 whether or not the measured pressure-change speed is equal to or higher than a predetermined value at the time of the start of correction (e.g., 10 kPa/s). If the pressure-change speed is higher than the predetermined value, the change in pressure is considered to cause a deviation in the sensor output. If the pressure-change speed remains higher than the predetermined value for the aforementioned period, calculation for correcting fluctuations in pressure is performed in step 1004.

There are two methods of calculation for correcting fluctuations in pressure. According to one of the methods, the sensor output is corrected by being multiplied by a constant value that is preset in accordance with a pressure-change speed. The sensor output is corrected increasingly during a decrease in pressure, and is corrected decreasingly during an increase in pressure. If calculation for correction of fluctuations in pressure is performed by this method in step 1004, this routine for correction is terminated in step 1005. If the pressure-change speed is equal to or higher than the predetermined value in step 1003, the processing in step 1005 is performed immediately so as to terminate the routine for correction.

Alternatively, it is also appropriate to calculate a change rate of the concentration of gas during the aforementioned period in which the sensor output assumes a correct value, and to perform calculation for correction of fluctuations in pressure on the basis of the calculated change rate. In this case, on the ground that the sensor output during the aforementioned period changes at the aforementioned change rate while the sensor output is deviant from the correct value after the aforementioned period, namely, until the pressure-change speed becomes equal to or lower than the aforementioned predetermined value, estimation of a concentration of combustible gas is performed.

Thus, the combustible-gas sensor of this embodiment makes it possible to perform measurement precisely without being influenced by fluctuations in pressure or a decrease in flow speed. Therefore, it is possible, for example, to directly detect a concentration of fuel vapors in the intake system, enhance the controllability of the fuel injection amount, and reduce a concentration of exhaust emission substances.

Although the combustible-gas sensor device having the oxygen-ion conductor in the form of a test tube is employed in the aforementioned embodiment, it is also possible to employ a layer-built combustible-gas sensor device having an oxygen-ion conductor in the shape of a flat plate. Also, it is possible to detect various combustible gases in addition to butane gas and gasoline vapors.

If the output from the combustible-gas sensor is corrected as described above, the influence of environmental changes such as changes in pressure or a decrease in flow speed is eliminated. Thus, the concentration of combustible gas can be measured with precision even during transient changes in pressure.

As shown in FIG. 1, the intake passage of the internal combustion engine may be supplied with EGR gas as well as evaporative fuel flowing from the purging device. For instance, in the case of an engine equipped with a PCV (positive crank-case ventilation) device for ventilating a crank case, ventilation gas in the crank case is supplied to an intake passage. This ventilation gas contains a large amount of blow-by gas blowing through a space between each piston and a corresponding one of cylinders and entering the crank case, and a large amount of hydrocarbon components such as fuel absorbed into lubricating oil.

Thus, the engine having the intake passage that is supplied with EGR gas or crank-case ventilation gas (hereinafter referred to as "PCV gas") as well as evaporative fuel (hereinafter referred to as "purge gas") flowing from the purging device may encounter a problem regarding a positional relation between the portion for introducing gas into the intake passage and the intake-oxygen concentration sensor.

For example, if an EGR port is disposed in the intake passage upstream of the intake-oxygen concentration sensor, EGR gas flowing from the EGR port directly bumps into the intake-oxygen concentration sensor. As described above, the method of calculating a concentration of evaporative fuel (hydrocarbons) contained in intake gas from an output from the intake-oxygen concentration sensor makes use of an amount of decrease in the concentration of oxygen which results from the consumption of oxygen due to the combustion of hydrocarbons on the sensor electrode. Thus, if EGR gas exhibiting an extremely low concentration of oxygen bumps into the intake-oxygen concentration sensor directly, the concentration of oxygen detected by the intake-oxygen concentration sensor decreases greatly by more than a value corresponding to the amount of oxygen consumed by the combustion of hydrocarbons. This causes a problem of making it impossible to calculate a concentration of evaporative fuel precisely on the basis of an output from the intake-oxygen concentration sensor.

It is also to be noted herein that PCV gas contains hydrocarbons. If a PCV port is located upstream of the intake-oxygen concentration sensor, PCV gas containing hydrocarbons as well as purge gas flowing from a vapor port bumps into the intake-oxygen concentration sensor. This may make it impossible to precisely detect a concentration of evaporative fuel that is supplied while being contained in purge gas. In addition, hydrocarbons absorbed into lubricating oil are discharged gradually as the temperature of lubricating oil rises after the start of the engine. Because the amount of PCV gas also changes as the engine is operated, it may be difficult to precisely counterbalance the influence of PCV gas exerted upon the output from the intake-oxygen concentration sensor.

EGR gas and PCV gas contain oil components and combustion products such as soot. Therefore, if EGR gas or PCV gas bumps into the intake-oxygen concentration sensor, an intake gas-introducing hole at a detecting end of the sensor may become clogged with these oil components, soot, and the like. This may cause a problem of making it impossible to calculate a concentration of evaporative fuel precisely.

Figure 30:
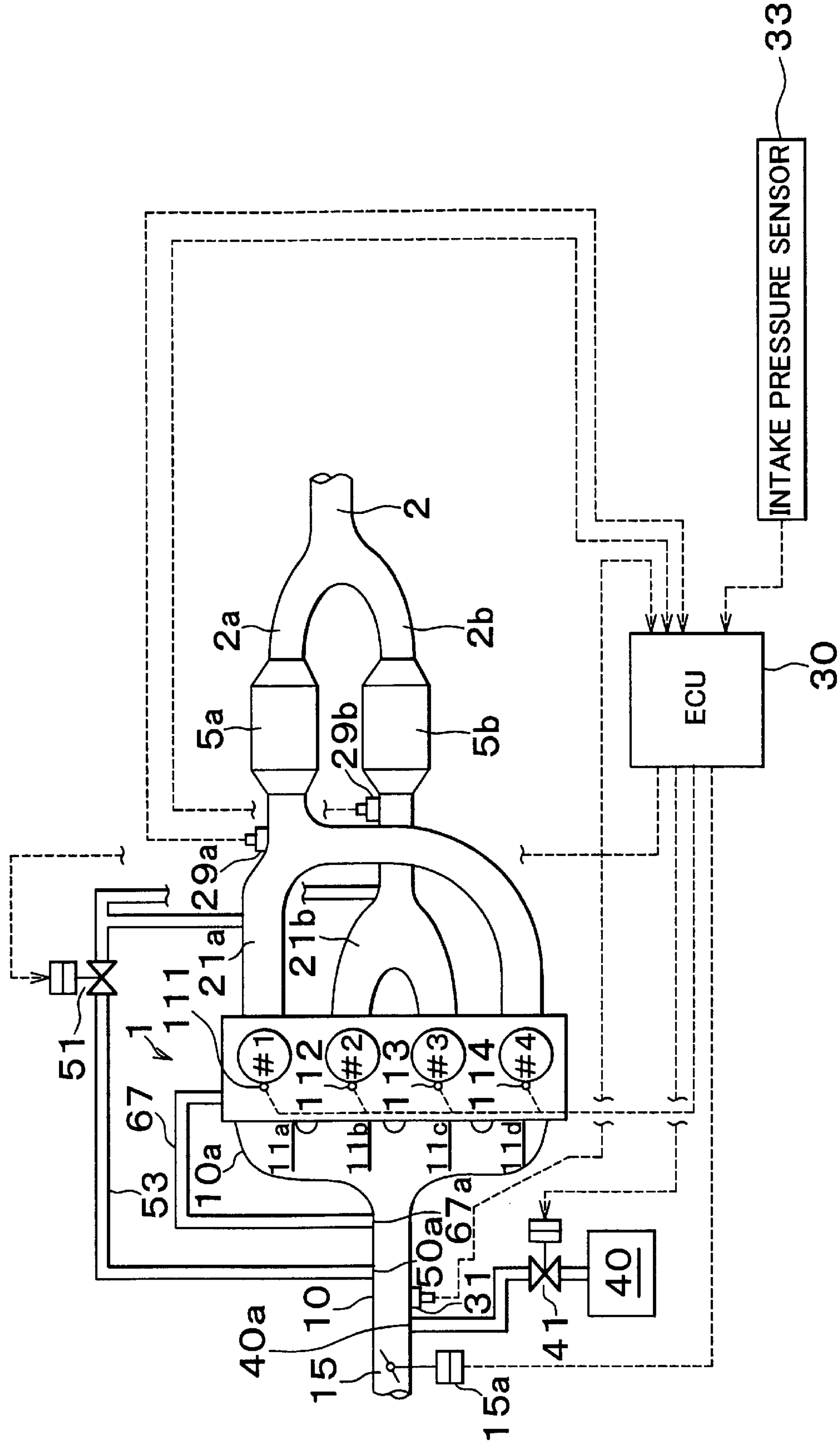
FIG. 30 is a schematic structural view of a vehicular internal combustion engine to which the invention is applied.

In this embodiment, unlike the construction shown in FIG. 1, an EGR port 50*a* connected to the EGR control valve 51 via the EGR passage 53 is disposed downstream of the intake-oxygen concentration sensor 31 in an intake duct 10 as shown in FIG. 30.

In the construction shown in FIG. 30, unlike the construction shown in FIG. 1, a PCV port 67*a* connected to the crank-case ventilation device (the PCV device) (not shown) of the engine 1 via a PCV passage 67 is disposed downstream of the intake-oxygen concentration sensor 31 in the intake duct 10. Ventilation gas in the engine crank case is supplied to the intake duct 10 from the PCV port 67*a*.

In this embodiment, the EGR port 50*a* and the PCV port 67*a* are disposed in the intake duct 10 downstream of a position where the intake-oxygen concentration sensor 31 is mounted. This is because of the following reasons.

(1) To Prevent Errors in Output from the Intake-Oxygen Concentration Sensor 31 from Being Caused by EGR Gas and PCV Gas If the EGR port 50*a* or the PCV port 67*a* is disposed upstream of the intake-oxygen concentration sensor 31, EGR gas exhibiting a low concentration of oxygen or PCV gas containing hydrocarbons bumps into the intake-oxygen concentration sensor 31. Therefore, the output from the intake-oxygen concentration sensor 31 does not exactly correspond to the concentration of oxygen contained in intake gas, and it becomes impossible to precisely calculate a concentration of evaporative fuel contained in intake gas. If the EGR port 50*a* and the PCV port 67*a* are disposed downstream of the intake-oxygen concentration sensor 31, EGR gas or PCV gas does not reach the intake-oxygen concentration sensor 31. Thus, the output from the intake-oxygen concentration sensor 31 exactly corresponds to the concentration of oxygen contained in intake gas.

PCV gas contains hydrocarbons (fuel) discharged from lubricating oil in the engine. Therefore, as in the case of evaporative fuel contained in purge gas, it is essentially necessary to detect an amount of hydrocarbons contained in PCV gas as well and correct a fuel injection amount in accordance with the amount of hydrocarbons.

In fact, however, the amount of hydrocarbons contained in PCV gas increases gradually as the temperature of the engine rises. Therefore, no abrupt fluctuations occur as in the case where purge is started or stopped. Therefore, even if the fuel injection amount for hydrocarbons contained in PCV gas is corrected through normal air-fuel ratio feedback control based on outputs from the exhaust-gas air-fuel ratio sensors 29*a*, 29*b*, no fluctuations in the air-fuel ratio occur. Accordingly, even if the PCV port 67*a* is disposed downstream of the intake-oxygen concentration sensor 31, no problem is caused in terms of the control.

(2) To Prevent the Intake Gas-Introducing Hole of the Intake-Oxygen Concentration Sensor 31 from Being Clogged As described above, combustible components such as hydrocarbons contained in intake gas burn on the electrode of the intake-oxygen concentration sensor 31. Thus, as shown in FIG. 19A, the detecting portion of the intake-oxygen concentration sensor 31 is provided with an explosion-proof cover 62 so as to prevent combustible materials contained in intake gas from being ignited by combustion of combustible materials such as hydrocarbons on the electrode. Intake gas is introduced into the detecting portion through pores formed in the explosion-proof cover 62. On the other hand, EGR gas contains combustion products such as soot, and PCV gas contains oil components. Therefore, if EGR gas or PCV gas is in direct contact with the intake-oxygen concentration sensor 31, the pores in the explosion-proof cover 62 are clogged with the aforementioned combustion products and oil components, or the electrode is tainted with them. In some cases, the output from the intake-oxygen concentration sensor 31 does not exactly correspond to the concentration of oxygen contained in intake gas.

This embodiment is designed such that the EGR port 50*a* and the PCV port 67*a* are disposed downstream of the intake-oxygen concentration sensor 31 and that EGR gas or PCV gas is not in direct contact with the intake-oxygen concentration sensor 31. Therefore, there is caused no problem regarding the clogging of the pores in the explosion-proof cover 62, a taint on the electrode, or the like.

(3) To Prevent Purge Gas from Bumping into the Intake-Oxygen Concentration Sensor Irregularly If the EGR port 50*a* and the PCV port 67*a* are disposed upstream of the intake-oxygen concentration sensor 31, a problem of an irregular bump of gas into the intake-oxygen concentration sensor is caused in addition to the aforementioned problems. This problem is likely to be caused especially in the case where a control valve designed to be opened and closed at intervals of a short period and to adjust the flow rate of purge gas by changing a ratio of open-period to closed-period (i.e., duty ratio) is employed as the purge control valve.

Figure 31:
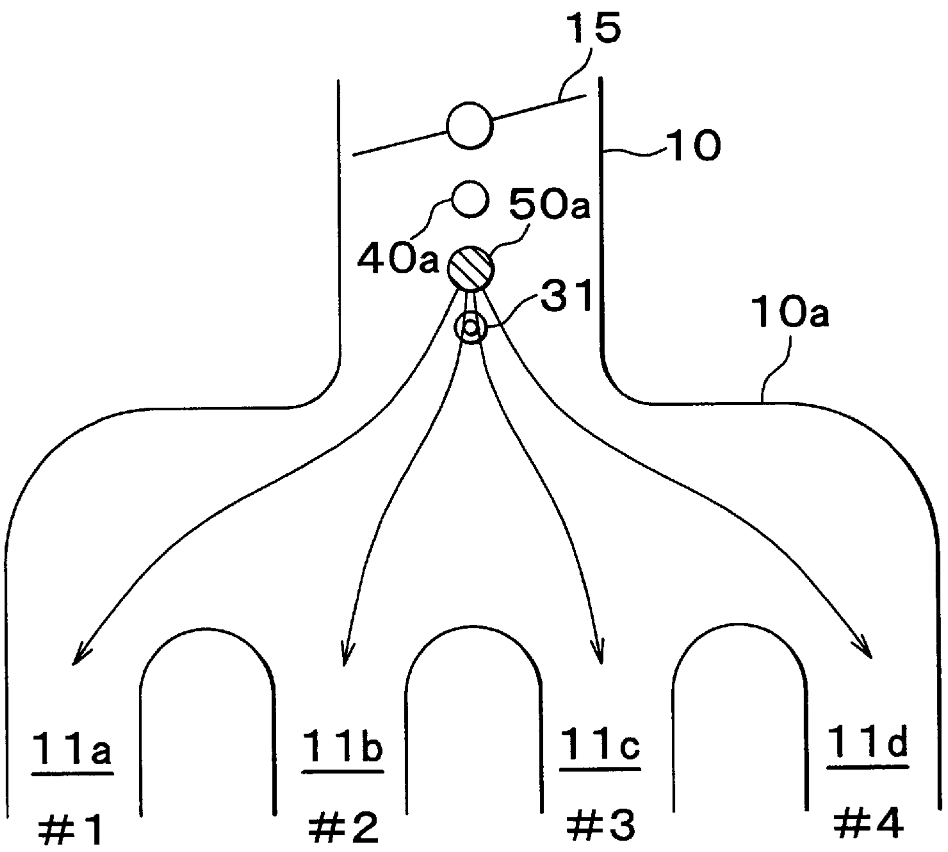
FIG. 31 illustrates how gas bumps into the intake-oxygen concentration sensor irregularly.

FIG. 31 is a schematic view of the intake system, showing the reason why purge gas bumps into the intake-oxygen concentration sensor irregularly.

In FIG. 31, the same reference numerals as in FIGS. 1 and 30 represent the same component members as shown in FIGS. 1 and 30. FIG. 31 shows a case where the EGR port 50*a* is disposed between the intake-oxygen concentration sensor 31 and a purge port 40*a*.

Unlike the purge control valve 41, the EGR control valve 51 changes its opening and thereby controls the flow rate of EGR gas. Therefore, EGR gas is continuously supplied to the intake duct 10 from the EGR port 50*a* (PCV gas is supplied continuously in the same manner as EGR gas).

The following description will handle a case where the intake-oxygen concentration sensor 31 is disposed relatively close to the surge tank 10*a* owing to restrictions imposed by the geometry, dimension, and the like of the intake duct.

In this case, the EGR port 50*a* is relatively close to the inlets of the intake branch pipes 11*a* to 11*d* of the cylinders. In the surge tank 10*a*, the flow of intake gas changes depending on the timing when intake gas is sucked into each of the cylinders. That is, as shown in FIG. 31, intake gas flows substantially from the inlet of the surge tank 10*a* into each of the cylinders across the surge tank 10*a*, at the timing when intake gas is sucked into that cylinder. In this case, if the EGR port 50*a* is located relatively close to the inlet of the surge tank 10*a*, EGR gas flowing from the EGR port 50*a* is also conveyed by the flow of intake gas and changes its direction of flow as indicated by each arrow shown in FIG. 31 at the timing when intake gas is sucked into a corresponding one of the cylinders.

That is, in this case, a relatively large amount of EGR gas flows through the intake-oxygen concentration sensor 31 at the timings when intake gas is sucked into the cylinders #2, #3, whereas a relatively small amount of EGR gas contained in intake gas flows through the intake-oxygen concentration sensor 31 at the timings when intake gas is sucked into the cylinders #1, #4. Because purge gas supplied from the purge port 40*a* flows while being conveyed by the aforementioned EGR gas flowing from the EGR port 50*a* disposed directly below the purge port 40*a*, the amount of purge gas flowing from each of the cylinders and reaching the intake-oxygen concentration sensor 31 also changes in accordance with the timing when intake gas is sucked into that cylinder. In this case as well, if purge gas flowing from the purge port 40*a* flows continuously, it is possible to calculate an amount of evaporative fuel contained in intake gas with a certain precision by averaging outputs from the intake-oxygen concentration sensor 31 at the timings when intake gas is sucked into the cylinders.

As described above, however, if the purge control valve 41 is designed to control the flow of purge gas by being opened and closed repeatedly through duty control, purge gas enters from the purge port 40*a* intermittently. Thus, if the purge control valve 41 is opened or closed at a certain timing, there may be a case where purge gas is supplied, for example, only at the timing when intake gas is sucked into the cylinder #1 and where purge gas is stopped from being supplied at the timings when intake gas is sucked into the other cylinders. In this case, only values remote from the actual concentration of oxygen contained in intake gas can be obtained even if outputs from the oxygen concentration sensor at the timings when intake gas is sucked into the cylinders are averaged. That is, purge gas bumps into the sensor irregularly due to the influence of EGR gas. Although the foregoing description handles the EGR port 50*a* as an example, a similar problem arises even if the PCV port 67*a* is disposed upstream of the intake-oxygen concentration sensor 31 or even if both the EGR port 50*a* and the PCV port 67*a* are disposed upstream of the intake-oxygen concentration sensor 31.

As shown in FIG. 30, this embodiment is designed such that the EGR port 50*a* and the PCV port 67*a* are disposed downstream of the intake-oxygen concentration sensor 31 and thus makes it possible to dispose the intake-oxygen concentration sensor 31 immediately downstream of the purge port 40*a*. Therefore, purge gas is prevented from bumping into the intake-oxygen concentration sensor 31 irregularly as described above.

In the case where the EGR port 50*a* and the PCV port 67*a* are disposed downstream of the intake-oxygen concentration sensor 31 as described above and where the intake duct 10 extending from the throttle valve 15 to the inlet of the surge tank 10*a* is short, it may become impossible to provide the intake duct 10 with the EGR 50*a* or the PCV port 67*a*. If the distance from the throttle valve 15 to the inlet of the surge tank 10*a* is extremely short, it may become impossible to dispose the intake-oxygen concentration sensor 31 itself in the intake duct 10.

In such a case, the concentration of oxygen contained in intake gas can be detected precisely by the intake-oxygen concentration sensor if the surge tank 10*a* is provided with two or more EGR ports 50*a* and two or more PCV ports 61*a*.

Figure 32:
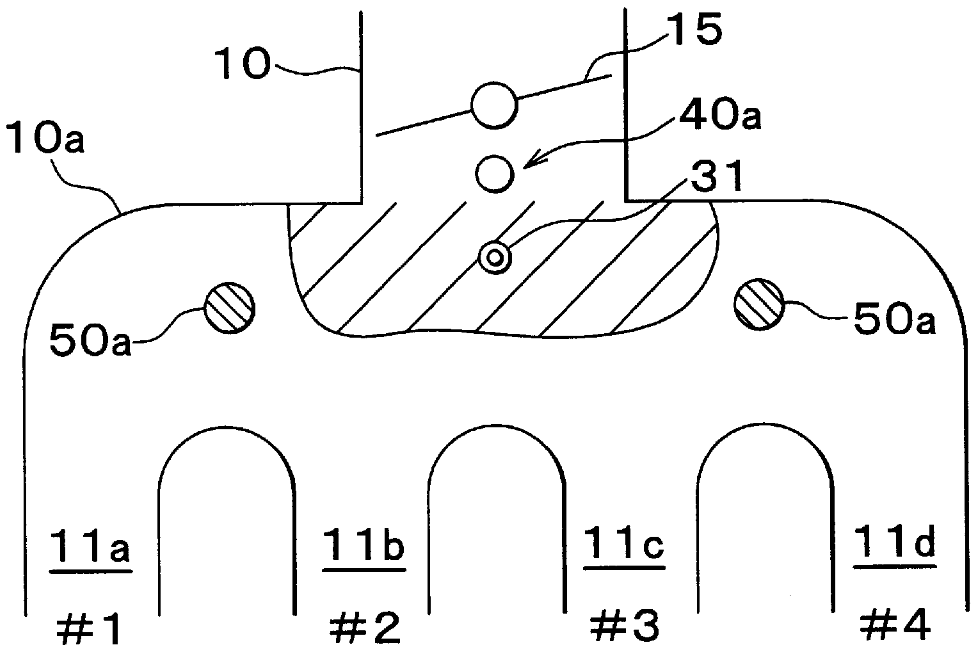
FIG. 32 shows one arrangement of the intake-oxygen concentration sensor and an EGR port.

FIG. 32 shows a case where the surge tank 10*a* is provided with two EGR ports 50*a*. Although FIG. 32 shows only the EGR ports 50*a*, the same arrangement can also be adopted as to the PCV ports.

If the surge tank 10*a* is provided with the EGR ports 50*a* (or the PCV ports or both the EGR ports 50*a* and the PCV ports), EGR gas needs to be distributed uniformly into the cylinders. Therefore, if the surge tank 10*a* is provided with the EGR ports 50*a*, the number of the EGR ports 50*a* to be provided must be at least two. In the example shown in FIG. 32, one of the EGR ports 50*a* is disposed between the inlets of the intake branch pipes 11*a*, 11*b* of the cylinders #1, #2, so that EGR gas is distributed uniformly into the cylinders #1, #2. The other EGR port 50*a* is disposed between the inlets of the intake branch pipes 11*c*, 11*d* of the cylinders #3, #4, so that EGR gas is distributed uniformly into the cylinders #3, #4.

In this case, the intake-oxygen concentration sensor 31 can be disposed anywhere in a region indicated by oblique lines in FIG. 32. In the case of real engines, the intake-oxygen concentration sensor 31 is relatively bulky and can be mounted only at certain positions in the intake duct 10. However, if the surge tank 10*a* is thus provided with the two EGR ports 50*a*, the region in which the intake-oxygen concentration sensor 31 can be mounted without affecting the precision in detecting a concentration of oxygen contained in intake gas spreads to the surge tank 10*a* as indicated by the oblique lines in FIG. 32. Thus, the degree of freedom in selecting the position where the sensor 31 is mounted is increased substantially.

Figure 33:
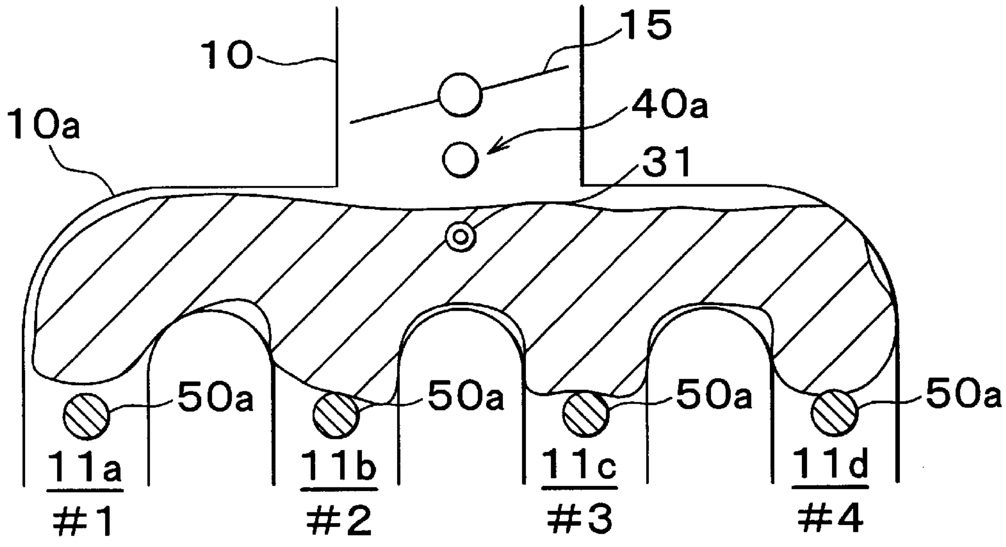
FIG. 33 shows another arrangement of the intake-oxygen concentration sensor and the EGR port.

In the case shown in FIG. 32, the two EGR ports 50*a* (or the two PCV ports 67*a* or both the two EGR ports 50*a* and the two PCV ports 67*a*) are provided. For example, however, each intake branch pipe leading to a corresponding one of the cylinders can also be provided with the EGR port 50*a* as shown in FIG. 33. In this case, as indicated by oblique lines in FIG. 33, the region in which the intake-oxygen concentration sensor 31 can be mounted is enlarged in comparison with the case shown in FIG. 32.

Figure 34:
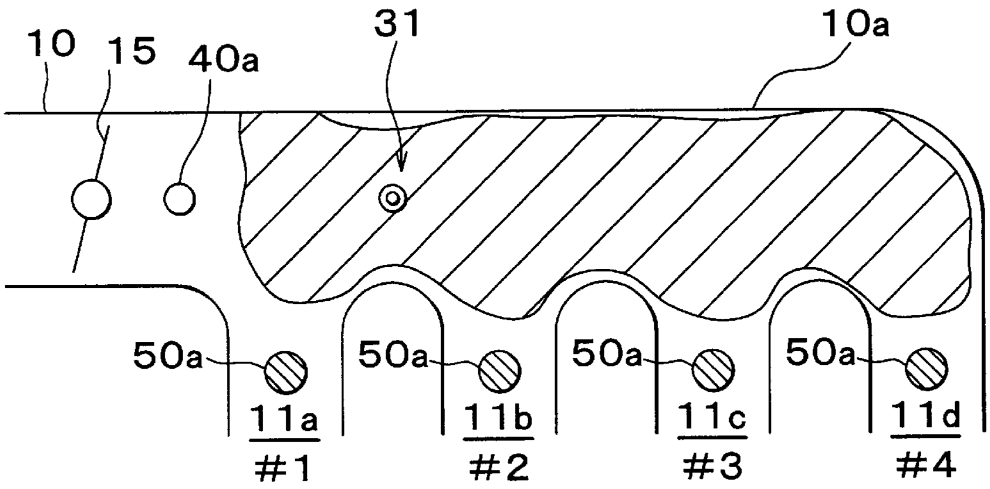
FIG. 34 shows another arrangement of the intake-oxygen concentration sensor and the EGR port.

FIG. 34 shows arrangement of the EGR (PCV) ports and the intake-oxygen concentration sensor in the case of a surge tank that is different in shape from those shown in FIGS. 32 and 33.

If the surge tank is asymmetrical with respect to the intake duct as shown in FIG. 34, the region in which the intake-oxygen concentration sensor 31 can be mounted can be enlarged as in the case of FIG. 33 by providing each of the intake branch pipes 11*a* to 11*d* with the EGR port 50*a* (the PCV port 67*a*).

The number of the EGR ports 50*a* provided in the surge tank is equal to or greater than two in FIGS. 32 and 33. As described above, the same holds true in the case where two PCV ports are provided in place of or in addition to the EGR ports. In the case where the intake-oxygen concentration sensor 31 is disposed in the intake duct 10, it becomes possible to detect a concentration of oxygen contained in intake gas precisely by means of the intake-oxygen concentration sensor 31 without being affected by EGR gas and PCV gas, also by disposing one EGR port or one PCV port in the intake duct downstream of the intake-oxygen concentration sensor 31 and two PCV ports or two EGR ports in the surge tank 10*a*.

The posture in which the intake-oxygen concentration sensor 31 is mounted to the intake duct 10 or the surge tank 10*a* will now be described.

Figure 35:
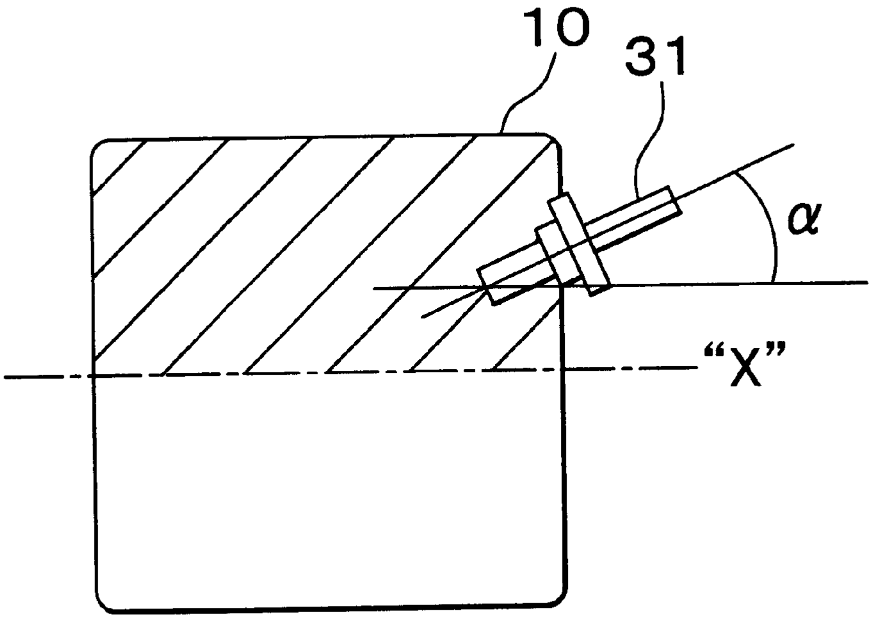
FIG. 35 is an explanatory view of the posture in which the intake-oxygen concentration sensor is mounted.

FIG. 35 is a vertical cross-sectional view of the intake duct 10, showing a portion where the intake-oxygen concentration sensor 31 is mounted. In FIG. 35, the intake-oxygen concentration sensor 31 is mounted to the intake duct 10 (or the surge tank 10*a*) at a position above a horizontal plane X extending through the center of the cross-section of the intake duct 10 (or the surge tank 10*a*). The intake-oxygen concentration sensor 31 forms a suitable angle α with the horizontal plane X such that the detecting end of the sensor is directed downwards.

In some cases, waterdrops enter the intake duct 10 during operation of the engine as a result of rainfall or a splash of water. If the temperature falls during stoppage of the engine, moisture contained in air in the intake duct 10 may condense and adhere to the wall surface of the intake duct 10 as waterdrops. These waterdrops gather and stay on the lower side in a horizontal portion of the intake duct 10. Therefore, if the intake-oxygen concentration sensor 31 is disposed on the lower side of the intake duct 10, the intake gas-introducing pores 65 in the explosion-proof cover 62 of the intake-oxygen concentration sensor 31 shown in FIG. 19A are clogged with waterdrops, so that it may become impossible to detect a concentration of oxygen contained in intake gas precisely during operation of the engine. Thus, this embodiment is designed such that the intake-oxygen concentration sensor 31 is disposed above the center of the intake duct 10, and thereby prevents the intake gas-introducing pores from being clogged with waterdrops in the intake duct 10.

As described above, hydrocarbons burn in the explosion-proof cover 62 at the detecting end of the intake-oxygen concentration sensor 31. Therefore, moisture produced by combustion may condense in the explosion-proof cover 62 during stoppage of the engine. If moisture produced through condensation stays in the explosion-proof cover 62, it may adhere to the sensor electrode or stay in the intake gas-introducing pores 65 and make precise detection of a concentration of oxygen contained in intake gas impossible.

In this embodiment, the posture in which the intake-oxygen concentration sensor 31 is mounted is set such that the intake-oxygen concentration sensor 31 forms a suitable angle with the horizontal plane X with its detecting end directed downwards as shown in FIG. 35. Thus, even if waterdrops form in the explosion-proof cover 62, they flow out from the intake gas-introducing pores 65 immediately without staying in the cover 62 or in the pores 65. Therefore, it is possible to prevent moisture from adhering to the electrode or prevent the intake gas-introducing pores 65 from being clogged with moisture. Thus, it becomes possible to precisely detect a concentration of oxygen contained in intake gas by means of the intake-oxygen concentration sensor 31 without being affected by waterdrops produced during stoppage of the engine.

What is claimed is:

1. A combustible-gas sensor that is equipped with a sensor device having a pair of electrodes which are formed on the surface of an oxygen-ion conductor and one of the electrodes is disposed in a space where measurement-target gas containing combustible gas and oxygen exists and that detects a concentration of combustible gas on the basis of a change in the concentration of oxygen contained in measurement-target gas resulting from an oxidizing reaction of combustible gas, comprising:

a correction portion that corrects a deviation in sensor output resulting from a pressure of measurement-target gas, on the basis of a sensor output in the atmosphere of a reference gas.

2. The combustible-gas sensor according to claim 1, wherein:

the correction portion has a relation between a pressure measured in advance in the atmosphere of the reference gas and a sensor output at the pressure stored as a map, calculates a ratio of an output value of the sensor device at a given pressure to be measured to the sensor output at the given pressure as a reference output value, on the based of the map, and calculates a concentration of combustible gas from the ratio.

3. A combustible-gas sensor that is equipped with a sensor device having a pair of electrodes which are formed on the surface of an oxygen-ion conductor and one of the electrodes is disposed in a space where measurement-target gas containing combustible gas and oxygen exists and that detects a concentration of combustible gas on the basis of a change in the concentration of oxygen contained in measurement-target gas resulting from an oxidizing reaction of combustible gas, comprising:

a correction portion corrects a deviation in sensor output resulting from a pressure of the measurement-target gas, on the basis of a map of a relation between a flow speed of measurement-target gas and a sensor output.

4. The combustible-gas sensor according to claim 3, wherein the correction portion determines that the flow speed of measurement-target gas affects the output only if the flow speed of measurement-target gas is lower than a predetermined value, and then performs to correct the deviation in the sensor output.

5. A combustible-gas sensor that is equipped with a sensor device having a pair of electrodes which are formed on the surface of an oxygen-ion conductor and one of the electrodes is disposed in a space where measurement-target gas containing combustible gas and oxygen exists and that detects a concentration of combustible gas on the basis of a change in the concentration of oxygen contained in measurement-target gas resulting from an oxidizing reaction of combustible gas, comprising:

a correction portion that corrects a sensor output on the basis of a pressure-change speed or a rate of change in concentration of combustible gas during a certain period if the pressure-change speed remains higher than a predetermined speed for the period or more.

6. The combustible-gas sensor according to claim 5, wherein the correction portion corrects the sensor output through multiplication of a predetermined value that is set in advance in accordance with the pressure-change speed, until the pressure-change speed becomes equal to or lower than the predetermined speed.

7. The combustible-gas sensor according to claim 5, wherein the correction portion estimates the concentration of combustible gas on the basis of the rate of change in concentration of combustible gas and the sensor output during the period, until the pressure-change speed becomes equal to or lower than the predetermined speed.

* * * * *